US008949621B2

(12) United States Patent
Nagai et al.

(10) Patent No.: US 8,949,621 B2
(45) Date of Patent: *Feb. 3, 2015

(54) MEMORY DEVICE AUTHENTICATION

(75) Inventors: Yuji Nagai, Kanagawa-ken (JP); Taku Kato, Kanagawa-ken (JP); Tatsuyuki Matsushita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 13/523,259

(22) Filed: Jun. 14, 2012

(65) Prior Publication Data

US 2014/0136841 A1    May 15, 2014

(51) Int. Cl.
*H04L 9/32* (2006.01)
*H04L 9/08* (2006.01)

(52) U.S. Cl.
CPC ............ *H04L 9/0822* (2013.01); *H04L 9/0866* (2013.01); *H04L 9/0869* (2013.01); *H04L 9/0897* (2013.01); *H04L 9/3242* (2013.01); *H04L 9/3271* (2013.01)
USPC ............. 713/189; 713/168; 726/19; 380/264; 380/28

(58) Field of Classification Search
USPC ................ 713/189, 168; 726/17; 380/264, 28
See application file for complete search history.

(56) References Cited

U.S. PATENT DOCUMENTS

| 7,093,299 | B1 * | 8/2006 | Kamijo et al. ................... 726/29 |
| 7,734,935 | B2 * | 6/2010 | Takada et al. .................. 713/193 |
| 2007/0155486 | A1 * | 7/2007 | Futa et al. ....................... 463/29 |
| 2010/0318808 | A1 * | 12/2010 | Berthe et al. ................... 713/189 |
| 2011/0055891 | A1 * | 3/2011 | Rice .................................. 726/2 |
| 2013/0014269 | A1 * | 1/2013 | Chang et al. .................... 726/26 |
| 2013/0117578 | A1 * | 5/2013 | Ihle et al. ....................... 713/193 |
| 2013/0132719 | A1 * | 5/2013 | Kobayashi et al. ........... 713/158 |

FOREIGN PATENT DOCUMENTS

JP    2010-268417    11/2010

OTHER PUBLICATIONS

"Media Identifier Management Technology (MIMT) Specification", Issued by 4C Entity, http://www.4centity.com, Sep. 27, 2010, 13 pages.
"Content Protection for Recordable Media (CPRM) Specification", SD Memory Card Book Common Part, Issued by 4C Entity, http://www.4centity.com, Dec. 15, 2010, 20 pages.
"Content Protection for Recordable Media Specification", SD Memory Card Book SD-SD (Separate Delivery) Part, Intel Corporation, Jul. 19, 2012, pp. 1-102 with cover pages.
"Content Protection for eXtended Media Specification", Introduction and Common Cryptographic Elements, Intel Corporation, Sep. 27, 2010, 32 pages.

* cited by examiner

*Primary Examiner* — Amare F Tabor
(74) *Attorney, Agent, or Firm* — Oblon, Spivak, McClelland, Maier & Neustadt, L.L.P.

(57) ABSTRACT

According to one embodiment, a device includes a first data generator configured to generate a second key (HKey) by encrypting a host constant (HC) with the first key (NKey); a second data generator configured to generate a session key (SKey) by encrypting a random number (RN) with the second key (HKey); a one-way function processor configured to generate an authentication information (Oneway-ID) by processing the secret identification information (SecretID) with the session key (SKey) in one-way function operation; and a data output interface configured to output the encrypted secret identification information (E-SecretID) and the authentication information (Oneway-ID) to outside of the device.

1 Claim, 45 Drawing Sheets

FKB(Family Key Block)
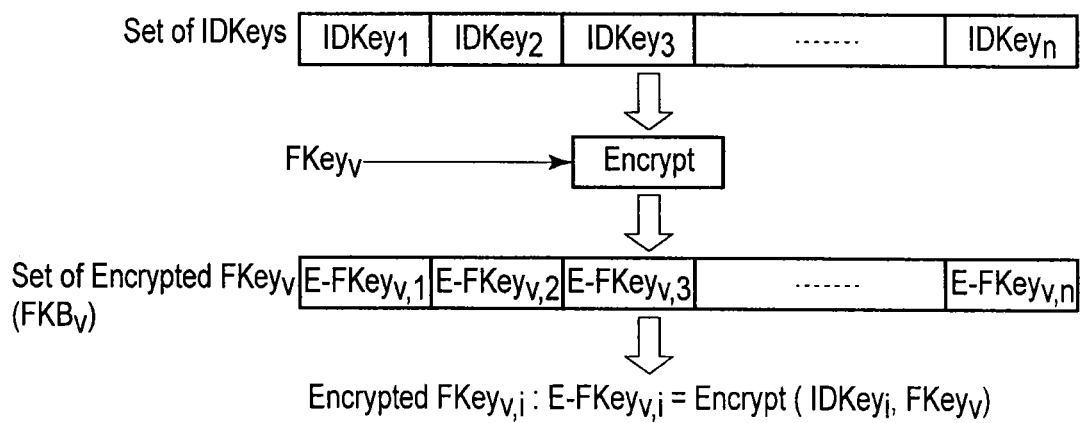
Encrypted $FKey_{v,i} : E\text{-}FKey_{v,i} = Encrypt(IDKey_i, FKey_v)$
F I G. 3

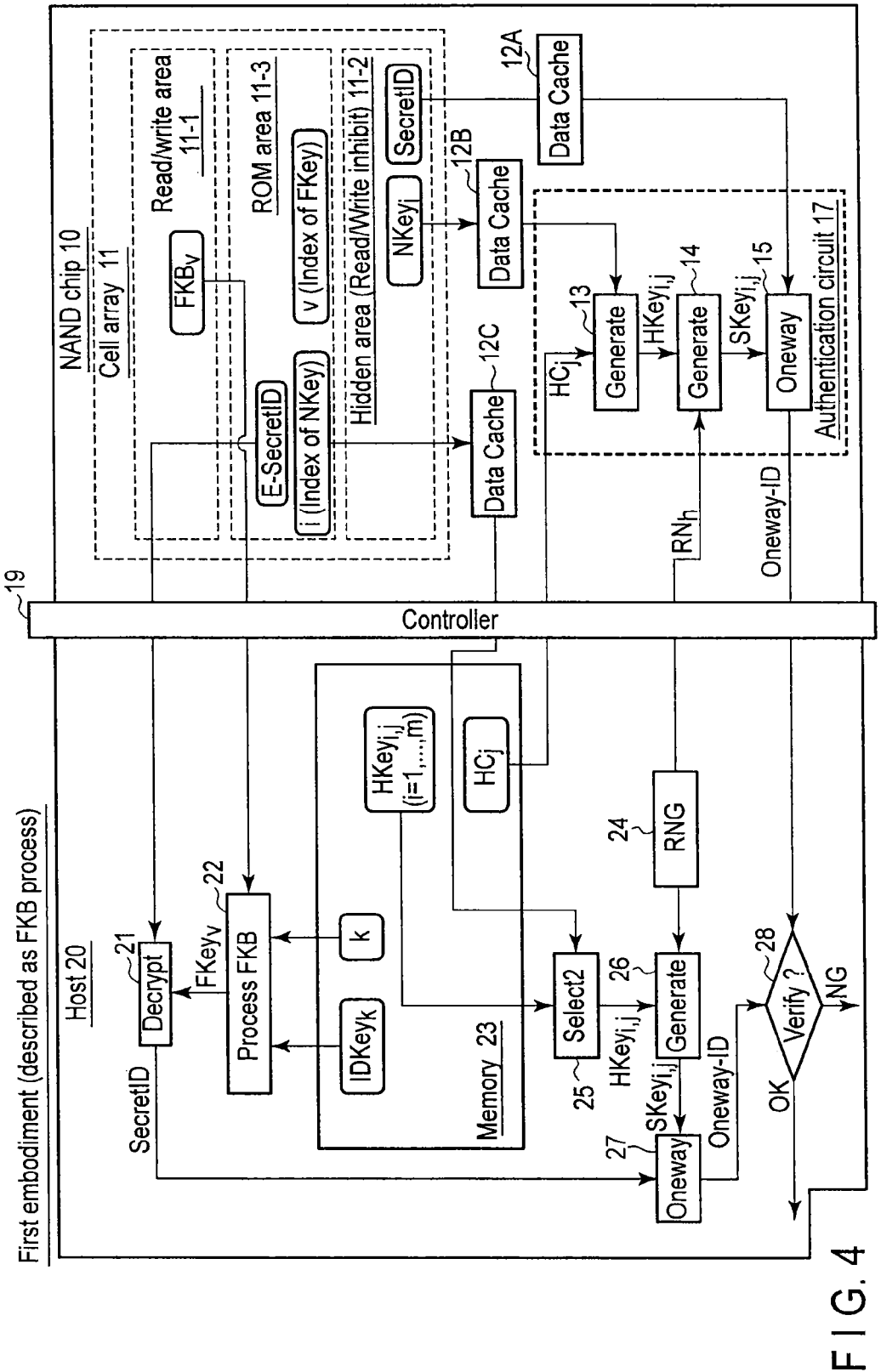
F I G. 4

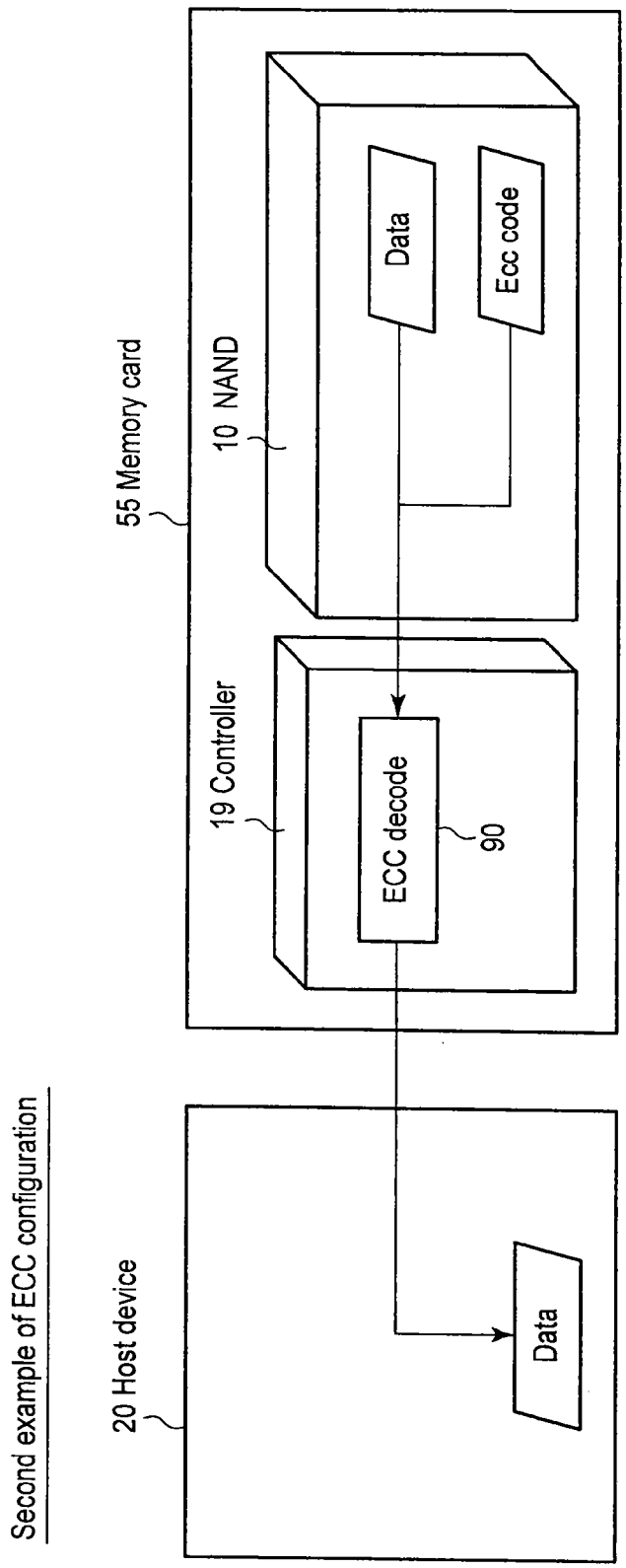
F I G. 2 3

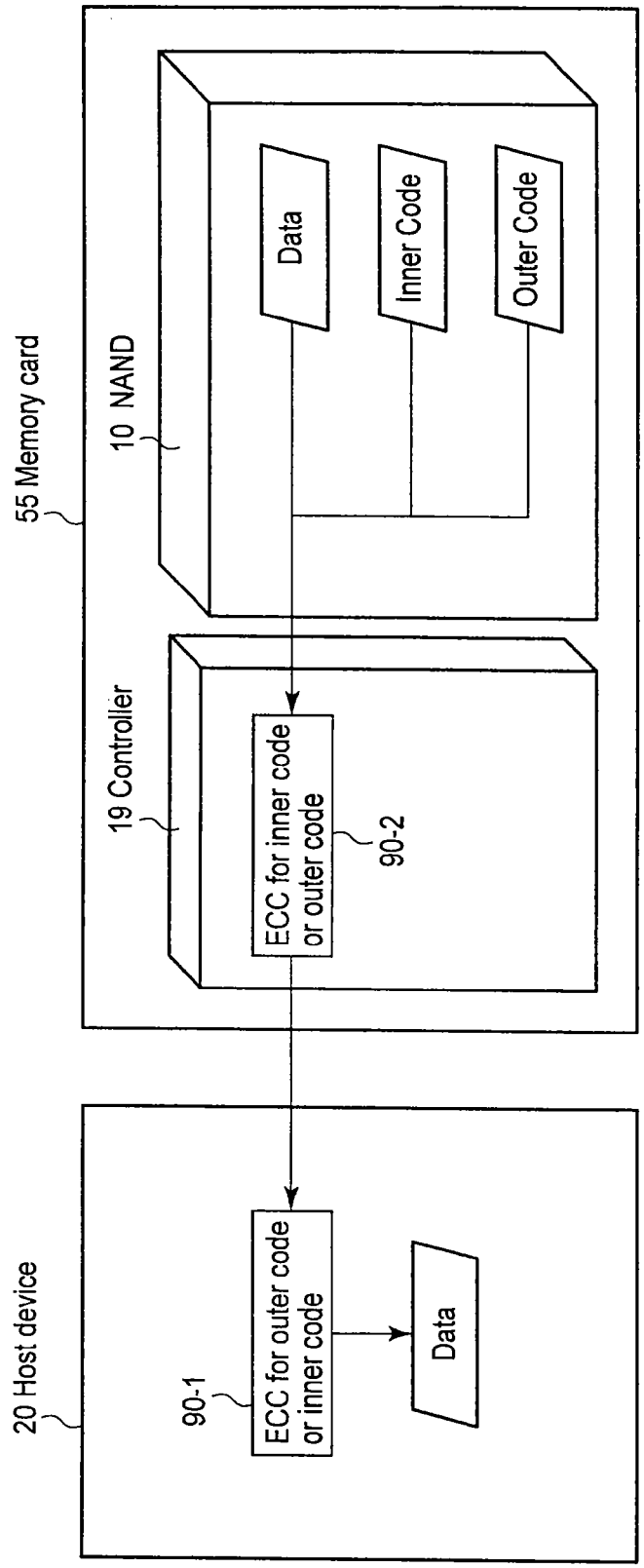
F I G. 25

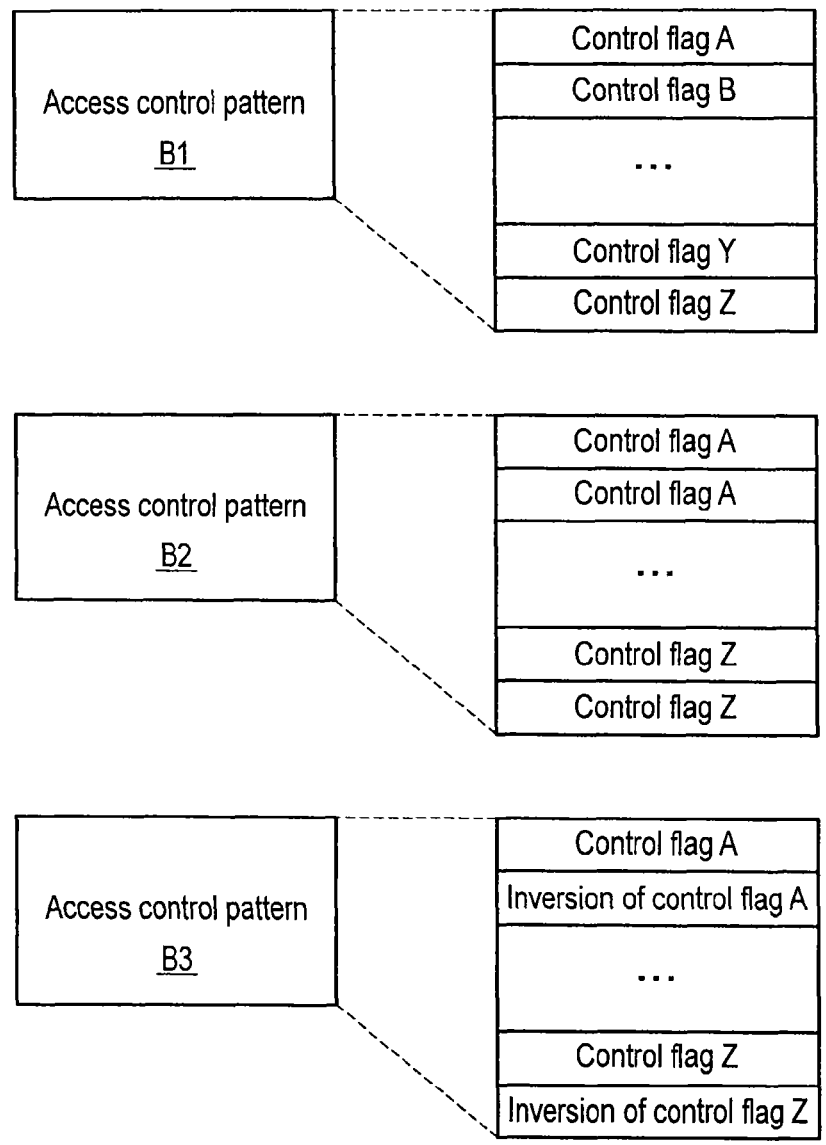
F I G. 27

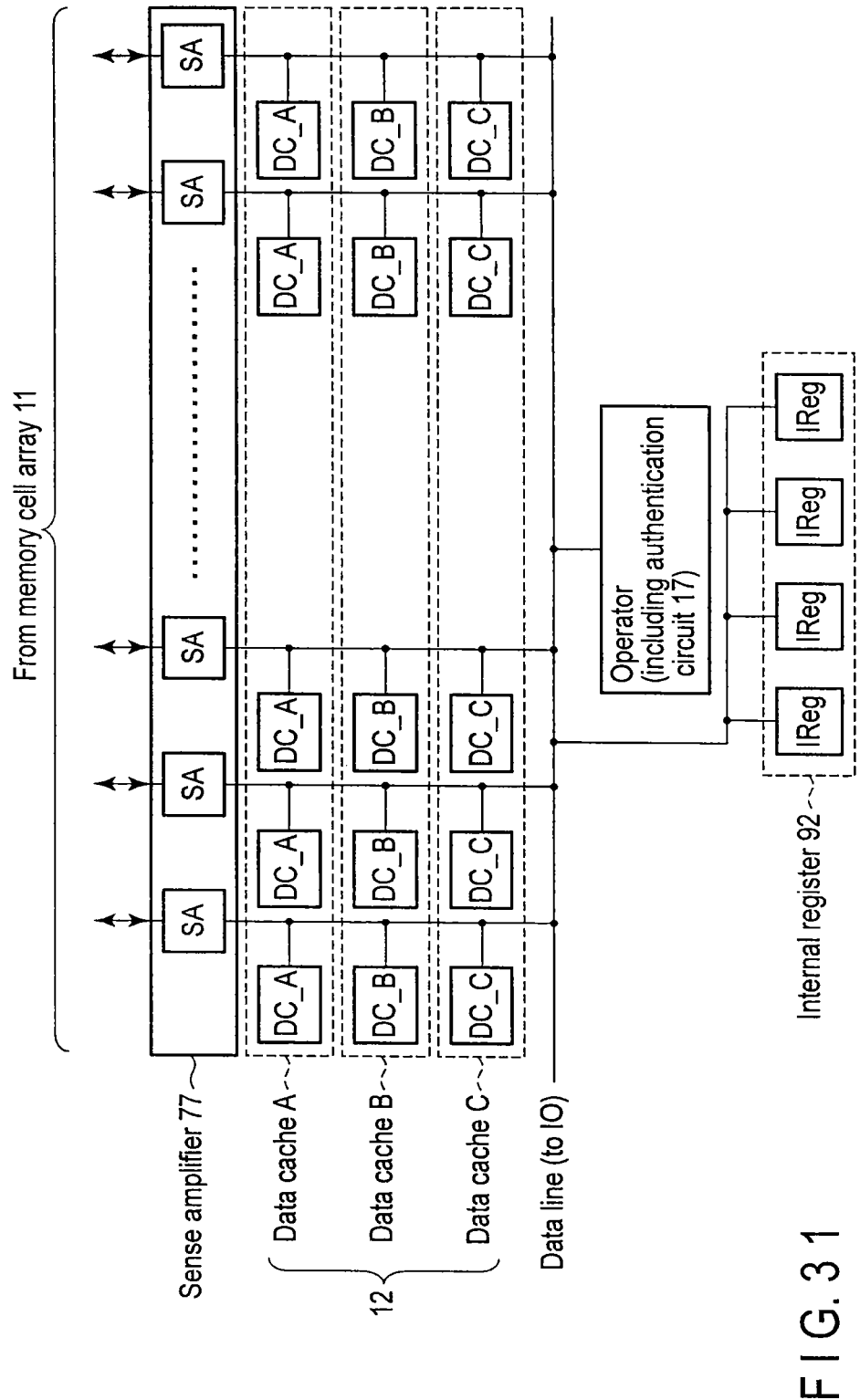
F I G. 31

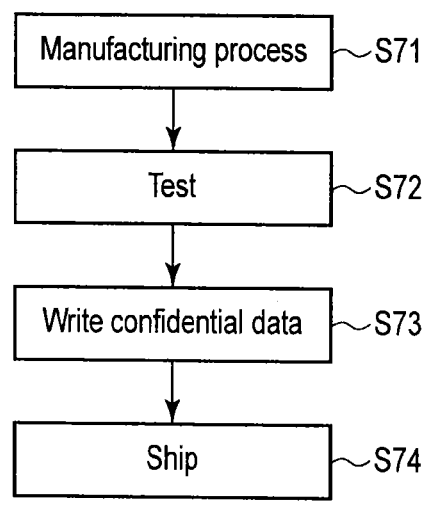
F I G. 34

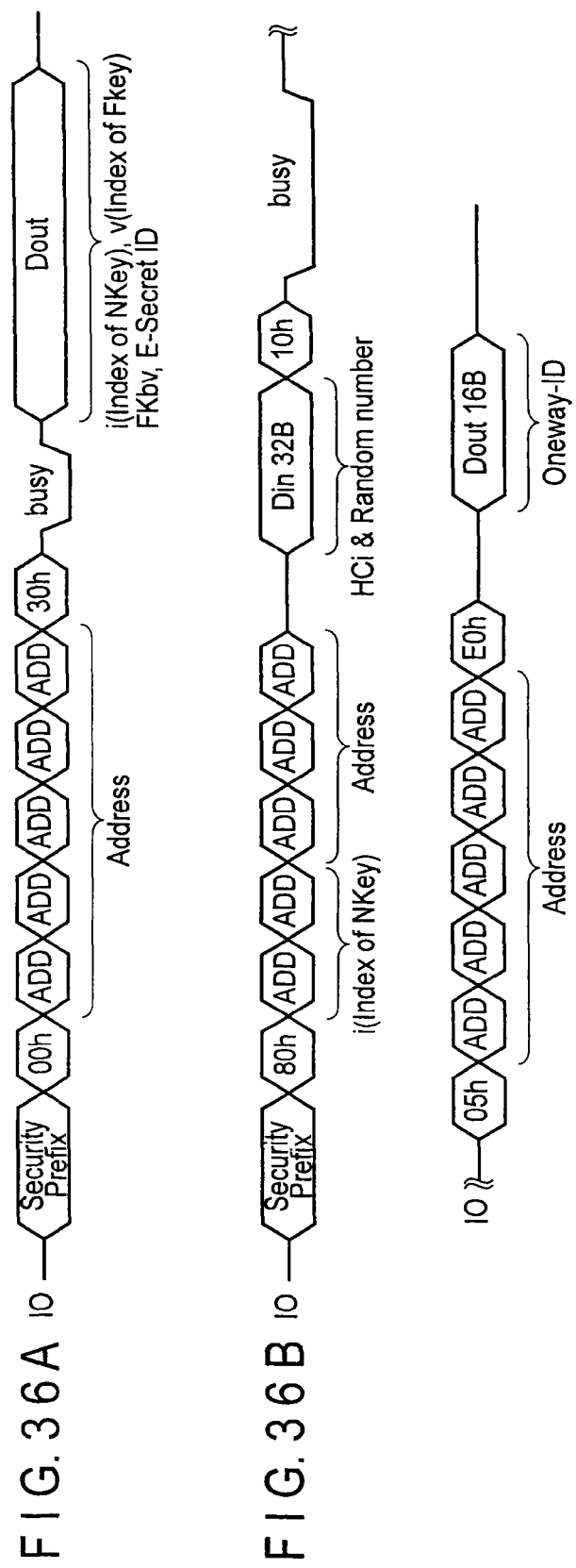

Set/Get feature command example

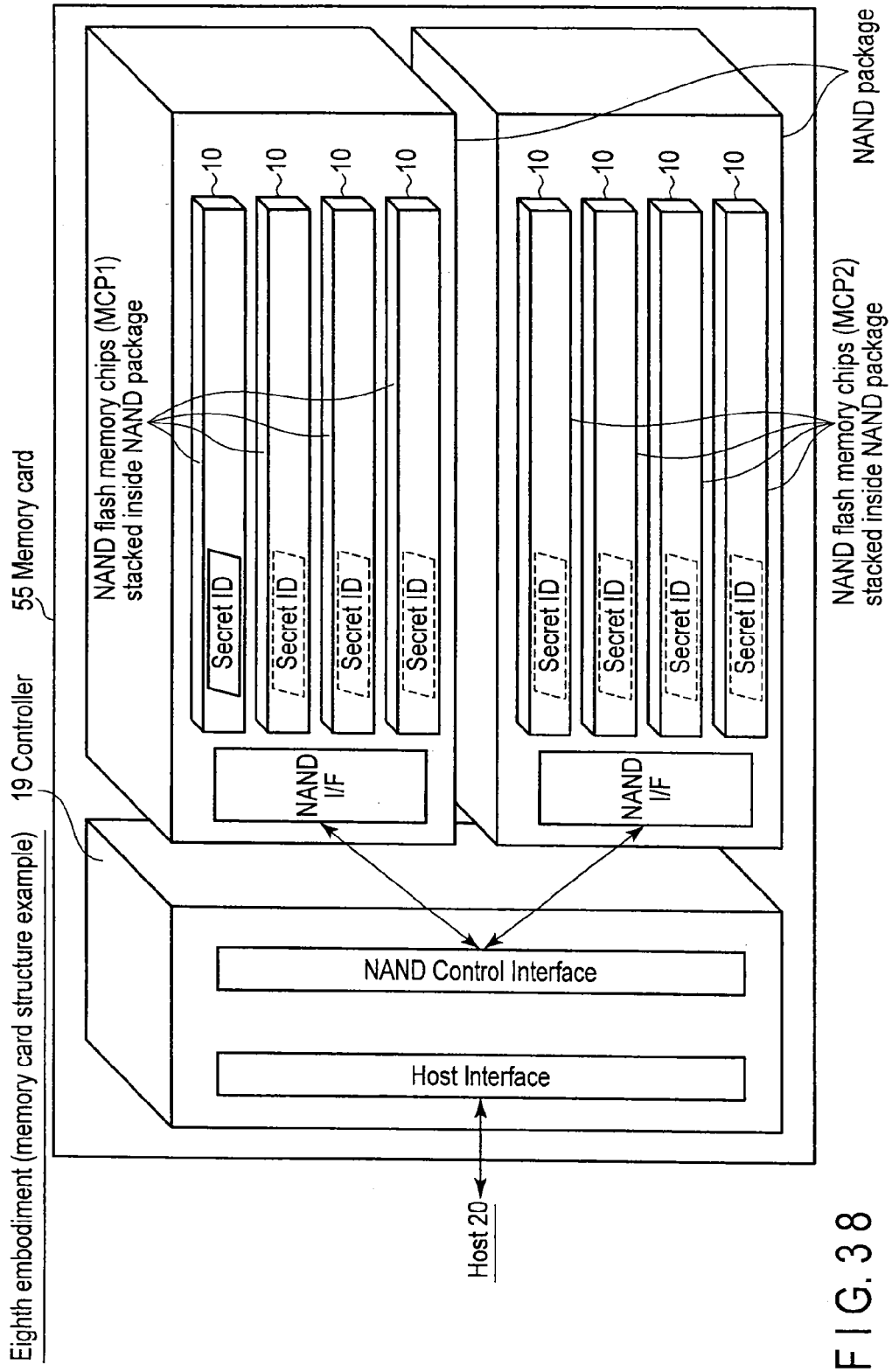
F I G. 38

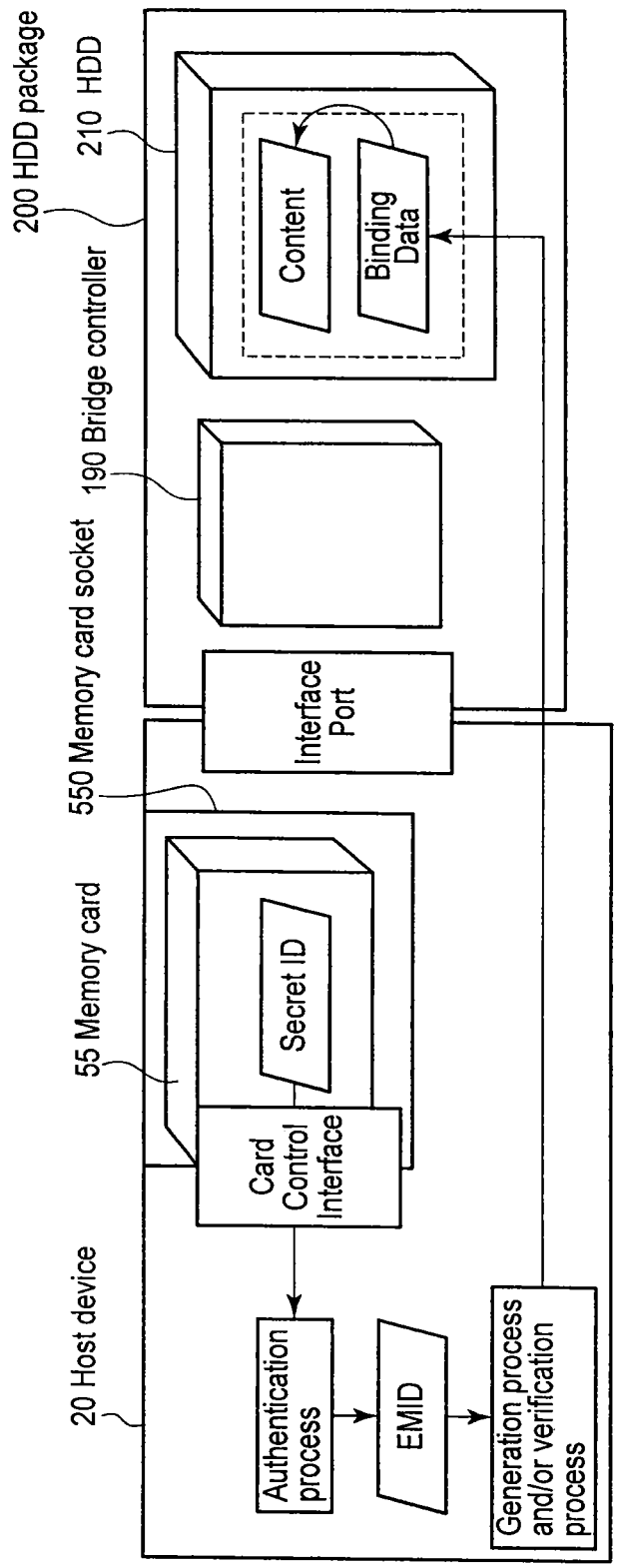
F I G. 4 3

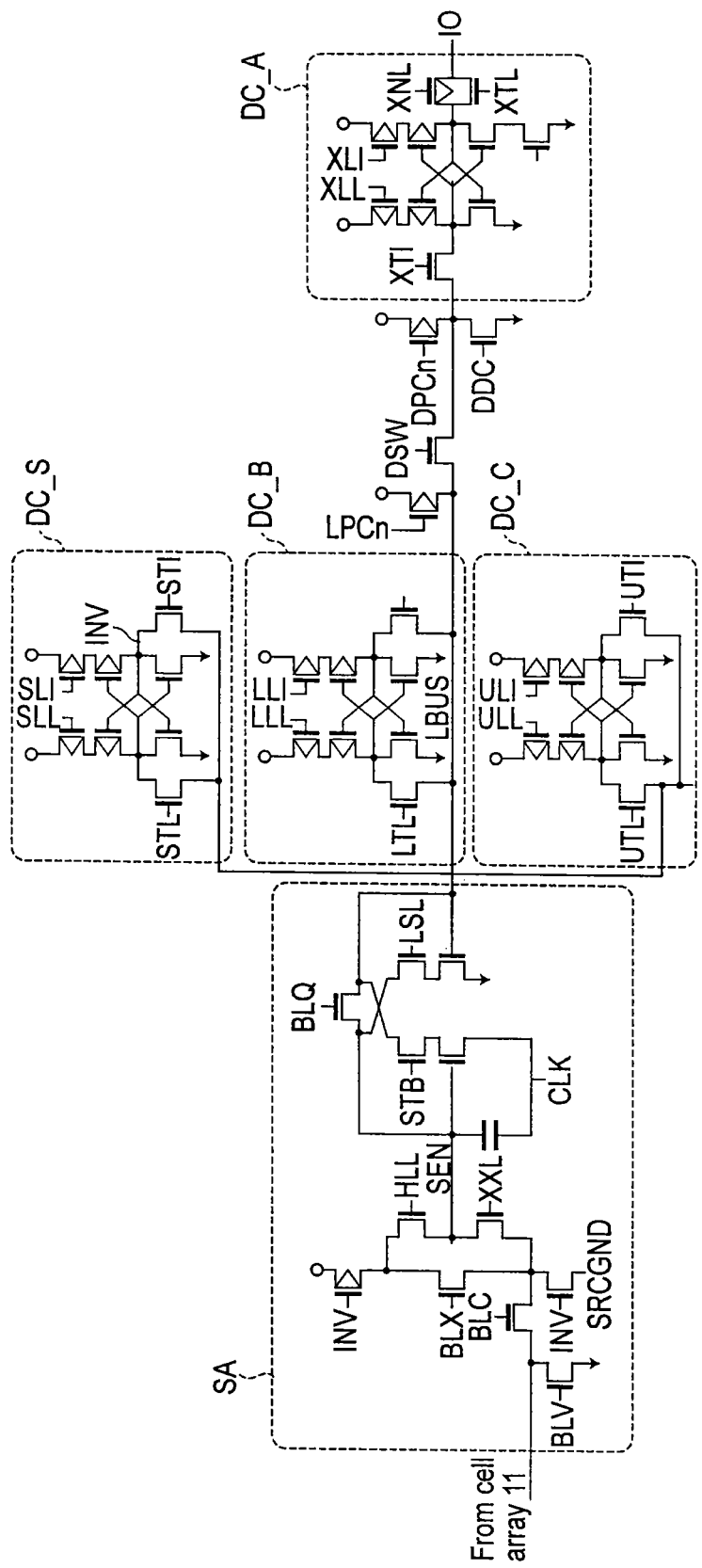
F I G. 46

MEMORY DEVICE AUTHENTICATION

FIELD

Embodiments described herein relate generally to a device.

BACKGROUND

In general, in fields of information security, a method using mutually shared secret information and an encryptor is adopted as means for certifying one's own authenticity.

For example, in an IC card (Smart Card), etc., which are used for electronic settlement, an ID and secret information for individualizing the IC card are stored in an IC in the card. Further, the IC card has a cipher processing function for executing authentication based on the ID and secret information.

In another example, an authentication method called Content Protection for Recordable Media (CPRM) is specified as means for certifying authenticity of an SD (registered trademark) card in protection of copyrighted contents.

BRIEF DESCRIPTION OF THE DRAWINGS

FIG. 3 is a diagram showing a configuration example of an encrypted FKey bundle (FKB) according to the first embodiment;

FIG. 4 is a block diagram showing a configuration example of the memory system according to the first embodiment;

FIGS. 22, 23, 24, and 25 are block diagrams showing first, second, third, and fourth configuration examples of ECC;

FIG. 27 is a diagram showing an example of an access control pattern according to the fifth embodiment;

FIG. 31 is a block diagram showing a configuration example of a NAND chip according to a sixth embodiment;

FIG. 34 is a diagram showing a test flow according to the sixth embodiment;

FIGS. 36A and 36B are timing charts showing a command mapping example according to a seventh embodiment;

FIG. 38 is a diagram showing a configuration example of a memory card according to an eighth embodiment;

FIG. 42, 43, and 44 are diagrams showing second, third, and fourth application examples to the content protection according to the eighth embodiment;

FIG. 46 is an equivalent circuit diagram of the sense amplifier and a data cache in FIG. 45.

DETAILED DESCRIPTION

Figure 1:
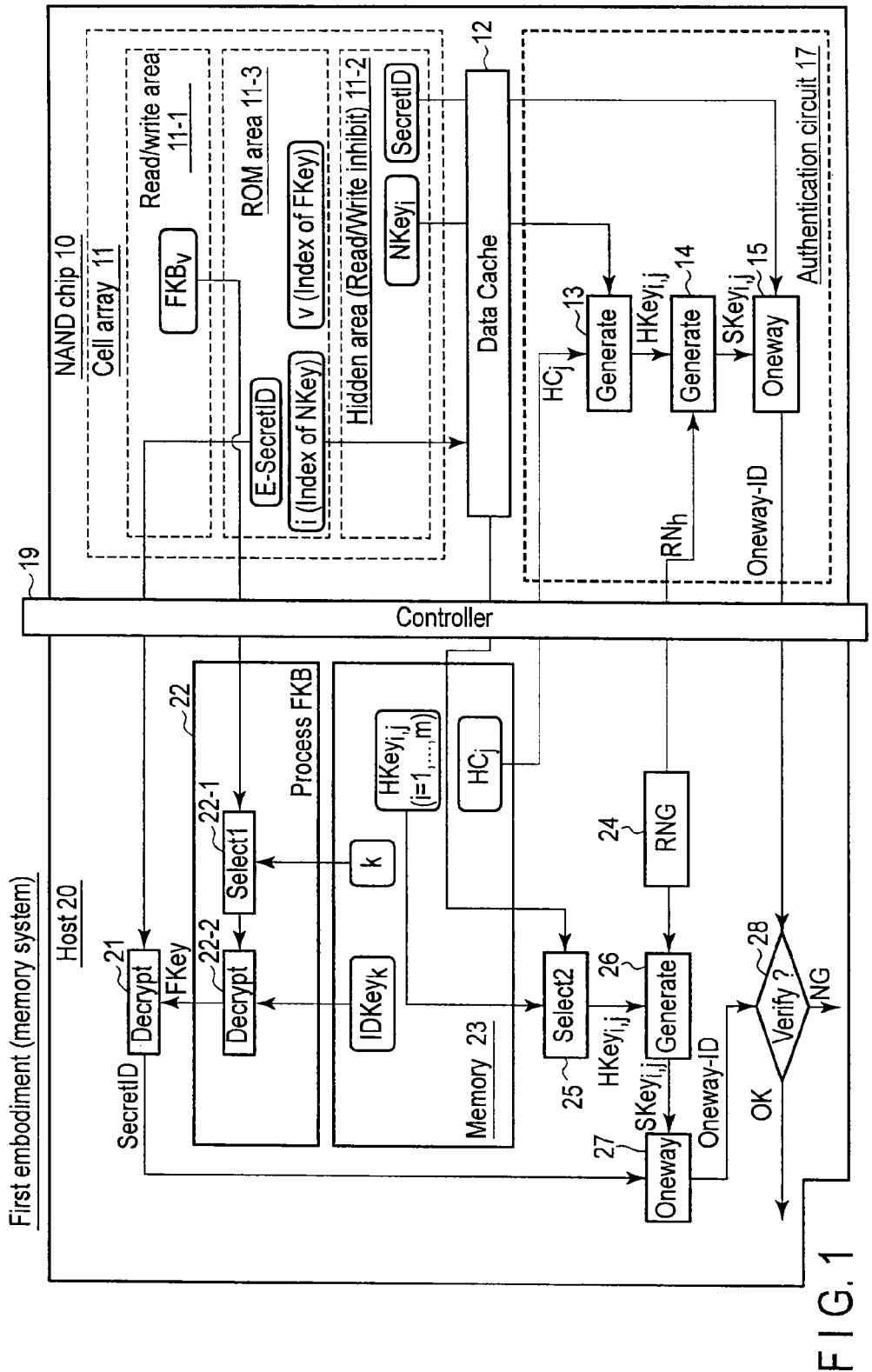
FIG. 1 is a block diagram showing a configuration example of a memory system according to a first embodiment.

In general, according to one embodiment, (1) A semiconductor memory device including:

a cell array including at least an ordinary area accessible from the outside, a hidden area to which access request from the outside is restricted, and an identification information record area in which identification information which defines a condition for accessing the hidden area is recorded;

an authentication circuit which performs authentication with the outside; and a sensing circuit which recognizes information recorded in the identification information storage area, determines the information recorded in the identification information record area when an access request from the outside selects the hidden area, validates an access to the hidden area from the outside when determined that the identification information is recorded, and invalidates an access to the hidden area from the outside when determined that the identification information is not recorded.

(2) In the device of (1), the identification information includes bits, sub identification information items, or complementary information.

(3) In the device of (2), the sensing circuit performs a complementary determination for each sub identification information item, and determines whether complementary determination results in the identification information are equal to or more than a predetermined number to determine whether the identification information is recorded.

(4) In the device of any of (1) to (3), hidden information is recorded in the hidden area by the authentication circuit.

(5) In the device of any of (1) to (4), when the access request is a request to erase information recorded in the hidden area, the sensing circuit performs the erasure of information recorded in the hidden area when determined that the identification information is recorded and does not perform the erasure of the information recorded in the hidden area when determined that the identification information is not recorded.

(6) In the device of any of (1) to (4), when the access request is a request to write information in the hidden area, the sensing circuit performs the writing of information in the hidden area when determined that the identification information is recorded and does not perform the writing of the information in the hidden area when determined that the identification information is not recorded.

(7) In the device of any of (1) to (4), when the access request is a request to read information recorded in the hidden area, the sensing circuit performs the reading of information recorded in the hidden area when determined that the identification information is recorded and does not perform the reading of information recorded in the hidden area when determined that the identification information is not recorded.

(8) In the device of any of (1) to (4), when the access request is a request to erase information recorded in the ordinary area, the sensing circuit performs the erasure of information recorded in the ordinary area without determining the information recorded in the identification information record area.

(9) In the device of any of (1) to (4), when the access request is a request to write information in the ordinary area, the sensing circuit performs the writing of information in the ordinary area without determining the information recorded in the identification information record area.

(10) In the device of any of (1) to (4), when the access request is a request to read information recorded in the ordinary area, the sensing circuit performs the reading of information recorded in the ordinary area without determining the information recorded in the identification information record area.

(11) In the device of any of (1) to (10), the cell array includes blocks which are minimum erasure units, at least one block is assigned to the ordinary area, at least one block is assigned to the hidden area, and the identification information record area is positioned in the block assigned to the hidden area.

(12) In the device of (11), one block includes pages which are writing and reading units, and the identification information record area is positioned in only one page within one block.

(13) In the device of (11), one block includes pages which are writing and reading units, and the identification information record area is positioned in pages within one block.

(14) In the device of any of (1) to (13), the sensing circuit outputs outside a status signal indicative of invalidation of an access to the hidden area when determined that the identification information is not recorded.

(15) The device of (5), further including a sequence control circuit which controls at least erasure, writing, and reading of the cell array, wherein the sensing circuit outputs a signal indicative of invalidation of erasure to the sequence control circuit when determined that the identification information is recorded.

(16) The device of (6), further including a sequence control circuit which controls at least erasure, writing, and reading of the cell array, wherein the sensing circuit outputs a signal indicative of invalidation of writing to the sequence control circuit when determined that the identification information is recorded.

(17) The device of (7), further including a sequence control circuit which controls at least erasure, writing, and reading of the cell array, wherein the sensing circuit outputs a signal indicative of invalidation of reading to the sequence control circuit when determined that the identification information is recorded.

(18) In the device of any of (15) to (17), the sequence control circuit is commonly used between the ordinary area and hidden area.

a function call unit configured to return an instruction to call the specific function of the semiconductor memory device, when the transmitted authentication information matches with authentication information generated by the semiconductor memory device.

(19) A device to be authenticated comprising:
a first memory area being used to store a first key (NKey) and secret identification information (SecretID) unique to the device, the first memory area being prohibited from being read and written from outside of the device at least after shipping;
a second memory area being used to store encrypted secret identification information (E-SecretID) generated by encrypting the secret identification information (SecretID), the second memory area being required to be read-only from outside of the device;
a third memory area being required to be readable and writable from outside of the device;
a first data generator configured to generate a second key (HKey) by encrypting a host constant (HC) with the first key (NKey) in AES operation;
a second data generator configured to generate a session key (SKey) by encrypting a random number (RN) with the second key (HKey) in AES operation;
a one-way function processor configured to generate an authentication information (Oneway-ID) by processing the secret identification information (SecretID) with the session key (SKey) in one-way function operation; and
a data output interface configured to output the encrypted secret identification information (E-SecretID) and the authentication information (Oneway-ID) to outside of the device.

(20) A device to be authenticated comprising:
a first memory area being used to store a first key (NKey) and secret identification information (SecretID) unique to the device, the first memory area being prohibited from being read and written from outside of the device at least after shipping;
a second memory area being used to store encrypted secret identification information (E-SecretID) generated by encrypting the secret identification information (SecretID), the second memory area being required to be read-only from outside of the device;
a third memory area being required to be readable and writable from outside of the device;
a first data generator configured to generate a second key (HKey) by encrypting a host constant (HC) with the first key (NKey);

a second data generator configured to generate a session key (SKey) by encrypting a random number (RN) with the second key (HKey);

a one-way function processor configured to generate an authentication information (Oneway-ID) by processing the secret identification information (SecretID) with the session key (SKey) in one-way function operation; and a data output interface configured to output the encrypted secret identification information (E-SecretID) and the authentication information (Oneway-ID) to outside of the device.

(21) A device to be authenticated comprising:

a first memory area being used to store a first key (NKey) and secret identification information (SecretID) unique to the device;

a second memory area being used to store encrypted secret identification information (E-SecretID) generated by encrypting the secret identification information (SecretID);

a first data generator configured to generate a second key (HKey) by encrypting a host constant (HC) with the first key (NKey) in AES operation;

a second data generator configured to generate a session key (SKey) by encrypting a random number (RN) with the second key (HKey) in AES operation;

a one-way function processor configured to generate an authentication information (Oneway-ID) by processing the secret identification information (SecretID) with the session key (SKey) in one-way function operation; and a data output interface configured to output the encrypted secret identification information (E-SecretID) and the authentication information (Oneway-ID) to outside of the device.

(22) A device to be authenticated comprising:

a first memory area being used to store a first key (NKey) and unique secret identification information (SecretID), the first memory area being restricted from being read and written from outside;

a second memory area being used to store encrypted secret identification information (E-SecretID) generated by encrypting the secret identification information (SecretID), the second memory area being allowed to be read-only from outside;

a third memory area being readable and writable from outside;

a first data generator configured to generate a second key (HKey) by using the first key (NKey);

a second data generator configured to generate a session key (SKey) by using the second key (HKey); and a one-way function processor configured to generate an authentication information by processing the secret identification information with the session key in one-way function operation, wherein the encrypted secret identification information (E-SecretID) and the authentication information (Oneway-ID) are output to outside.

(23) A device to be authenticated comprising:

a memory area being used to store a first key (NKey), unique secret identification information (SecretID), and encrypted secret identification information (E-SecretID), the encrypted secret identification information (E-SecretID) being generated by encrypting the secret identification information (SecretID), the first key (NKey) and the secret identification information (SecretID) being prohibited from being read from outside, the encrypted secret identification information (E-SecretID) being readable from outside;

a data generator configured to generate a session key (SKey) by using a second key (HKey), the second key (HKey) being generated based on the first key (NKey); and a one-way function processor configured to generate an authentication information by processing the secret identification information (SecretID) with the session key (SKey) in one-way function operation.

(24) An authentication method comprising:

generating a second key (HKey) by processing AES operation with the first key (NKey), the first key being stored in a memory and being prohibited from being read from outside;

generating a session key (SKey) by processing AES operation with the second key (HKey);

generating first authentication information (Oneway-ID) by processing secret identification information (SecretID) with the session key (SKey) in one-way function operation, the secret identification information (SecretID) being stored in a memory and being prohibited from being read from outside;

transmitting encrypted secret identification information (E-SecretID) to an external device and receiving second authentication information (Oneway-ID) from the external device, the encrypted secret identification information (E-SecretID) being stored in a memory and readable, the second authentication information (Oneway-ID) being generated based on the encrypted secret identification information (E-SecretID); and determining whether the first authentication information and the second authentication information match.

(25) A manufacturing method of a device to be authenticated, wherein the device includes a first memory area which is prohibited from data-reading and data-writing after shipping from a memory vendor; a second memory area which is allowed to data-read from outside after shipping from the memory vendor; and a third memory area which is allowed to data-read and data-write from outside after sipping from the memory vendor, the method comprising:

storing, by the memory vendor, first key (NKey) and secret identification information unique to the device into the first memory area, and storing, by the memory vendor, encrypted secret identification information (E-SecretID) generated by encrypting the secret identification information (SecretID) into the second memory area; and storing, by a vendor different from the memory vendor, a family key block (FKB) into the third memory area, the family key block (FKB) generating information to allow to decrypt the encrypted secret identification information (E-SecretID).

(26) A manufacturing method of a device to be authenticated, wherein the device includes a first memory area which is prohibited from data-reading and data-writing after shipping from a first manufacturing unit; a second memory area which is allowed to data-read from outside after shipping from the first manufacturing unit; and a third memory area which is allowed to data-read and data-write from outside after sipping from the first manufacturing unit, the method comprising:

storing, by the memory vendor, first key (NKey) and secret identification information unique to the device into the first memory area, and storing, by the memory vendor, encrypted secret identification information (E-SecretID) generated by encrypting the secret identification information (SecretID) into the second memory area; and storing, by a second manufacturing unit, a family key block (FKB) into the third memory area, the family key block (FKB) generating information to allow to decrypt the encrypted secret identification information (E-SecretID).

(27) A device comprising:

a memory being used to store a host identification key (IDKey), a host constant (HC), and a first key (HKey), the first key (HKey) being generated based on the host constant (HC);

a first generator configured to decrypt a family key block read from an external device with the host identification key (IDKey) to generate a family key (FKey);

a second generator configured to decrypt encrypted secret identification information (E-SecretID) read from the external device with the family key (FKey) to generate a secret identification information (SecretID);

a third generator configured to generate a random number (RN);

a fourth generator configured to generate a session key (SKey) by using the first key (HKey) and the random number (RN);

a fifth generator configured to generate a first authentication information (Oneway-ID) by processing the secret identification information (SecretID) with the session key (SKey) in one-way function operation; and a verification unit configured to determine whether the first authentication information (Oneway-ID) and a second authentication information (Oneway-ID) match, the second authentication information (Oneway-ID) being generated by the external device with the host constant (HC) transmitted to the external device.

(28) A method of authenticating a device by an authenticator, wherein the device includes a first memory area storing first secret identification information (SecretID) unique to the device and a first key (NKey), the first memory area being prohibited from being read and written from outside of the device at least after shipment of the device, and a second memory area storing encrypted secret identification information (E-SecretID), the second memory area being required to be read-only from outside of the device, and the authenticator stores a host constant (HC), a host identification key (IDKey) hidden from outside of the authenticator, and a second key (HKey) hidden from outside of the authenticator, the method comprising:

reading the encrypted secret identification information (E-SecretID) from the device by the authenticator;

generating second secret identification information (SecretID) by decrypting the encrypted secret identification information (E-SecretID) by the authenticator;

generating a random number (RN) by the authenticator;

reading the host constant (HC) and the random number (RN) from the authenticator by the device;

generating a third key (HKey') using the host constant (HC) and the first key (NKey) by the device;

generating a first session key (SKey) using the third key (HKey') and the random number (RN) by the device;

generating a second session key (SKey') using the second key (HKey) and the random number (RN) by the authenticator;

generating first authentication information (Oneway-ID) by processing the first secret information (SecretID) with the first session key (SKey) in one-way function operation by the device;

generating second authentication information (Oneway-ID') by processing the second secret information (SecretID) with the second session key (SKey') in one-way function operation by the authenticator;

reading the first authentication information (Oneway-ID) from the device by the authenticator; and determining whether the first authentication information (Oneway-ID) and the second authentication information (Oneway-ID') match by the authenticator.

(29) A method of authenticating a first device and a second device each other, wherein first secret identification information (SecretID), a first key (NKey), and encrypted secret identification information (E-SecretID) are stored in the first device, the first secret identification information (SecretID) and a first key (NKey) are prohibited from being read from outside, and the encrypted secret identification information (E-SecretID) is readable, and a host constant (HC), host identification key (IDKey), and a second key (HKey) are stored in the second device, the method comprising:

generating second secret identification information (SecretID) by decrypting the encrypted secret identification information (E-SecretID) read from the first device by the second device;

generating a random number (RN) by the second device;

generating a third key (HKey') by using the host constant (HC) read from the first device and the first key (NKey) by the first device;

generating a first session key (SKey) by using the third key (HKey') and the random number (RN) by the first device;

generating first authentication information (Oneway-ID) by processing the first secret information (SecretID) with the first session key (SKey) in one-way function operation by the first device;

generating a second session key (SKey') by using the second key (HKey) and the random number (RN) by the second device;

generating second authentication information (Oneway-ID') by processing the second secret information (SecretID) with the second session key (SKey') in one-way function operation by the second device; and determining whether the first authentication information (Oneway-ID) and the second authentication information (Oneway-ID') match by the second device.

(30) A device comprising:

a memory being used to store a host identification key (IDKey), a host constant (HC), and a first key (HKey), the first key (HKey) being generated based on the host constant (HC);

a generator configured to decrypt encrypted secret identification information (E-SecretID) read from the external device by using information generated with the host identification key (IDKey) to generate a secret identification information (SecretID);

a third generator configured to generate a random 2 number (RN);

a fourth generator configured to generate a session key (SKey) by using the first key (HKey) and the random number (RN);

a fifth generator configured to generate a first authentication information (Oneway-ID) by processing the secret identification information (SecretID) with the session key (SKey) in one-way function operation; and a verification unit configured to determine whether the first authentication information (Oneway-ID) and a second authentication information (Oneway-ID) match, the second authentication information (Oneway-ID) being generated by the external device with the host constant (HC) transmitted to the external device.

(31) A device comprising:
  a memory being used to store a host identification key (IDKey), a host constant (HC), and a first key (HKey), the first key (HKey) being generated based on the host constant (HC);
  a first generator configured to decrypt a family key block read from an external device with the host identification key (IDKey) to generate a family key (FKey);
  a second generator configured to decrypt encrypted secret identification information (E-SecretID) read from the external device with the family key (FKey) to generate a secret identification information (SecretID);
  a third generator configured to generate a random number (RN);
  a fourth generator configured to generate a session key (SKey) by using the first key (HKey) and the random number (RN);
  a fifth generator configured to generate a first authentication information (Oneway-ID) by processing the secret identification information (SecretID) with the session key (SKey) in one-way function operation; and
  a verification unit configured to determine whether the first authentication information (Oneway-ID) and a second authentication information (Oneway-ID) match, the second authentication information (Oneway-ID) being generated by the external device with the host constant (HC) transmitted to the external device.
  wherein the first key (NKey) and the secret identification information (SecretID) issued by a key issuer and be stored in the memory by a memory manufacture, and the family key block (FKB) issued by the key issuer and be stored in the memory by a card manufacture.

When a security system adopting a process of authentication is constructed, it is necessary to assume a case in which a device which executes the process of the authentication is attacked, and hidden information is extracted. Therefore, the method of revoking extracted hidden information becomes important.

In the above-described CPRM or in Advanced Access Content System (ARCS) that is a copyright protection technique specified for protecting content recorded in a Blu-ray Disc, Media Key Block (MKB) is used for revoking a device key that is hidden information. In another method adopting a protocol based on public key cryptosystem, a list (Revocation List) of a public key certificate, which is paired with leaked private key information is used.

As an example, a system of playing back video content, which is recorded in an SD card, by software that is installed in a PC is taken. A CPRM process is implemented in the SD by hardware, therefore, it is very difficult to unlawfully extract hidden information. Compared to this, in many cases, it is easier to extract hidden information from the video playback software as a method of an attack. Actually, many software items for unlawfully decrypting content recorded in protected DVD or Blu-ray disk have been available. In such unlawful software, hidden information, which is extracted from an authentic software player, is utilized.

In addition, in some cases, it is necessary to take countermeasures against card-falsifying software or a false SD card. For example, an imitative SD card in disguise is produced by using hidden information extracted from authentic software, thereby to deceitfully use an authentic software player. For instance, a false SD card is produced such that an encryption key, which was used in encryption of content, can be easily read out from the false SD card. Thereby, it becomes possible to easily decrypt the video content recorded in the false SD card, by using an authentic video recorder.

An authenticator may be provided not only as a dedicated hardware device such as a consumer device, but also as a program (software) which is executable in a PC (personal computer) or the like, and, in some cases, the software functions as a substantial authenticator. On the other hand, an authenticatee is, for instance, recording media or the like. The authenticatee is a device to be authenticated. For example, the authenticatee includes a discrete device (for example, memory device), a module (for example, a card in which the memory device is embedded), an apparatus (for example, an apparatus with built-in modules), and a combination of any of the device, the module, and the apparatus. Even in the case where a program called "firmware" mediates in the operation of hardware which constitutes the recording media, an important process or information is stored in a hidden state in hardware in the cell array. Thus, in the case where software which is executed on the PC is the authenticator, there is concern that the tamper-resistance (the resistance to attacks) becomes lower, compared to the authenticatee such as recording media.

Thus, there is concern that, by attacking an authenticator with a low tamper-resistance, secret information hidden in an authenticatee with a high tamper-resistance is also exposed, leading to a disguise as a device with a high tamper-resistance. To deal with such a situation, a method of efficiently preventing unlawful use of secret information is demanded.

In addition, in recent years, such a demand tends to be strong even in an environment in which restrictions are also imposed on circuit scales, for example, in an environment in which hardware implementation of a public key cryptosystem process or an MKB process, which requires a relatively large circuit scale, is difficult to achieve. Therefore, a method of efficiently preventing unlawful use of secret information while controlling an increase of the circuit scale to a minimum is demanded.

A plurality of embodiments will be described below with reference to drawings. In the description below, a memory system is taken as an example of an authenticator, an authenticatee, and an authentication method, but the embodiments are not limited to such an example. In the description below, common parts are denoted by like reference numerals throughout the drawings.

[First Embodiment]
An authenticator, an authenticatee, and an authentication method according to a first embodiment will be described.

<1. Configuration example (Memory System)>
A configuration example of a memory system according to the first embodiment will be described by using FIG. 1.

As shown in FIG. 1, the memory system according to the first embodiment includes a NAND flash memory 10 as an authenticatee, a host device 20 as an authenticator, and a controller 19 mediating therebetween. The host device 20 accesses the NAND flash memory 10 via the controller 19.

Here, a manufacturing process of a semiconductor product such as the NAND flash memory 10 will briefly be described. The manufacturing process of a semiconductor product can mainly divided into a preprocess to form a circuit on a substrate wafer and a postprocess to cut the wafer to individual pieces and then to perform wiring and packaging a piece in a resin.

The controller 19 is configured in various ways such being configured to be included in the NAND flash memory 10 in the preprocess, configured to be included in the same package in the postprocess, though not included in the preprocess, and provided as a different chip from the NAND flash memory 10. The description below including FIG. 1 is provided by taking a case when the controller 19 is provided as a different chip from the NAND flash memory 10 as an example.

If not mentioned specifically below, the controller 19 mediates between the host device 20 and the NAND flash memory 10 in many cases to exchange data and instructions therebetween. Even in such a case, the controller 19 does not change intrinsic content of the above data and instructions and thus, details may be provided below as an abbreviated description. Details of configuration examples of the NAND flash memory 10 and the controller 19 will be provided later.

If the host device 20 is configured as dedicated hardware like a consumer device, not only a case where the device is configured by combining dedicated hardware with firmware to operate the dedicated hardware, but also a case where all functions of the device are realized by software operating in a PC can be assumed. The present embodiment can basically be applied regardless of which configuration the host device 20 adopts.

Each component and data processing shown in FIG. 1 will be described below. The present embodiment shows the method of reading secret identification information SecretID recorded in an authenticatee in a state hidden from third parties and also verifying that the data has been read from an authentic authenticatee and a configuration example when the method is applied to a memory system using the NAND flash memory 10.

1-1. NAND Flash Memory

In the present embodiment, the NAND flash memory 10 is an authenticatee.

As shown in FIG. 1, the NAND flash memory 10 according to the present embodiment includes a cell array (Cell array) 11, a data cache (Data Cache) 12 disposed in a peripheral area of the cell array 11, data generators (Generate) 13, 14, and a one-way converter (Oneway) 15. The data generators (Generate) 13, 14 and the one-way converter (Oneway) 15 constitute an authentication circuit 17.

The cell array 11 includes a read/write area (Read/Write area) 11-1 permitted to read and write into from outside, a hidden area (Hidden area) 11-2 inhibited from both reading and writing into from outside, and a ROM area (ROM area) 11-3 inhibited from writing into from outside.

The read/write area (ordinary area) 11-1 is an area into which data can be written and from which data can be read from outside the NAND flash memory 10. In the read/write area 11-1, key management information FKBv (Family Key Block) that is an encrypted FKey bundle prepared to hide FKeyv is stored. In contrast to other data recorded in the NAND flash memory 10, FKBv may be record when the NAND flash memory 10 is fabricated, or when the storage media for general user is fabricated by connecting the controller to the NAND flash memory 10. Alternatively, FKBv may be downloaded from a server in accordance with a user's request after shipping. That is, a third memory area 11-1 is used to store a family key block FKB including data generated by encrypting the family key FKey with a host identification key IDKey, the third memory area 11-1 being required to be readable and writable from outside of the authenticator. Details thereof will be described below.

The key management information FKBv is information used to decrypt hidden information FKeyv based on secret information IDKeyk held by the host device 20 and index information k of the secret information IDKeyk, or information used to decrypt hidden information FKeyv based on secret information IDKeyk held by the host device 20 and identification information of the host device 20.

The key management information FKBv is also information not only prepared uniquely for each of the NAND flash memories 10, but also can be commonly attached to (can be associated with) a plurality of the NAND flash memories 10 such as the production lot unit or wafer unit of the NAND flash memories 10 in accordance with the manufacturing process. Index information v of the key management information FKBv may be identification information or version number information of the key management information FKBv.

The hidden area 11-2 is an area inhibited from both reading and writing into from outside the NAND flash memory 10. In the hidden area 11-2, secret information NKeyi used by the NAND flash memory 10 for an authentication process and secret identification information SecretID of the NAND flash memory 10 are recorded. That is, a first memory area 11-2 is used to store a first key NKey and secret identification information SecretID unique to the authenticator, the first memory area 11-2 being prohibited from being read and written from outside of the authenticator at least after shipping.

The ROM area 11-3 is an area inhibited from writing into from outside the NAND flash memory 10, but is permitted to read data therefrom. In the ROM area 11-3, index information v (index of FKey) to indicate hidden information FKeyv hidden by the key management information FKBv, secret identification information (SecretID) encrypted by the hidden information Fkeyv (E-SecretID), and index information i (index of NKey) to indicate the secret information NKeyi are recorded. That is, a second memory area 11-3 is used to store an encrypted secret identification information E-SecredID generated by encrypting the identification information SecretID with a family key FKey, the second memory area 11-3 being required to be read-only from outside of the authenticator.

In the present embodiment, data is generally recorded after an error correction code being attached so that, even if an error occurs in data when the index information i or the index information v is recorded, correct identification information can be read. However, to simplify the description, error correction encoding and decoding processes are not specifically illustrated.

Incidentally, the ROM area 11-3 may be, for example, an OTP (One Time Program) area into which data is permitted to write only once or an ordinary area permitted to read and write into in the manufacturing process of the NAND flash memory 10 before being converted into a read-only area by rewriting a management flag after shipment. Alternatively, a method may be used in which the specific write command for accessing to the ROM area and different to the command for accessing to the normal area is prepared, and this specific write command is not provided to the recipient of the NAND flash memory 10. In addition, the ROM area may be handled as an ordinary area in the NAND flash memory 10, but the controller 19 limits functions provided to the host device 20 to reading only.

Because, as will be described below, information recorded in the ROM area 11-3 is associated with information recorded in the hidden area 11-2, if information recorded in the ROM area 11-3 is tampered with, the authentication function of the NAND flash memory 10 cannot be made to work effectively. Therefore, there is no cause for security concern due to tampering and thus, the ROM area 11-3 may be replaced with an ordinary area in which the reading and writing data is permitted. In such a case, the ROM area 11-3 in FIG. 1 may be replaced with the read/write area (ordinary area) 11-1. In this connection, a portion of data recorded in the ROM area 11-3 may be recorded in the read/write area (ordinary area) 11-1. For example, a configuration in which index information v (index of FKey) is recorded in the read/write area (ordinary area) and encrypted secret identification information (E-SecretID) and index information v (index of FKey) are recorded in the ROM area 11-3 is allowed. The above configuration examples of the ROM area 11-3 are also applicable to the ROM area 11-3 described herein as other embodiments or modifications below.

E-SecretID is data obtained by encrypting SecretID attached uniquely to each of the NAND flash memories 10 by FKeyv. Alternatively, the same encrypted secret identification information may be recorded in a plurality of NAND flash memories as usage. For example, in pre-recording content distribution, the same content data is recorded in NAND flash memories in advance to sell the NAND flash memories, and the same E-SecretID is recorded in the NAND flash memories storing the content.

The data cache 12 temporarily stores data read from the cell array 11.

The data generators 13, 14 are circuits that generate output data from a plurality of pieces of input data by a preset operation.

The data generator 13 generates secret information $HKey_{i,j}$ by converting a constant $HC_j$ received from the host device 20 by using the above secret information $NKey_i$. The data generator 14 generates a session key $SKey_{i,j}$ by converting a random number RNh received from the host device 20 by using the secret information $HKey_{i,j}$. The data generators 13, 14 can be implemented as hardware (circuit), software, or a combination of hardware and software.

If the data generators 13, 14 are implemented as circuits, the same circuit as the one-way converter 15 described below, a circuit diverting the one-way converter, or an Advanced Encryption Standard (AES) encryptor can be used to make the circuit size smaller as a whole. Similarly, the same circuit can be used repeatedly for two data generators illustrated as different structural elements to make the data processing procedure easier to understand. In this example, a configuration of $HKey_{i,j}=AES\_E(NKey_i, HC_j)$, $SKey_{i,j}=AES\_E(HKey_{i,j}, RNh)$ and the like can be adopted. That is, a first data generator 13 is configured to generate a second key HKey by encrypting a host constant HC with the first key NKey in AES operation. A second data generator 14 is configured to generate a session key SKey by encrypting a random number RN with the second key HKey in AES operation.

The one-way converter 15 performs a one-way conversion on input data and key data input separately to output one-way converted input data. The one-way converter 15 can be implemented as hardware (circuit), software, or a combination of hardware and software.

The one-way converter 15 converts the SecretID read from the hidden area 11-2 by a one-way function using the $SKey_{i,j}$ generated by the data generator 14 to generate one-way conversion identification information Oneway-ID (=Oneway($SKey_{i,j}$, SecretID)). If implemented as a circuit, the one-way converter 15 can also be used by diverting the data generator 14 or the like to make, as described above, the circuit size smaller as a whole. In this example, a configuration like Oneway-ID=AES_E($SKey_{i,j}$, SecretID) (+) SecretID can be adopted. That is, one-way function processor 15 is configured to generate an authentication information Oneway-ID by processing the secret identification information SecretID with the session key SKey in one-way function operation.

Though not shown, an output unit to output data to the host device 20 via the controller 19 and like are actually arranged as structural elements.

1-2. Host Device

In the present embodiment, the host device 20 is an authenticator.

As shown in FIG. 1, the host device 20 according to the present embodiment includes a decrypter (Decrypt) 21, an FKB processor (Process FKB) 22, a memory (Memory) 23, a random number generator (RNG) 24, a selector (Select 2) 25, a data generator (Generate) 26, a one-way converter (Oneway) 27, and a data verification unit (Verify) 28. In addition, for example, an error correction processing unit and the like may be included if necessary.

The decrypter 21 decrypts input data by using key data input separately to output decrypted input data. In the present embodiment, the decrypter 21 reads E-SecretID from the NAND flash memory 10 via the controller 19. Then, the decrypter 21 decrypts the E-SecretID by using hidden information FKey input from the FKB processor 22 (data selector 22-1) described below to output SecretID.

The FKB processor 22 decrypts key management information FKBv read from the NAND flash memory 10 by using secret information IDKeyk and index information k of the IDKeyk hidden in the memory 23 to output generated hidden information FKey to the decrypter 21. In the present embodiment, the FKB processor 22 includes a data selector (Select 1) 22-1 and a decrypter (Decrypt) 22-2.

The data selector 22-1 in the first stage selects data that can be decrypted by IDKeyk hidden in the memory 23 by using index information k recorded in the memory 23 from among an encrypted FKey bundle (key management information FKBv) read from the NAND flash memory 10 and outputs the selected data to the decrypter 22-2.

The decrypter 22-2 decrypts data selected by the data selector 22-1 by using the IDKeyk hidden in the memory 23 to output generated hidden information FKey to the decrypter 21.

The memory 23 records k, IDKeyk, set of $HKey_{i,j}$ (i=1, ..., m; j is a fixed value for $HKey_{i,j}$), and $HC_j$ and hides at least IDKeyk and set of $HKey_{i,j}$ (i=1, ..., m) from outside the host device 20. The $HC_j$ is a constant held in the host device 20 in advance to be sent to the NAND flash memory 10 when authentication is requested (Request authentication). Details thereof will be described below.

The random number generator 24 generates and outputs a random number RNh used for an authentication process.

The data selector 25 in the second stage selects $HKey_{i,j}$ needed for the authentication process from the set of $HKey_{i,j}$ hidden by the host device 20 by using index information i read from the ROM area 11-3 of the NAND flash memory 10 via the data cache 12.

The data generator 26 is an operation unit that generates output data by performing a predetermined operation on a plurality of pieces of input data. In the present embodiment, the data generator 26 generates a session key $SKey_{i,j}$ by converting RNh generated by the host device 20 by using $HKey_{i,j}$ hidden by the host device 20. As the data generator 26, for example, the above AES encryptor may be used.

The one-way converter 27 converts SecretID output from the decrypter 21 by a one-way function using $SKey_{i,j}$ output from the data generator 26 to generate one-way conversion identification information Oneway-ID.

The data verification unit 28 compares Oneway-ID received from the NAND flash memory 10 and Oneway-ID obtained from the one-way converter 27 in the host device 20 to see whether both Oneway-IDs match. If both values of the one-way conversion identification information Oneway-ID match (OK), the data verification unit 28 judges that SecretID obtained by the decrypter 21 is an authentic ID and delivers the obtained SecretID to subsequent processes. On the other hand, if both values thereof do not match (NG), the data verification unit 28 judges that the SecretID is an unlawful ID and outputs a message to that effect.

In addition, as means for revoking an unlawful host device when secret information held by the host device 20, for example, IDKeyk and HKeyi,j are leaked and the unlawful host device having the leaked information is produced by an illegal manufacturer, countermeasures such as removing information from the key management information (FKBv) with which FKey can be derived from IDKeyk held by the unlawful host device. The countermeasures will be described below in connection with the description with reference to FIG. 3. When taking the countermeasures, it is useful to provide association among IDKeyk, k, HKeyi,j, and HCj. This is because if there is such association, both of secret information IDKeyk and HKeyi,j held by the unlawful host device can be identified by observing HCj notified by the unlawful host device for authentication. Sharing information of all or a portion of HCj with IDKeyk, configuring information of all or a portion of HCj based on a result of an encryption process of IDKeyk, and configuring information of all or a portion of IDKeyk based on a result of an encryption process of HCj can be adopted as methods of association. Further, it is desirable to use HKeyi,j, in addition to FKey and IDKeyk to generate key management information FKBv. This will be described below in a paragraph in which a configuration example of FKB is described.

The secret information IDKeyk and secret information HKeyi,j are recorded, for example, after being encrypted by a method specific to the manufacturer in an internal dedicated memory if the host device 20 is a dedicated hardware device like a consumer device, held in a state that can be protected from an unlawful analysis by tamper resistant software (TRS) technology if the host device 20 is a program executed in a PC or the like, or recorded in a state after measures to hide the secret information being taken by using the function of a security module if the security module is contained.

The controller (Controller) 19 performs data transfer with the host device 20 by controlling the NAND flash memory 10. For example, the controller 19 interprets an instruction received from the host device 20 and converts the instruction into an instruction conforming to the interface specifications of the NAND flash memory 10 before sending out the instruction to the NAND flash memory 10. The controller 19 can adopt various interface standards such as the SD Memory standard, SDIO standard, and eMMC standard if necessary.

The controller 19 secures a portion of the ordinary area 11-1 to store control data needed for the operation of the controller 19. The controller 19 may have a function to convert a logical address received from the host device 20 into a physical address of the NAND flash memory. The controller 19 may also have a function to perform the so-called wear leveling to make exhaustion of the cell array 11 uniform. However, at least the hidden area 11-2 is excluded from wear leveling.

The configuration example of the memory system is not limited to the one described above. For example, an error correction processing unit (not shown) and other structural elements may be included if necessary. Further, there may be a plurality of pieces of secret information NKeyi held by the NAND flash memory 10. That is, if a combination of NKeyi and index information i corresponding thereto is defined as a slot, a plurality of slots is recorded in the NAND flash memory 10. A slot number is attached to each of the slots and the host device 20 reads index information i of each slot number and selects one of the slots to perform authentication.

In this case, the host device 20 notifies the NAND flash memory 10 of information corresponding to the selected slot number and the NAND flash memory 10 executes an authentication process by using information corresponding to the notified slot number. Further, a plurality of information slots may be held by defining all information held by the NAND flash memory 10 as one slot. That is, NKeyi, i, FKBv, v, SecretID, and E-SecretID are defined as one slot and a plurality of slots is recorded in the NAND flash memory 10. A slot number is attached to each of the slots and the host device 20 reads index information i of each slot number and selects one of the slots to perform authentication. In this case, the host device 20 notifies the NAND flash memory 10 of information corresponding to the selected slot number and the NAND flash memory 10 executes an authentication process by using information corresponding to the notified slot number.

The method by which the NAND flash memory 10 has a plurality of slots is shown above, but the method is not limited to the above one and any configuration sharing a portion of information by a plurality of slots can be adopted. For example, SecretID, E-SecretID, FKBv, and index v may be shared by a plurality of slots while other information being individually held by each slot.

The method by which the NAND flash memory 10 has a plurality of slots and slot numbers and which slot to use for authentication is notified by the host device 20 is applicable to all other embodiments described herein below.

<2. Authentication flow>

Figure 2:
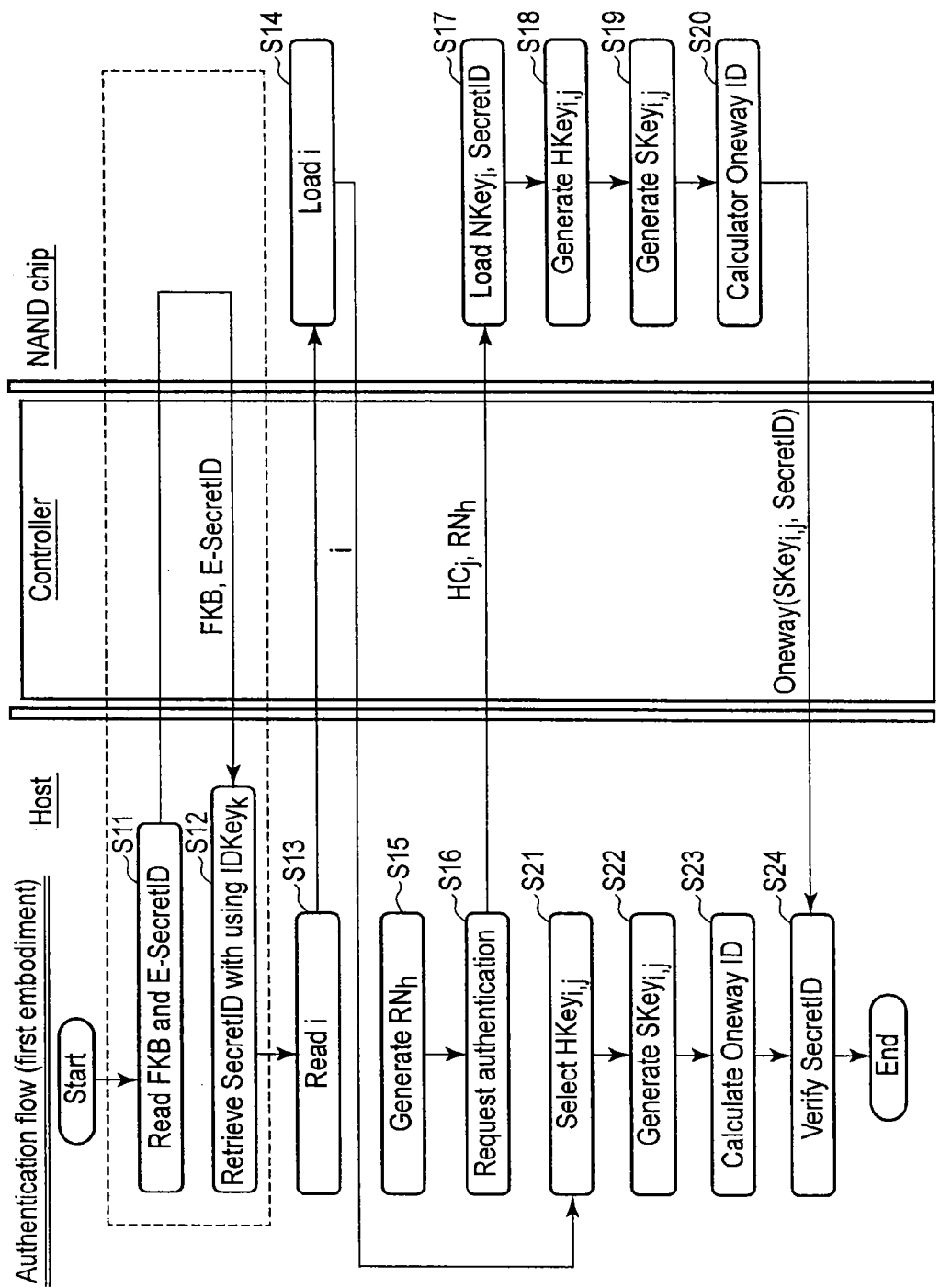
FIG. 2 is a flow chart showing an authentication flow of the memory system according to the first embodiment.

Next, the authentication flow of a memory system according to the first embodiment will be described along FIG. 2.

(Step S11)

When the authentication is started (Start), the host device 20 reads an encrypted FKey bundle (FKB: Family Key Block), which is key management information, and encrypted secret identification information SecretID (E-SecretID) from the NAND flash memory 10.

(Step S12)

Subsequently, the host device 20 reads encrypted hidden information FKey that can be decrypted by the host device 20 by executing a data selection process by the data selector (Select 1) 22-1 from the read key management information FKB and also obtains hidden information FKey by decrypting the encrypted hidden information FKey by the decrypter 22-2 using hidden secret information IDKeyk. Further, the host device 20 obtains secret identification information SecretID by decrypting the E-SecretID read from the NAND flash memory 10 using the obtained FKey.

(Step S13)

Subsequently, the host device 20 requests to read index information i to the NAND flash memory 10.

(Step S14)

Subsequently, in response to the request from the host device 20, the NAND flash memory 10 loads the index information i from the cell array 11 and outputs the index information i to the host device 20.

(Step S15)

Subsequently, the host device 20 generates a random number RNh needed for an authentication request. By using RNh for the authentication process, a common key that is different each time can be used with the NAND flash memory 10 for processes below.

(Step S16)

Subsequently, the host device 20 sends out a constant HCj held in advance and the RNh to the NAND flash memory 10 along with the an authentication request (Request authentication).

(Step S17)

Subsequently, the NAND flash memory 10 loads secret information NKeyi (i=1, . . . , m) and secret identification information SecretID from the hidden area 11-2, which are stored in the data cache 12.

(Step S18)

Subsequently, the NAND flash memory 10 generates secret information HKeyi,j by a data generation process of the data generator 13 using the hidden secret information NKeyi and the constant HCj received from the host device 20.

(Step S19)

Subsequently, the NAND flash memory 10 generates a session key SKeyi,j (=Generate(HKeyi,j, RNh)) by a data generation process of the data generator 14 using the received RNh.

(Step S20)

Subsequently, the NAND flash memory 10 generates one-way conversion identification information Oneway-ID (=Oneway(SKeyi,j, SecretID)) by executing a one-way conversion process of the one-way converter 15 on the SecretID using the SKeyi,j. The generated Oneway-ID is sent out to the host device 20. That is, data output interface is configured to output the encrypted secret identification information E-SecretID, the family key block FKB and the authentication information Oneway-ID to outside of the authenticator.

(StepS21)

In parallel with step S18, the host device 20 selects HKeyi,j needed for an authentication process with the NAND flash memory 10 from the set of HKeyi,j (i=1, . . . , m) hidden in advance using the received index i.

(Step S22)

Subsequently, the host device 20 generates the SKeyi,j (=Generate(HKeyi,j, RNh)) by a data generation process of the data generator 26 using the selected HKeyi,j and the generated RNh.

(Step S23)

Subsequently, the host device 20 generates Oneway-ID by executing a one-way conversion process of the one-way converter 27 on the SecretID using the generated SKeyi,j.

(Step S24)

Subsequently, the host device 20 determines whether the Oneway-ID received from the NAND flash memory 10 and the Oneway-ID generated by the host device 20 match. If both values of the Oneway-ID match (OK), the host device 20 judges that the SecretID obtained by the decrypter 21 is an authentic ID and delivers the SecretID to subsequent processes. On the other hand, if both values thereof do not match (NG), the host device 20 judges that the SecretID is an unlawful ID and outputs a message to that effect.

With the above operation, the authentication flow according to the first embodiment is completed (End).

If the NAND flash memory 10 has a plurality of slots as described in a configuration example of the memory system, the host device 20 needs to notify the NAND flash memory 10 of the slot number used for authentication. In such a case, the slot number may be notified in step S16 or in a step before step S16.

<3. FKB (Family Key Block)>

Next, key management information FKB (Family Key Block) according to the first embodiment will be described in more detail by using FIG. 3.

To generate key management information FKB conforming to the NAND flash memory 10 in which secret identification information SecretID is recorded, one piece of FKeyv after another is encrypted (Encrypt) by using one IDKeyi (i=1, . . . , n) (Set of IDKeyi's) after another as secret key information prepared in advance. That is, the key management information FKB is a set of encrypted FKeyv (E-FKeyv, i)=Encrypt (IDKeyi, FKeyv) and the set of encrypted FKeyv is called an encrypted FKey bundle.

Incidentally, the configuration of the key management information FKB is not limited to the configuration in the present embodiment. For example, in case where the specific IDKeyi is leaked, encrypted FKeyv (E-FKeyv) which can be decrypted from the leaked IDKeyi is deleted from the FKB. As a result, when the host device 20 accesses the NAND flash memory with the newly configured FKB, the host device 20 can not obtain (decrypt) correct FKeyv and SecredID. In this manner, the function to revoke the host device 20 holding the secret information IDKeyi can be provided.

When, as described above, IDKeyk, k, HKeyi,j, and HCj are associated, HKeyi,j may also be diverted, in addition to FKey and IDKeyk, for the generation of FKBv. For example, configurations such as E-FKeyv,i=Encrypt (Encrypt(IDKeyi, FKeyv), HKeyi,j), E-FKeyv,i=Encrypt (Encrypt(HKeyi,j, FKeyv), IDKeyi), and E-FKeyv,i=Encrypt(HKeyi,j, IDKeyi (+)FKeyv) may be adopted. This has the effect of preventing, when keys are leaked from a plurality of the host devices 20, the secret keys IDKeyi, HKeyi,j of different devices being combined. That is, by making decryption of FKey impossible unless IDKeyi and HKeyi,j are correctly combined, observing HCj reveals tied HKeyi, j and further IDKeyi can be identified so that exposed IDKeyi can be revoked.

Further, the method of generating the key management information FKB is not limited to the method in the present embodiment. For example, the function to revoke the host device 20 can also be provided if the key management information FKB is generated by using conventional MKB (Media Key Block) technology used in CPRM or another MKB technology.

The MKB technology efficiently shares common secret information (Media Key) (among devices not to be revoked) while realizing device revocation in a situation in which each of a plurality of devices has a mutually different piece of secret information and is also called Broadcast Encryption.

If the MKB technology is applied, for example, a configuration example of the memory system is shown like in FIG. 4. The shown memory system is different from the memory system in FIG. 1 in that the FKB processor (Process FKB) 22 is shown as a superordinate concept. Also in this case, the exposed key can be identified and revoked by associating the data of FKB decrypted based on the node number of the host device 20 that is information corresponding to K or IDKeyi and a host key group allocated to the node number with HKeyi,j and HCj.

<4. Writing Secret Information and FKB>

Next, writing secret information or key management information FKB into the NAND flash memory 10 will be described.

4-1. When Writing Secret Information or Key Management Information FKB During Manufacture of the NAND Flash Memory First, a case where secret information or key management information FKB is written, for example, during manufacture of the NAND flash memory 10 will be described by using FIGS. 5 and 6. The description will be provided along the flow in FIG. 6.

A licensing administrator 40 generates data below: key management information FKBv (v=1, . . . , n), hidden information FKeyv(v=1, . . . , n), index information v (v=1, . . . , n), secret information NKeyi, and index information i. FKBv is generated by, as described above, encrypting FKeyv. In addition, v may be a plurality of values. If, for example, the licensing administrator 40 generates three values of 1, 2, and 3 as v, the licensing administrator 40 generates (FKB1, FKey1), (FKB2, FKey2), and (FKB3, FKey3) in accordance with the generated v.

Of the generated data, the licensing administrator 40 delivers FKeyv(v=1, . . . , n), v(v=1, . . . , n), NKeyi, i to a memory vendor 30. For the delivery the data, for example, the licensing administrator 40 uses safe means such as sending the data to the memory vendor 30 after the data being encrypted by using a public key of the memory vendor 30 obtained in advance.

In the memory vendor 30, there are selectors 32, 33, a generator 34, and an encryption unit 35, in addition to the NAND flash memory 10. The memory vendor 30 further holds data 31 such as FKBv (v=1, . . . , n) delivered by the licensing administrator 40

(Step S31)

With the above configuration, the memory vendor 30 first generates SecretID by the generator (SecretID Generator) 34.

(Step S32)

Subsequently, the memory vendor 30 that receives the data 31 selects one value from v by the selector 32. Further, the selector 32 selects FKeyv corresponding to the selected v. The memory vendor 30 encrypts the generated SecretID to generate E-SecretID by using the selected FKeyv.

(Step S33)

Subsequently, the memory vendor 30 writes the value of v into the ROM area 11-3 of the NAND flash memory 10 as the index information v (index of FKey).

The memory vendor 30 also writes the value of index information i (index of NKey) into the ROM area 11-3 of the NAND flash memory 10 and the value of NKeyi into the hidden area 11-2.

Further, the memory vendor 30 writes the value of SecretID into the hidden area 11-2 of the NAND flash memory 10 and the value of E-SecretID into the ROM area 11-3.

With the above operation, predetermined secret information and key management information FKB can be written during manufacture of the NAND flash memory 10 (End). Regarding the order of writing each of the above values, E-SecretID is a value obtained after an encryption process and can be written after the encryption process by the encryption unit 35. Otherwise, there is no restriction on the order of writing operation and the values may be written in an order different from the order of the above example.

Further, the memory vendor 30 delivers the NAND flash memory 10 for which the write process is completed to a card vendor.

Thus, in the present embodiment, the NAND flash memory 10 can be assumed to be in a state in which index information v (index of FKey) or the like is already written.

4-2. When FKB is Written by the Card Vendor

Figure 7:
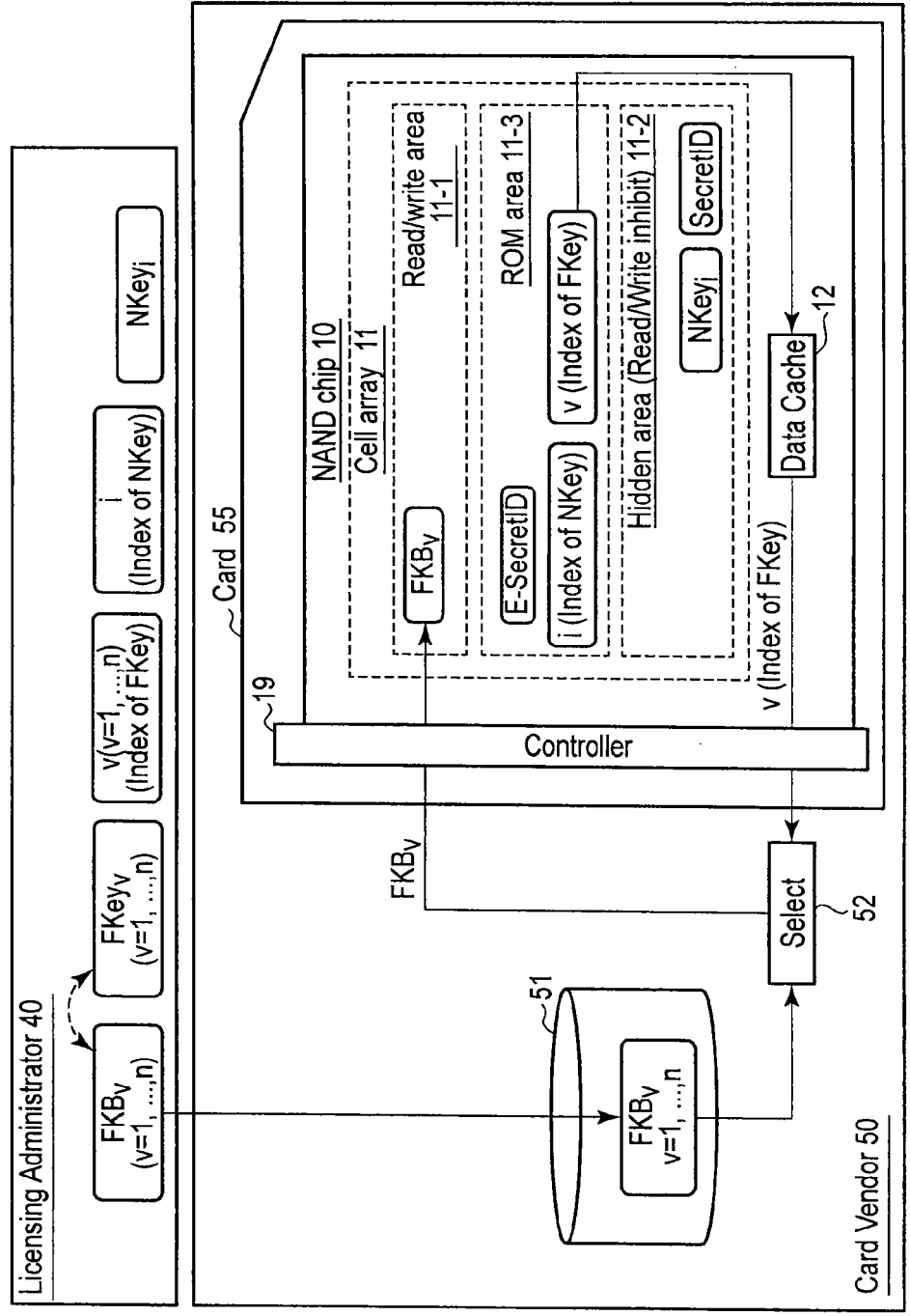
FIG. 7 is a diagram illustrating a write process of FKB by a card manufacturer according to the first embodiment.
Figure 8:
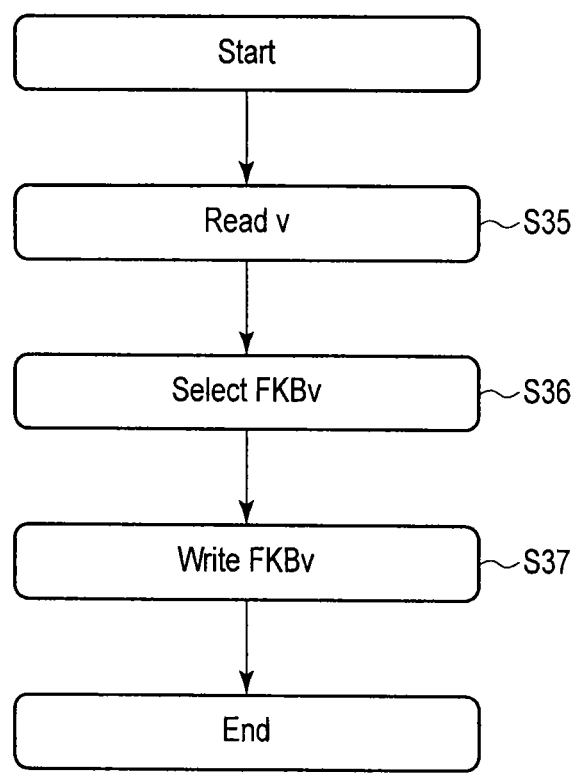
FIG. 8 is a flow chart showing a process in FIG. 7.

Next, a case where a card vendor 50 writes FKB will be described by using FIGS. 7 and 8. The description will be provided along the flow in FIG. 8.

The card vendor 50 receives the NAND flash memory 10 to which the predetermined information v and the like have been written from the memory vendor 30.

Then, the card vendor 50 manufactures storage media (here, Card) 55 for general users like, for example, SD cards by connecting the controller 19 that controls the NAND flash memory 10.

In the card vendor 50, there is a selector 52, in addition to the storage media (Card) 55 and data (FKBv) 51 received from the licensing administrator 40.

The process to write key management information FKBv by the card vendor 50 is as follows.

(Step S35)

First, the card vendor 50 receives the FKBv from the licensing administrator 40 as the data 51. For the delivery of the data 51, the above safe means is used.

Then, the card vendor 50 reads the value of the index information v recorded in the ROM area 11-3 of the NAND flash memory 10 into the data cache 12 or the like (via the controller 19).

(Step S36)

Subsequently, the card vendor 50 selects the FKBv corresponding to the value of the read index information v through the selector 52.

(Step S37)

Subsequently, the card vendor 50 writes the selected FKBv into the read/write area 11-1 of the NAND flash memory 10 via the controller 19.

<Advantageous Effects>

According to the authenticator, authenticatee and authentication method according to the first embodiment, at least the following advantageous effects (1) to (3) can be obtained.

(1) Even if secret information has leaked from the host device 20, it is possible to prevent unlawful use of secret information of the NAND flash memory 10 using the leaked information.

The host device 20 as an authenticator may be provided, as described above, not only as a dedicated hardware device such as a consumer device, but also, for example, as a program executable in a PC or the like, and, in some cases, the software functions as a substantial host device. On the other hand, the NAND flash memory 10 as an authenticatee is recording media. Even in the case where a program called "firmware" mediates, an important process or information is stored in a hidden state in hardware in the cell array 11.

Thus, there is concern that the tamper-resistance (the resistance to attacks) of software executed in a PC becomes lower, compared to the recording media. Thus, there is concern that, by attacking the host device (authenticator) 20 with a low tamper-resistance, secret information hidden in the NAND flash memory (authenticatee) 10 with a high tamper-resistance is also exposed, leading to a disguise as a device with a high tamper-resistance.

Thus, in the configuration according to the first embodiment and the authentication method therefor, as described above, the NAND flash memory 10 with a relatively high tamper-resistance hides first key information (NKeyi) that can generate second key information (HKeyi,j) therefrom in the cell array 11. On the other hand, the host device 20 hides only the second key information (HKeyi,j) that cannot generate the first key information (NKeyi) therefrom in the memory 23.

Thus, the NAND flash memory 10 generates the second key information (HKeyi,j) hidden by the authenticator 20 by using the constant HCj received from the host device 20 and the first key information (NKeyi) hidden by the NAND flash memory 10. The NAND flash memory 10 further generates a session key SKeyi,j using the second key information (HKeyi,j) and the random number RNh.

The host device 20 generates a session key SKeyi,j using the second key information (HKeyi,j) selected by the index information i and the random number RNh. As a result, the NAND flash memory 10 and the host device 20 share the same session key SKeyi,j.

Thus, in the present embodiment, the secret level of information hidden by the NAND flash memory (authenticatee) 10 and the secret level of information hidden by the host device (authenticator) 20 can be made asymmetric. In the present embodiment, for example, the secret level of information hidden by the NAND flash memory 10 with a relatively high tamper-resistance can be set higher than the secret level of information hidden by the host device 20 with a relatively low tamper-resistance.

Thus, even if information hidden by the host device 20 has leaked, the NAND flash memory 10 cannot be "disguised" by using the leaked information because the secret level of information hidden by the NAND flash memory 10 with a relatively high tamper-resistance is higher. Therefore, unlawful use of secret information of the NAND flash memory 10 using the leaked information can advantageously be prevented. As a result, for example, it becomes possible to reliably determine that ID information read from the host device 20 is information that has been read from the intended authenticatee 10 and to revoke unlawful use thereof by remote parties.

(2) Advantages for Implementation

In a configuration like the present embodiment, as described above, restrictions are also imposed on circuit scales, for example, in an environment in which hardware implementation of a public key cryptosystem process or an MKB process, which requires a relatively large circuit scale, is difficult to achieve. That is, a relatively large scale circuit is required for a public key cryptosystem process or an MKB process. On the other hand, a circuit area has been limited and hardware implementation has been difficult.

However, according to the present embodiment, though the key information is asymmetric, there is no need to use the public key cryptosystem process requiring a relatively large circuit scale. Further, by making the secret levels of information hidden by the host device (authenicator) 20 and the NAND flash memory (authenticatee) 10 asymmetric as described above, authentication means is implemented by which with information leaked from one device alone, the other device cannot be disguised and the session key SKeyi,j is shared by the authenticator 20 and the authentacee 10.

Thus, implementation can be said to be advantageous even in a severe environment in which the above restrictions are imposed. Further, as described above, the circuit scale can be further reduced by sharing the data generator and encryptor in a memory system as the same process.

(3) The Manufacturing Process can Advantageously be Simplified and Manufacturing Costs can be Reduced.

The NAND flash memory 10 according to the present embodiment includes in the read/write area 11-1 key management information (FKBv) attached uniquely to each of the NAND flash memories 10 in accordance with uses thereof or commonly to a plurality of the NAND flash memories 10 in units of the production lot or the like. Further, the NAND flash memory 10 according to the present embodiment includes in ROM area 11-3 encrypted secret identification information (E-SecretID) attached uniquely to each of the NAND flash memories 10.

If the key management information (FKBv) is made common in units of the production lot, unique information that needs to be recorded in each of the NAND flash memories 10 can be reduced to small data in data size such as the encrypted secret identification information (E-SecretID). In other words, the data size of unique encrypted secret identification information (E-SecretID) to be written into the NAND flash memories 10 can be reduced by dividing information to be written into commonly attached key management information (FKBv) and unique encrypted secret identification information (E-SecretID) and encrypting the information in two stages.

Figure 5:
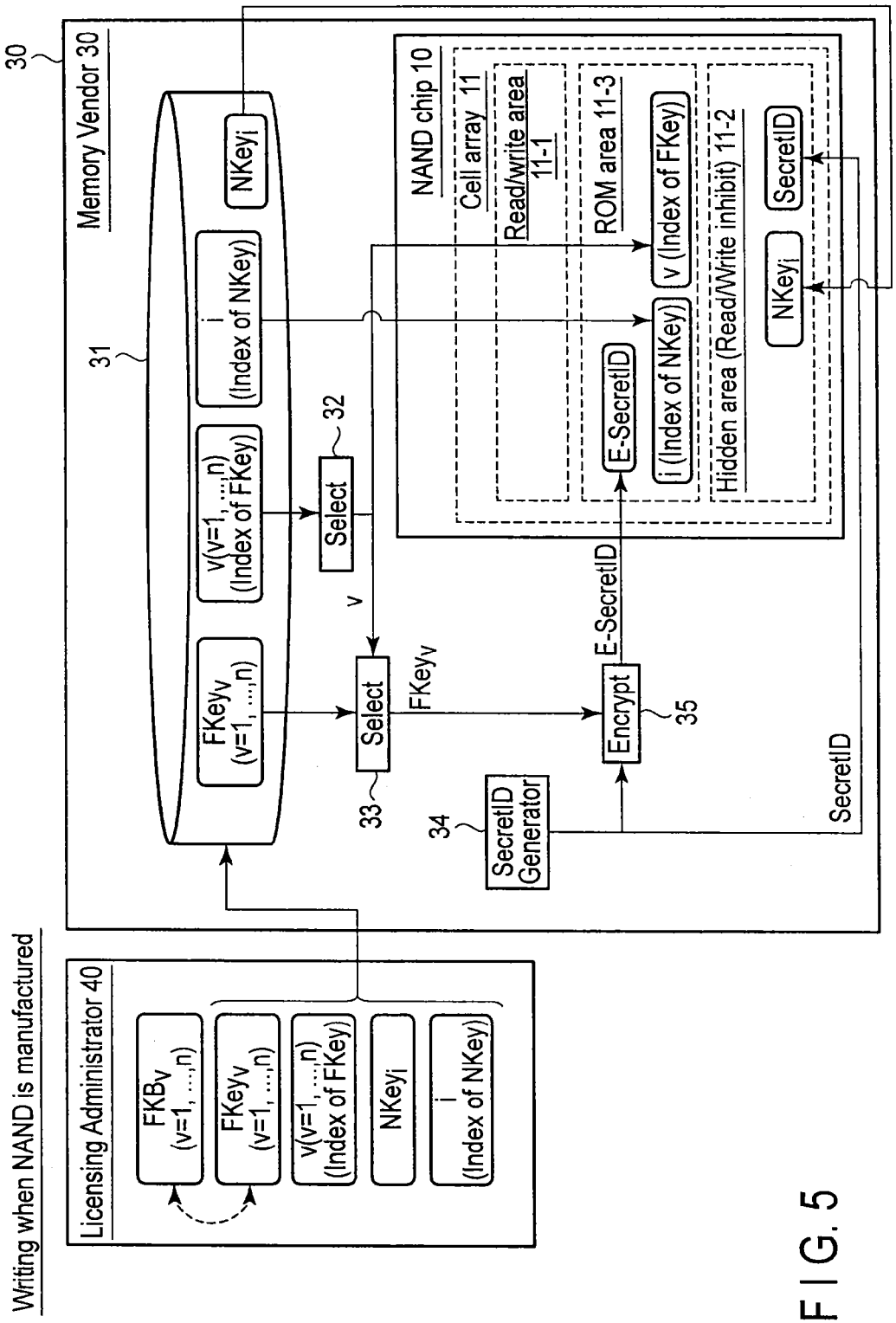
FIG. 5 is a diagram illustrating a write process of secret information by a NAND manufacturer according to the first embodiment.
Figure 6:
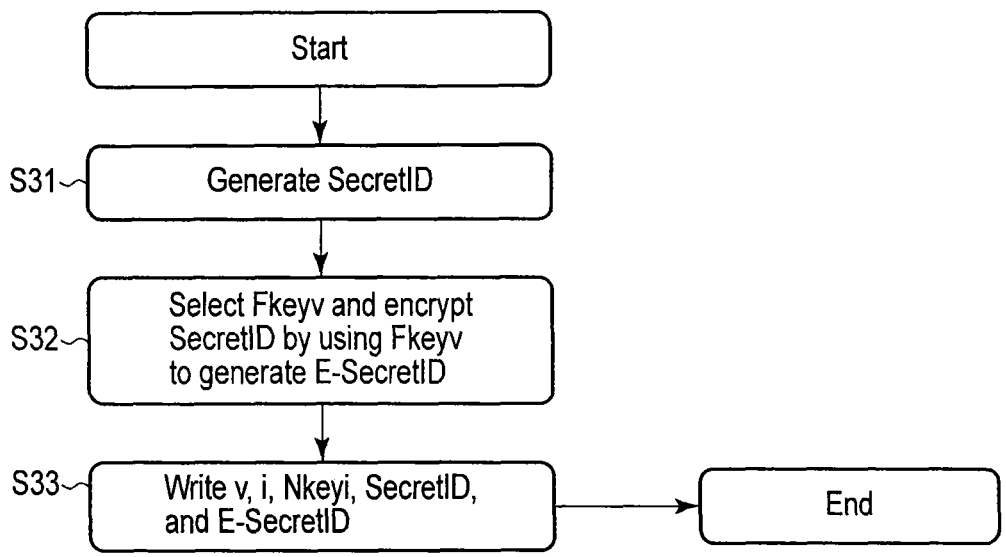
FIG. 6 is a flow chart showing a process in FIG. 5.

For example, as shown in FIGS. 5 and 6 above, the memory vendor 30 writes unique information (E-SecretID) into each of the NAND flash memories 10 received from the licensing administrator 40 during manufacture of the NAND flash memories.

The encrypted key management information (FKBv) commonly attached to the NAND flash memories 10 can commonly be written into the NAND flash memories 10 by the card vendor 50. For example, as shown in FIGS. 7 and 8 above, the card vendor 50 writes the common key management information FKBv to each of the NAND flash memories 10 received from the licensing administrator 40. Thus, the size of unique data that must be written into each of the NAND flash memories 10 by the memory vendor 30 can be reduced.

If information unique to the NAND flash memory 10 and whose data size is large is written during manufacture of the NAND flash memories 10, the manufacturing process will be more complex and the manufacturing time will be longer, leading to increased costs of manufacturing. According to the configuration and method in the present embodiment, however, such a complex manufacturing process becomes unnecessary by dividing information to be written into commonly attached key management information FKBv and unique encrypted secret identification information (E-SecretID) and encrypting the information in two stages and therefore, the manufacturing process can advantageously be simplified and manufacturing costs can be reduced. Moreover, the manufacturing time can be shortened, offering advantages of being able to reduce power consumption.

Also on the side of the host device 20, advantages similar to those of the NAND flash memory 10 can be gained by adopting a configuration of generating E-SecretID by encrypting SecretID, which is a unique value to the NAND flash memory, by using hidden information FKey and further generating key management information FKB by encrypting FKey using IDKeyk.

[First Modification (when Fkb is Downloaded and Written Later)]

An authenticator, an authenticatee, and an authentication method according to a first modification will be described. In the description, overlapping points with the first embodiment will be omitted.

<Writing FKB>

Writing an encrypted FKey bundle (FKB) will be described.

The process in the first modification is a process that is not particularly needed if the encrypted FKey bundle (FKB) is written during manufacture of the NAND flash memory 10. However, the process relates to a write process of FKB needed when the NAND flash memory 10 and the controller 19 are connected and the NAND flash memory 10 is acquired by a general user as, for example, an SD card and FKB is written later on the market when the card is used.

Figure 9:
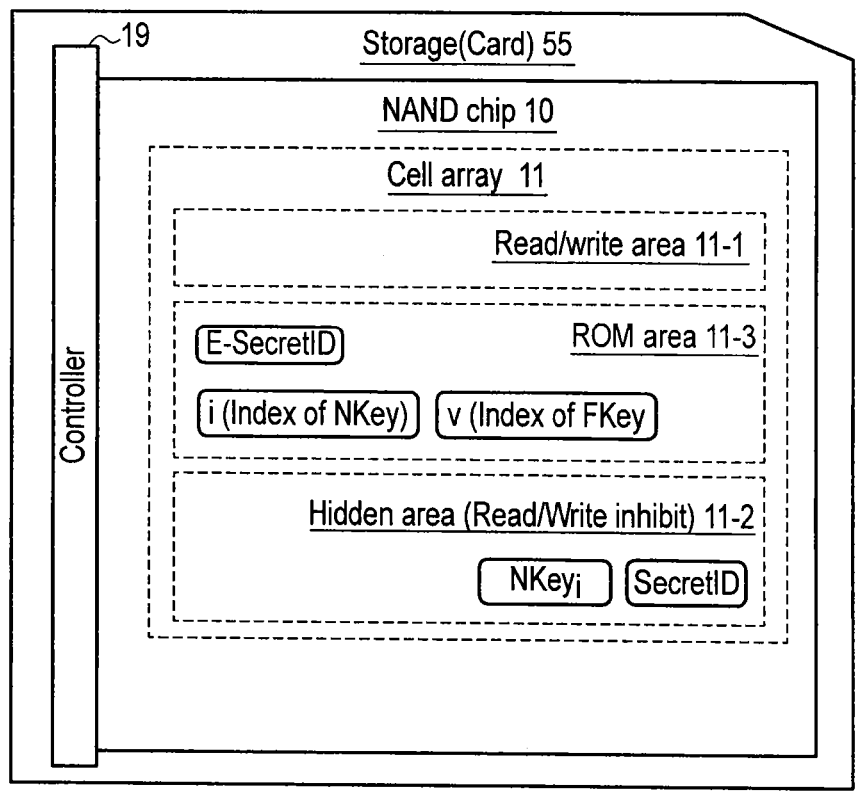
FIG. 9 is a diagram showing an authenticatee according to a first modification.

FIG. 9 shows a state in which the key management information FKB is, as described above, recorded in the unrecorded storage media (Card) 55.

As shown in FIG. 9, the NAND flash memory 10 has NKeyi and SecretID recorded in the hidden area 11-2. Index information i needed to identify the NKeyi, index information v needed to identify FKB, and SecretID (E-SecretID) encrypted by FKeyv specified by the index information v are recorded in the ROM area 11-3.

The first modification is different from the first embodiment in that the FKB, which is an encrypted FKey bundle, is not recorded in the read/write area 11-1.

Figure 10:
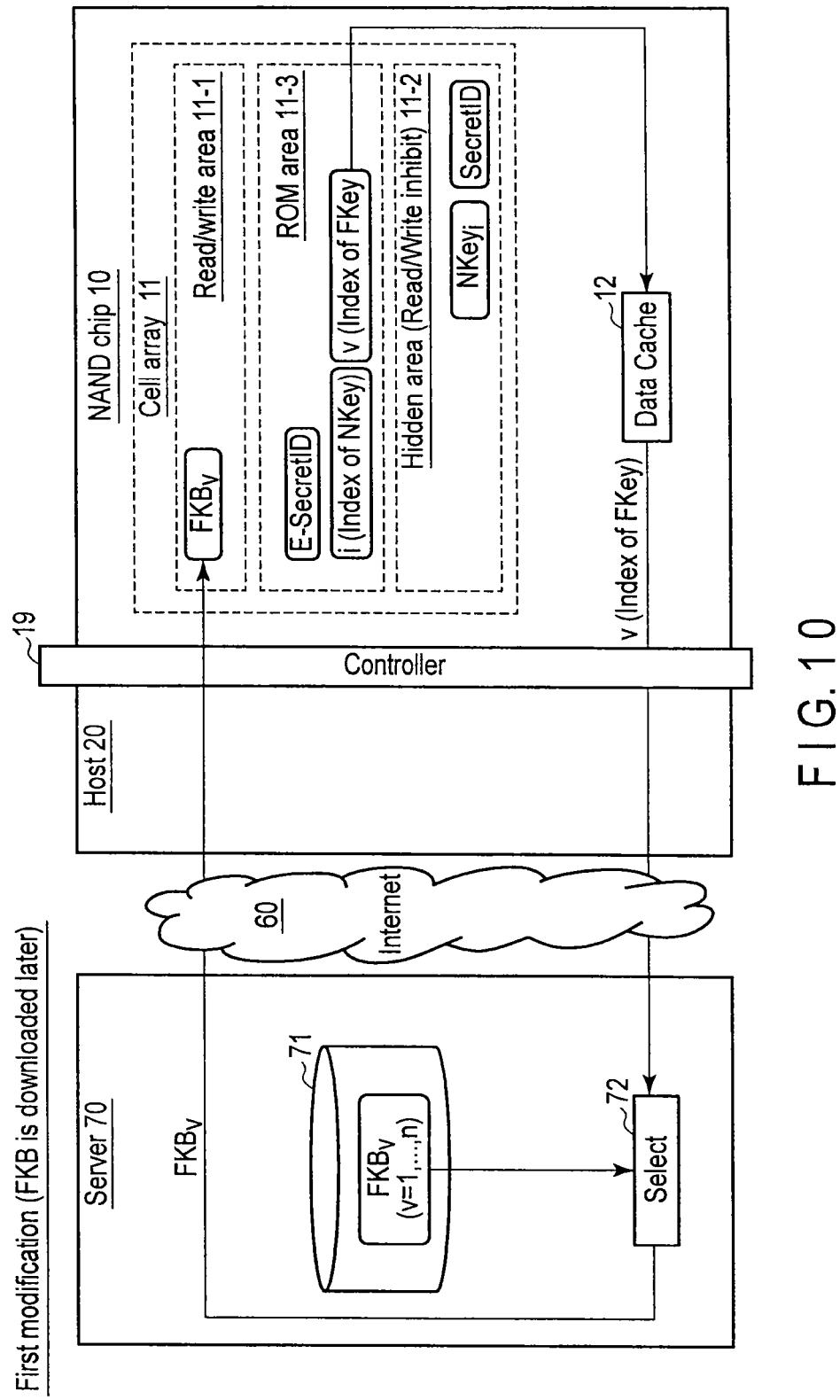
FIG. 10 is a block diagram showing a system downloading FKB according to the first modification.

Next, a case where the FKB is, as described above, downloaded from a server and recorded in the unrecorded storage media 55 will be described by using FIG. 10.

In this case, as shown in FIG. 9, the data cache 12 is arranged in the NAND flash memory 10 if necessary.

A server 70 according to the present embodiment includes an FKB data base (Set of FKBi's (i=1, . . . , x)) 71 and a selector 72 to select FKBv based on index information v.

The server 70 and the memory system (the NAND flash memory 10, the controller 19, and the host device 20) are electrically connected for communication via an Internet 60.

The host device 20 includes a function to determine whether it is necessary to newly write FKB and to request FKB from the server if necessary.

<FKB Write Flow>

Next, the flow to download an encrypted FKeyID bundle (FKB) from the server 70 and to write the FKB into the NAND flash memory 10 will be described along FIG. 11.

(Step S41)

Figure 11:
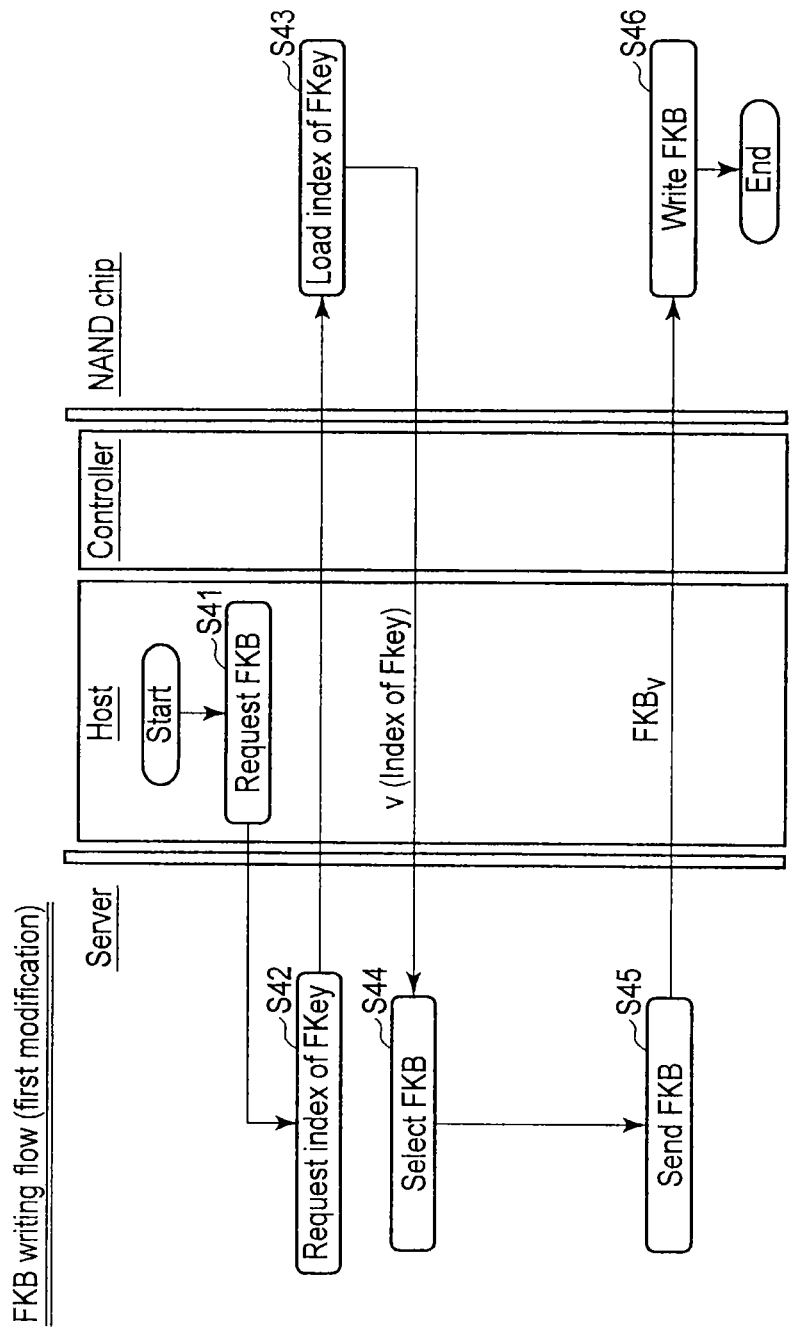
FIG. 11 is a flow chart showing a flow of downloading FKB according to the first modification.

First, as shown in FIG. 11, when the host device 20 determines that it is necessary to download FKB, FKB writing is started and the host device 20 issues an FKB request to the server 70.

(Step S42)

Subsequently, the server 70 requests index information v needed to identify FKeyv from the NAND flash memory 10.

(Step S43)

Subsequently, the NAND flash memory 10 reads v from the ROM area 11-3 and sends out v to the server.

(Step S44)

Subsequently, the server 70 selects FKBv corresponding to the received v from the FKB database 71.

(Step S45)

Subsequently, the server 70 sends out the selected FKBv to the NAND flash memory 10.

(Step S46)

Subsequently, the NAND flash memory 10 writes the received FKBv into the read/write area 11-1 for recording.

With the above operation, the download flow of the encrypted FKey bundle (FKB) according to the first modification is completed. (End).

Other configurations and operations are substantially the same as those in the first embodiment.

<Advantageous Effects>

According to the authenticator, authenticatee and authentication method according to the first modification, at least the advantageous effects (1) to (3) similar to those in the first embodiment can be obtained.

Further, according to the first modification, the present embodiment can be applied if necessary when FKB is written later.

[Second Embodiment]

Next, a second embodiment will be described. In the description, overlapping points with the first embodiment will be omitted.

In the first embodiment, after the authentication of the NAND flash memory 10 by the host device 20 is successfully completed, both share SecretID. As a process after the authentication, for example, the host device 20 encrypts content and writes the encrypted content into the NAND flash memory 10. For this process, using the shared SecretID can be considered.

The present embodiment intends to protect SecretID even in such a process. Thus, in the description, overlapping points with the first embodiment will be omitted.

<Memory System>

Figure 12:
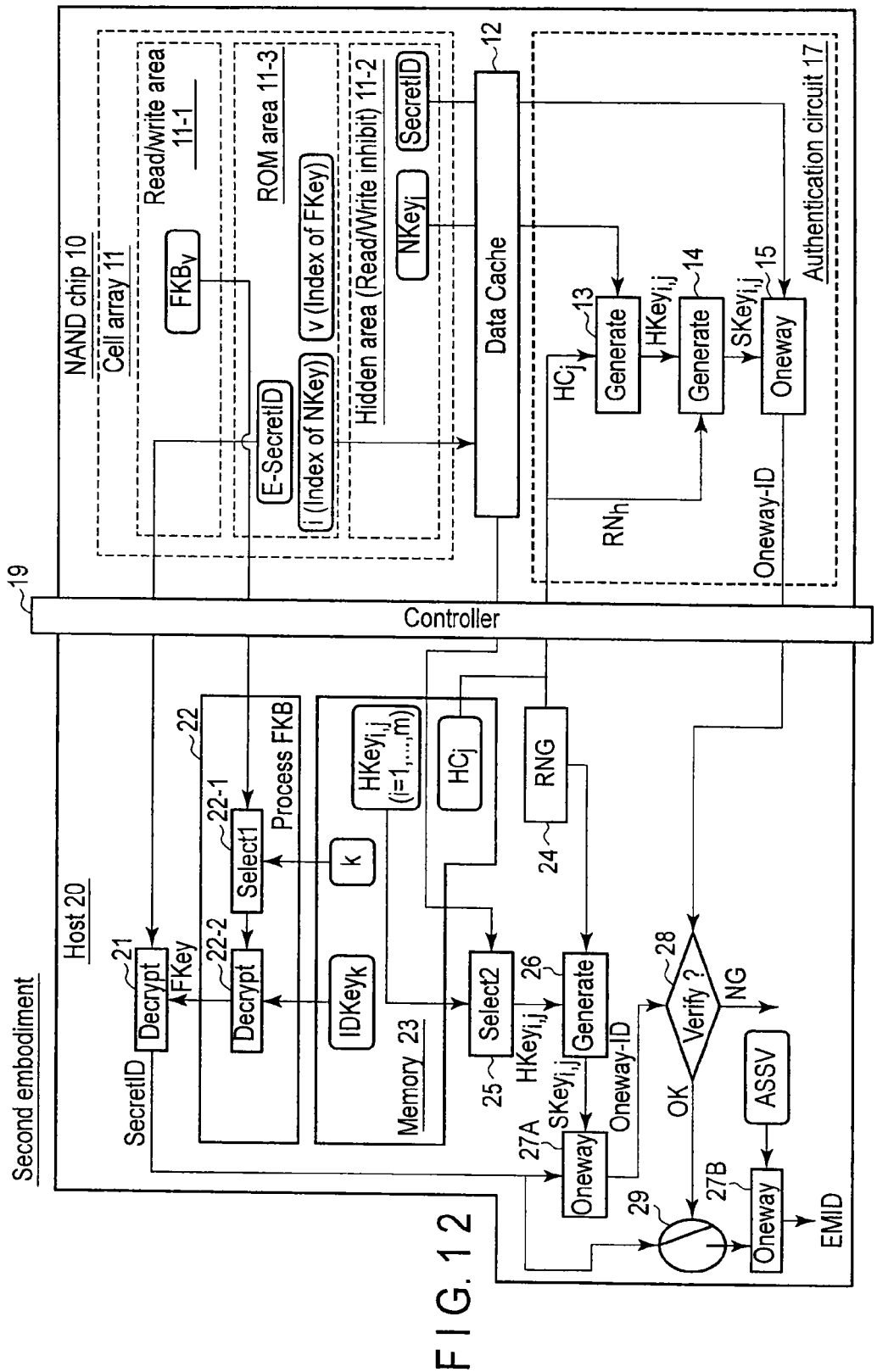
FIG. 12 and FIG. 13 are block diagrams showing a configuration example of a memory system according to second and third embodiments, respectively.

A memory system according to the second embodiment is shown as in FIG. 12.

As shown in FIG. 12, the memory system according to the present embodiment is different from that in the first embodiment in that the system further includes a one-way converter (Oneway) 27B, a switch unit 29, and information (ASSV) commonly held by all host devices 20 handling target content.

The switch unit 29 turns on a signal path to output SecretID to the one-way converter 27B if a determination result when both values of Oneway-ID match in a data verification unit (Verify) 28 (OK) is input as a control signal.

The one-way converter (Oneway) 27B converts SecretID input from the switch unit 29 by a one-way function using the information (ASSV) commonly held by all host devices handling target content to generate one-way conversion identification information EMID(EMID=Oneway(SecretID, ASSV)).

Thus, in the second embodiment, after SecretID being verified by the host device 20, the host device 20 converts SecretID using ASSV commonly held by all intended host devices to calculate EMID. Thus, the host device 20 can execute the process of content encryption and the like by using EMID, instead of SecretID.

Other configurations and operations are substantially the same as those in the first embodiment and thus, a detailed description thereof is omitted.

<Advantageous Effects>

According to the authenticator, authenticatee and authentication method according to the second embodiment, at least the advantageous effects (1) to (3) similar to those in the first embodiment can be obtained.

Further, the second embodiment is different from the first embodiment in that the host device 20 further includes the information (ASSV) commonly held by the one-way converter (Oneway) 27B, the switch unit 29, and all host devices handling target content.

According to the above configuration, after the secret identification information SecretID being verified by the host device 20, the host device 20 converts the secret identification information SecretID using the information (ASSV) commonly held by all intended host devices to calculate one-way conversion identification information EMID. Thus, the host device 20 can execute the process of content encryption and the like by using the one-way conversion identification information EMID, instead of the secret identification information SecretID.

As a result, though not shown, the one-way conversion identification information EMID can be used for content encryption in a postprocess and thus, the secret identification information SecretID can be prevented from being leaked in the postprocess, further advantageously increasing confidentiality of the secret identification information SecretID. Details thereof will be described below.

[Third Embodiment]

Next, a third embodiment will be described. The third embodiment relates to an example in which a NAND flash memory 10 authenticates a host device 20. The present embodiment shows a method of reading SecretID in the NAND flash memory 10 in a state hidden from third parties and also of reliably determining that the data has been read from the NAND flash memory 10 and also a method by which the NAND flash memory 10 inspects the host device 20.

In the description, overlapping points with the above embodiments will be omitted.

<Memory System>

A memory system according to the third embodiment will be described by using FIG. 13.

Figure 13:
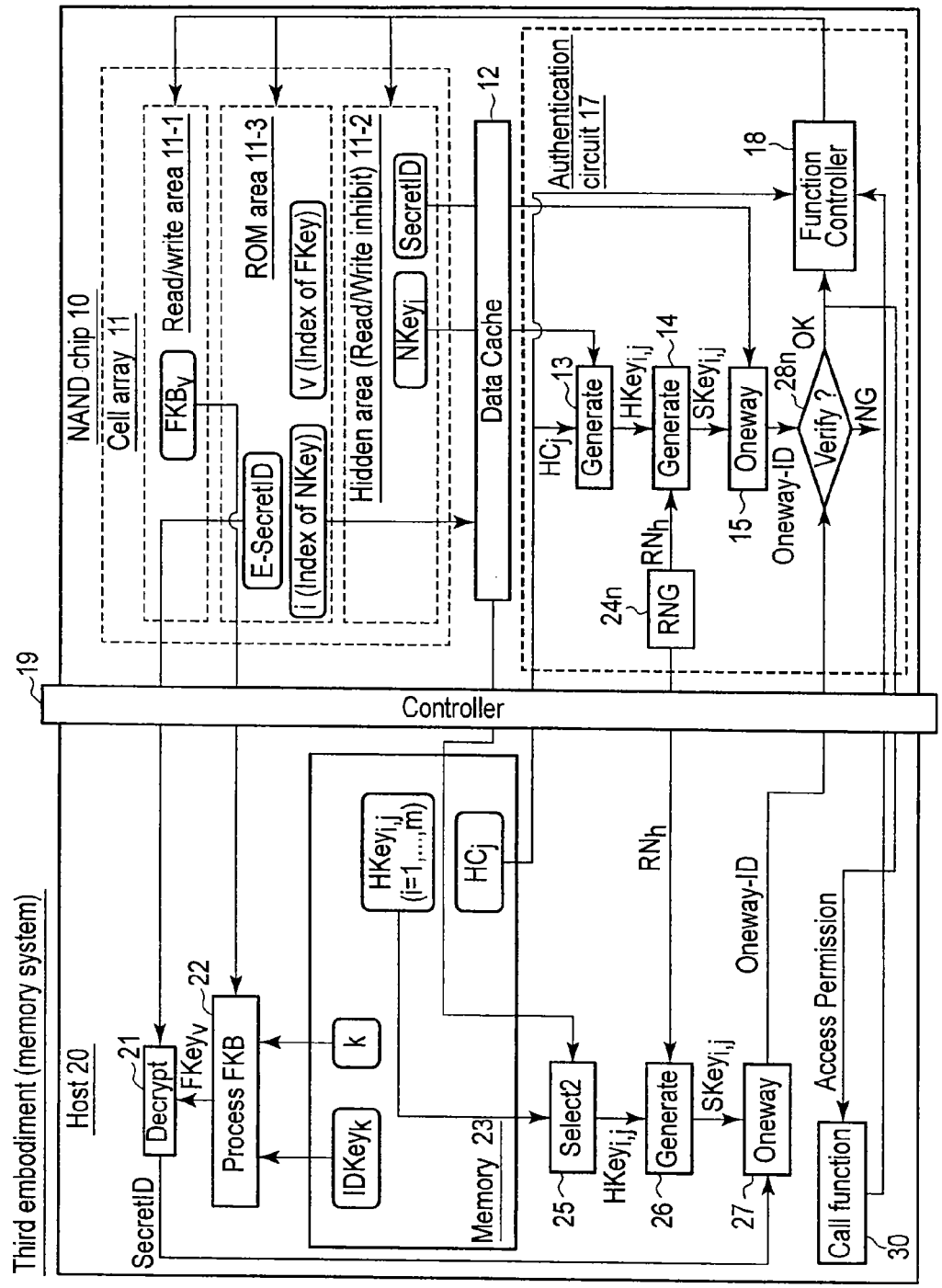

As shown in FIG. 13, the present embodiment is different from the first embodiment in that the NAND flash memory 10 further includes a function controller 18, a random number generator 24*n*, and a data verification unit 28*n*, and the host device 20 further includes a function call unit 30.

The random number generator (RNG) 24*n* generates a random number RNn used for authentication.

The data verification unit (Verify) 28*n* compares Oneway-ID received from the host device 20 and Oneway-ID obtained from a one-way converter 15 in the NAND flash memory 10 to see whether both Oneway-IDs match. If both values match, the data verification unit 28*n* determines that the host device 20 has obtained the correct Oneway-ID (OK) and if both values do not match, the data verification unit 28*n* determines that the host device 20 has not obtained the correct Oneway-ID (NG).

Only if the host device 20 obtains the correct Oneway-ID (OK), the function controller 18 enables a predetermined function on a memory cell array 11 so that the predetermined function of the NAND flash memory 10 is made available to the host device 20. Further, HCj received from the host device 20 may be input to the function controller 18 so that the predetermined function is controlled in accordance with HCj. The predetermined function will separately be described below.

The function call unit 30 executes the process of calling a predetermined function of the NAND flash memory 10 when the host device 20 receives access permission information (labeled with "Access Permission" in FIG. 13) indicating that the NAND flash memory 10 has verified the authenticity of Oneway-ID generated by the host device 20.

<Authentication Flow>

Next, the authentication flow of a memory system according to the third embodiment will be described along FIG. 14.

(Steps S11 to S14)

Figure 14:
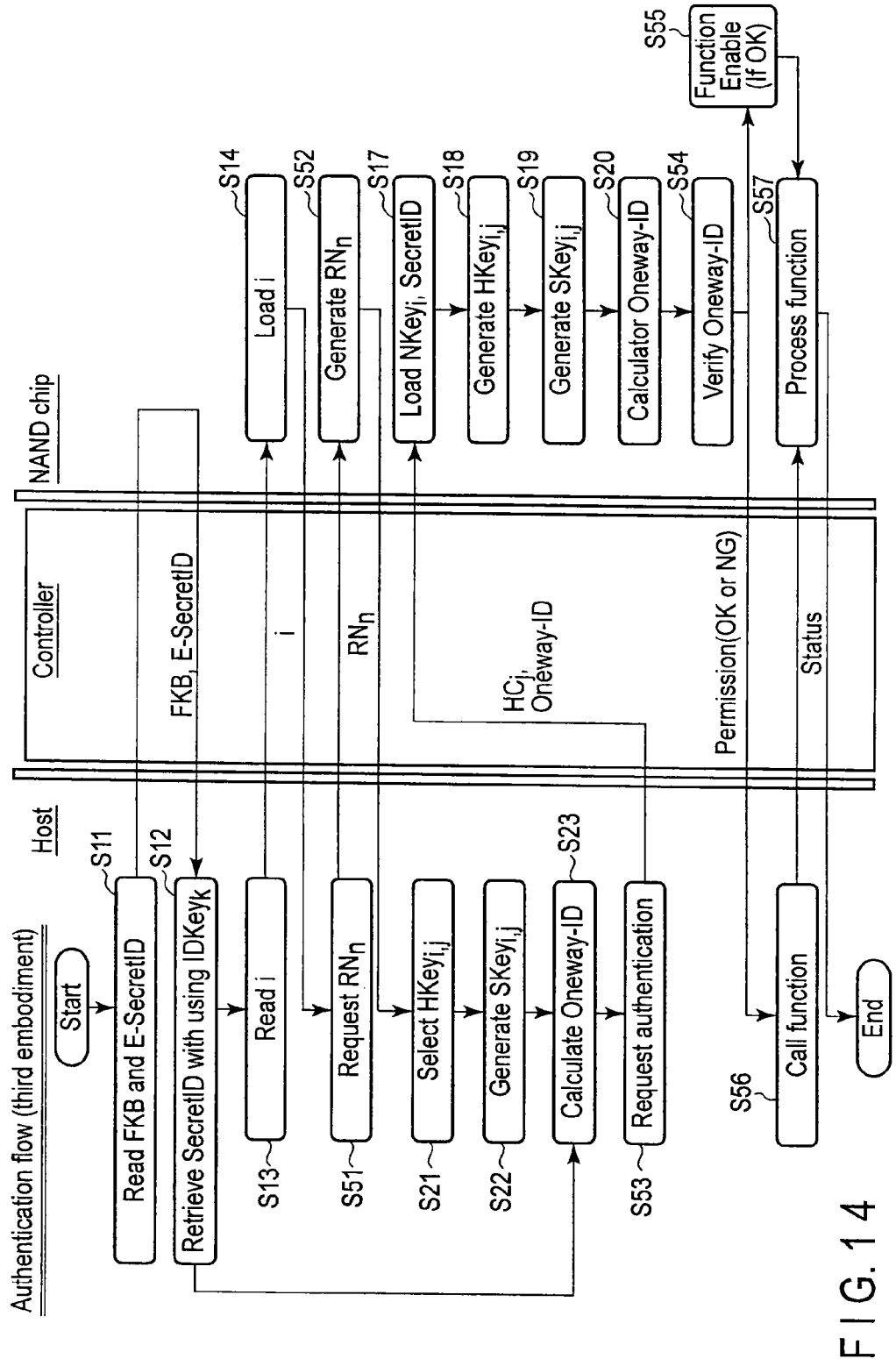
FIG. 14 is a flow chart showing the authentication flow of the memory system according to the third embodiment.

As shown in FIG. 14, the same process as in the first embodiment is executed from the authentication start (Start) to steps S11 to S14.

(Step S51)

Subsequently, when index information i is received, the host device 20 sends out a random number generation request (Request RNn) to the NAND flash memory 10.

(Step S52)

Subsequently, the NAND flash memory 10 receives the request and generates RNn by the random number generator 24*n*. The generated RNn is sent out to the host device 20.

(Steps S21 to S23)

Subsequently, the host device 20 executes a process similar to steps S21 to S23 in the first embodiment.

(Step S53)

Subsequently, the host device 20 requests for an authentication (Request authentication) to the NAND flash memory 10 and sends out HCj and Oneway-ID.

(Steps S17 to S20)

Subsequent to a process similar to steps S17 to S19 described above, in step S20, the NAND flash memory 10 executes a one-way conversion process by the one-way converter 15 on SecretID by using the generated SKeyi,j to generate Oneway-ID (=Oneway(SKeyi,j, SecretID)).

(Step S54)

Subsequently, the NAND flash memory 10 verifies that the received Oneway-ID and generated Oneway-ID by the NAND flash memory 10 match. If both Oneway-IDs match (OK), the NAND flash memory 10 determines that the SecretID is an authentic ID and if both Oneway-IDs do not match (NG), the NAND flash memory 10 determines that the SecretID is an unlawful ID. Then, the NAND flash memory 10 returns the determination result to the host device 20 and also gives permission (Permission) of call acceptance of a predetermined function.

(Step S55)

Subsequently, if the determination result in step S54 is a match (OK), the NAND flash memory 10 enables a predetermined function in the function controller 18 so that the predetermined function of the NAND flash memory 10 is made available to the host device 20.

(Step S56)

Subsequently, if the host device 20 receives access permission information (Access Permission) indicating that the NAND flash memory 10 has verified authenticity of Oneway-ID generated by the host device 20, the host device 20 returns an instruction to call the predetermined function through the function call unit 30.

(Step S57)

Subsequently, the NAND flash memory 10 receives a function call and executes the process in the function controller 18 according to the function call instruction received from the host device 20 to return a status (Status) of the process result.

In this case, HCj received from the host device 20 may be input to the function controller 18 so that the predetermined function is controlled in accordance with HCj. The predetermined function will separately be described below.

<Advantageous Effects>

According to the authenticator, authenticatee and authentication method according to the third embodiment, at least the advantageous effects (1) to (3) similar to those in the first embodiment can be obtained. Further, at least the following advantageous effects (4) and (5) can be obtained.

(4) The NAND flash memory 10 can authenticate the host device 20.

The present embodiment is different from the first embodiment in that the NAND flash memory 10 further includes the function controller 18, the random number generator 24*n*, and the data verification unit 28*n*, and the host device 20 further includes the function call unit 30.

Thus, according to the above configuration, the authentication function can be controlled in such a way that, for example, when the host device 20 accesses the NAND flash memory 10, the NAND flash memory 10 provides a predetermined function only if the host device 20 is reliable enough.

Thus, according to the present embodiment, recording media such as NAND flash memories that are normally authenticatees can advantageously authenticate the host device 20 the other way round.

(5) A mechanism that further controls whether to provide a predetermined function in accordance with unique information (constant HCj) of the authenticated host device 20 can advantageously be provided. Details of the predetermined function will be described below.

[Fourth Embodiment (Mutual Authentication)]

Next, a fourth embodiment will be described. The fourth embodiment relates to an example in which a NAND flash memory 10 and a host device 20 mutually authenticate.

In the description, overlapping points with the above embodiments will be omitted.

<Memory System>

A memory system according to the fourth embodiment will be described by using FIG. 15.

Figure 15:
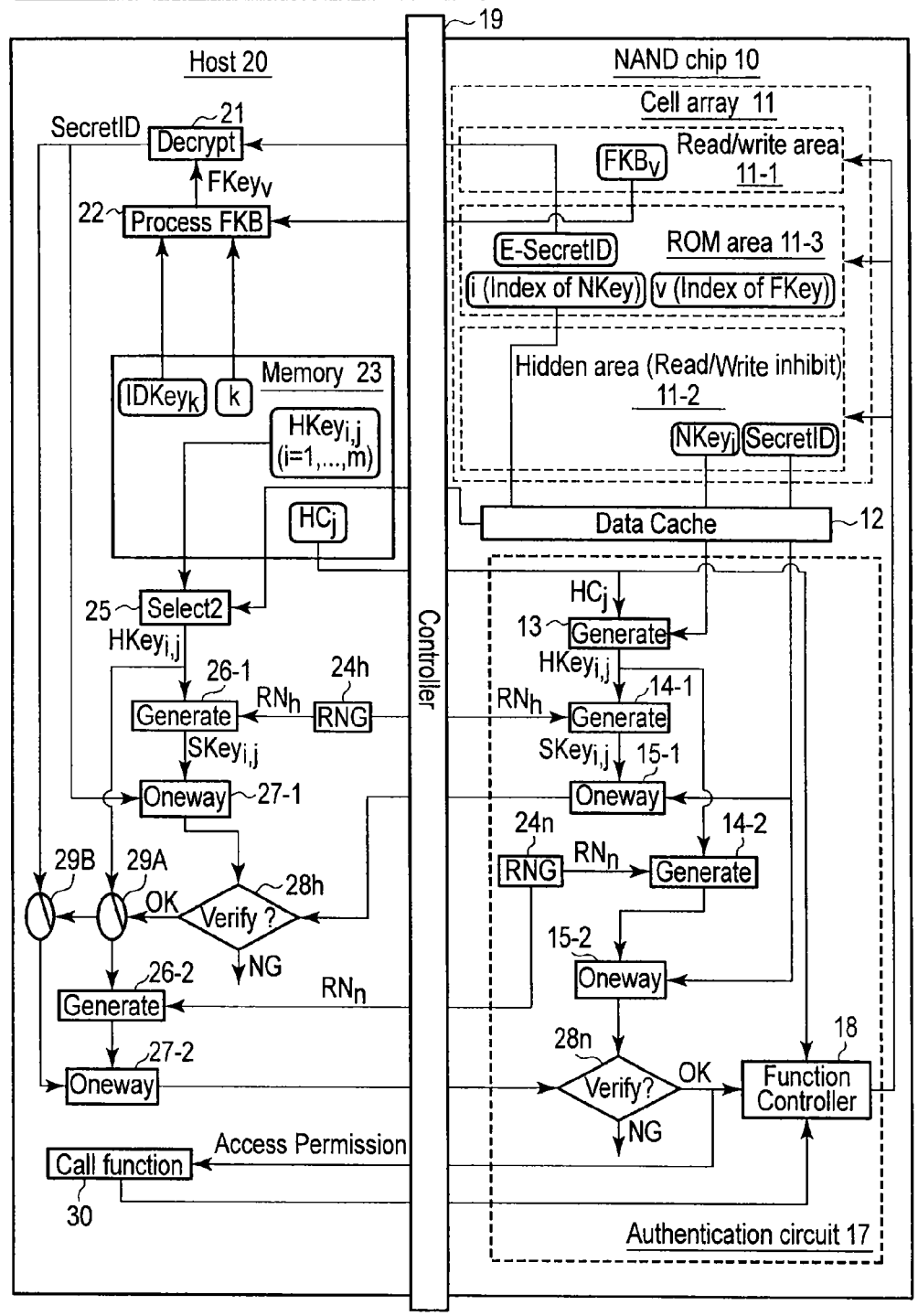
FIG. 15 is a block diagram showing a configuration example of a memory system according to a fourth embodiment.

As shown in FIG. 15, the present embodiment includes a configuration substantially combining a memory system according to the first embodiment and a memory system according to the third embodiment.

More specifically, the NAND flash memory 10 and the host device 20 include random number generators 24*n*, 24*h*, generators 14-2, 26-2, one-way converters 15-2, 26-2, and data verification units 28*n*, 28*h*. Further, the present embodiment is different from the third embodiment in that the host device 20 further includes a switch unit 29B.

The operation of each of the configurations is the same as in the above embodiments.

<Authentication Flow>

Figure 16:
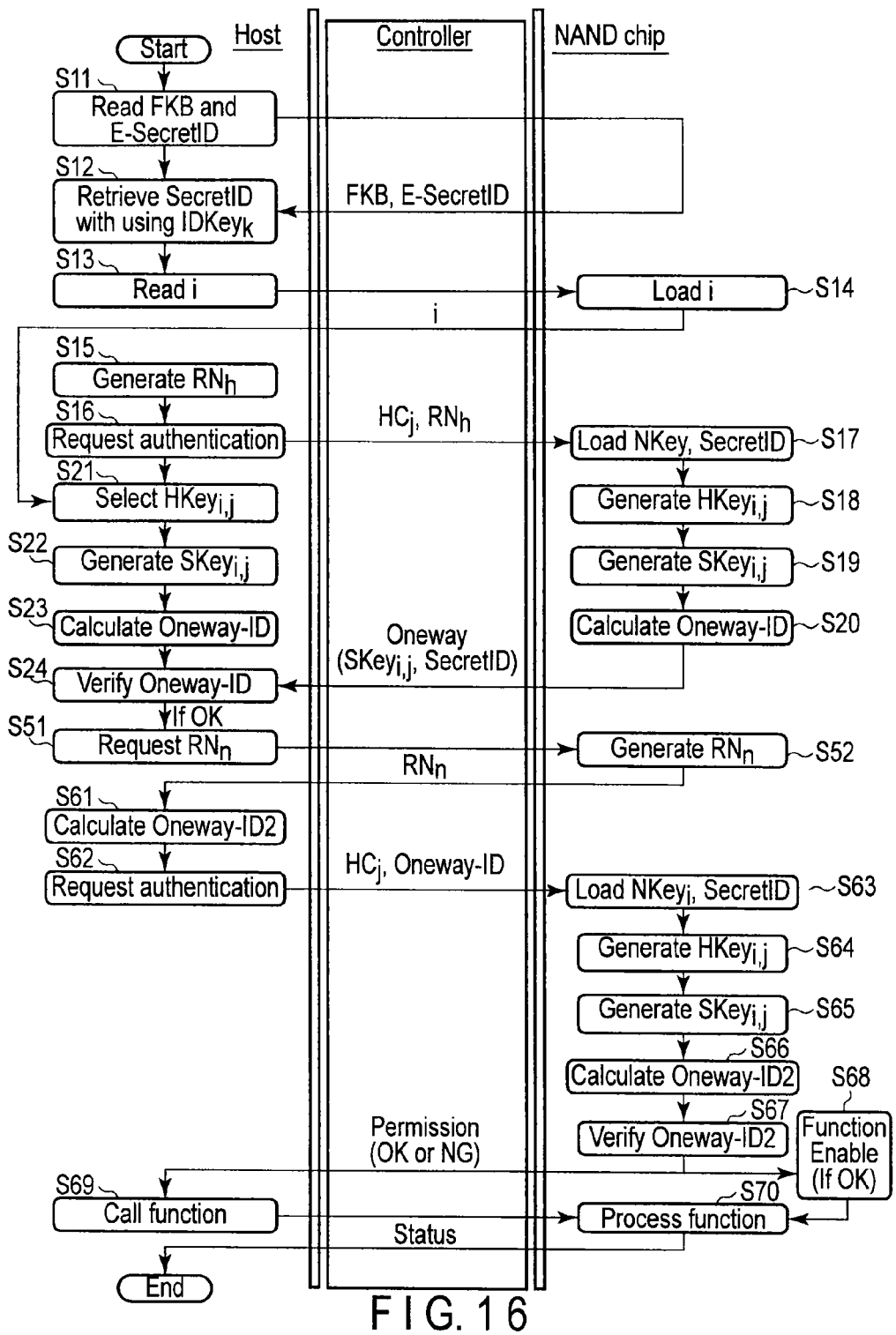
FIG. 16 is a flow chart showing the authentication flow of the memory system according to the fourth embodiment.

Next, the authentication flow of a memory system according to the fourth embodiment will be described along FIG. 16. In principle, the authentication flow according to the present embodiment performs an authentication operation (the host device authenticates the NAND flash memory) according to the first embodiment and then performs an authentication operation (the NAND flash memory authenticates the host device) according to the third embodiment.

(Steps S11 to S24)

As shown in FIG. 15, when the authentication is started (Start), first the host device 20 authenticates the NAND flash memory 10 by following steps S11 to S24 similar to those in the first embodiment.

At this point, similar authentication is performed by using a random number RNh generated by the random number generator 24h.

(Steps S51 to S70)

Subsequently, if the determination result in step S24 is a match (OK), the authentication of the NAND flash memory 10 is determined to be completed.

Subsequently, the NAND flash memory 10 authenticates the host device 20 by following steps S51 to S70 similar to those in the third embodiment.

At this point, similar authentication is performed by using a random number RNn generated by the random number generator 24n.

With the above steps, the authentication operation according to the fourth embodiment is completed (End).

<Configuration Example of the Function Control>

Next, a configuration example of the function control will be described by using FIG. 17.

The function control is a control method of a predetermined function according to the third and fourth embodiments by which, when the NAND flash memory 10 is an authenticator and the host device 20 is an authenticatee, the NAND flash memory 10 authenticates the host device 20 and provides the predetermined function to the host device 20 based on the authentication result.

Figure 17:
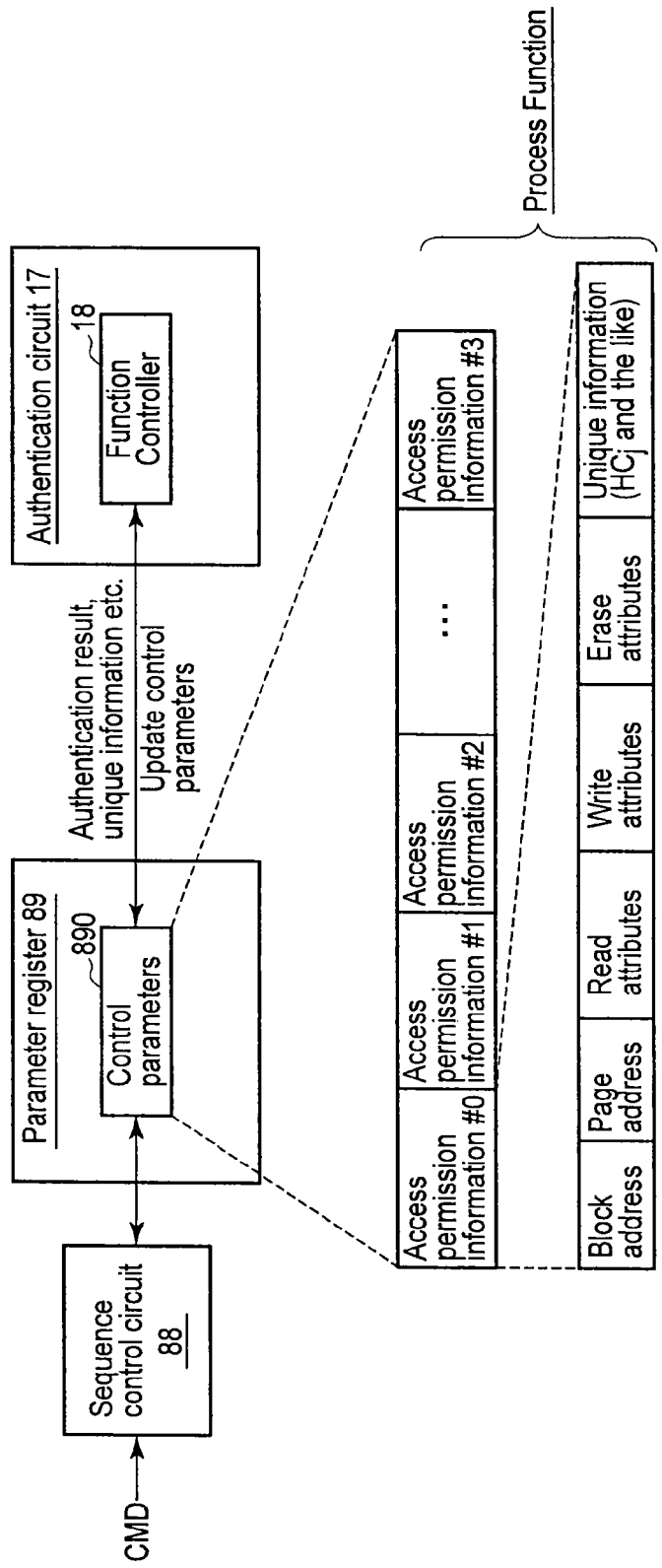
FIG. 17 is a block diagram showing a configuration example of function control according to the third or fourth embodiment.

The configuration of the function control shown in FIG. 17 is included in each of the NAND flash memories 10. The function control includes a function controller 18 included in an authentication circuit 17, a parameter register 89, and a sequence control circuit 88.

The function controller 18 contained in the authentication circuit 17 controls functions to provide the predetermined function to the host device 20 based on an authentication result or unique information (constant HCj or the like) of the host device 20 if necessary. The function controller 18 updates control parameters 890 contained in the parameter register 89 based on an authentication result or unique information of the host device 20.

The control parameters 890 in the parameter register 89 contain at least one piece of access permission information (#0, #1, . . . , #3). For example, the access permission information #0 contains block addresses, page addresses, read attributes, write attributes, erase attributes, and unique information, or the like. A block address shows control of the memory cell array 11 associated with the block address. A page address shows control of the memory cell array 11 associated with the page address. A read attribute shows read permission information associated with a block address, or a block address and a page address. A write attribute shows write permission information associated with a block address, or a block address and a page address. An erase attribute shows erase permission information associated with a block address, or a block address and a page address. Unique information indicates that the access permission information is a control parameter of the host device 20 having the specific information.

Each piece of the access permission information (#0, #1, . . . , #3) does not have to contain all the above information and may contain information in accordance with the needed control level. For example, specific information may not be contained if the control based on the unique information (such as the constant HCj) of the host device 20 is not needed. Further, the page address may not be contained if the control in units of pages is not needed. Further, the block address may not be contained if the control in any block address is not needed and, for example, the control is intended for a predetermined block only or the whole NAND flash memory 10. Similarly, regarding read attributes, write attributes, and erase attributes, only those attributes of functions that need the control may be contained.

The sequence control circuit 88 controls an operation sequence in accordance with a command (CMD) provided by the host device 20 according to the control parameters 890. For a data read command, for example, the sequence control circuit 88 controls, based on read attributes of the access permission information in the control parameters 890, the operation of reading (Read) data or rejecting to read data in accordance with the provided read command. If reading is permitted in the read attributes, data can be read from a cell array 11. In addition, the above operation example applies also to the data write operation and data erase operation.

<Advantageous Effects>

According to the authenticator, authenticatee and authentication method according to the fourth embodiment, at least the advantageous effects (1) to (5) similar to those described above can be obtained.

According to the present embodiment, the NAND flash memory 10 and the host device 20 can mutually authenticate.

Further, the NAND flash memory 10 according to the present embodiment realizes the function control by the configuration shown in FIG. 17. The sequence control circuit 88 can control an operation sequence in accordance with the provided command according to the control parameters 890. Thus, the host device 20 authenticated by the NAND flash memory 10 can advantageously be permitted (Process function) to execute various function processes of the updated control parameters 890 based on unique information (constant HCj or the like) of the host device 20.

Further, the NAND flash memory 10 according to the present example can include the function control of the configuration shown in FIG. 17 along with the third and fourth embodiments.

[Fifth Embodiment (Configuration Example of the NAND Flash Memory)]

Next, a fifth embodiment will be described. The fifth embodiment relates to a configuration example of a NAND flash memory 10 to which an authentication function according to the first to fourth embodiments is applied.

In the description, overlapping points with the above embodiments will be omitted.

<Overall Configuration Example of the NAND Flash Memory>

An overall configuration example of the NAND flash memory 10 according to the fifth embodiment will be described by using FIG. 18.

Figure 18:
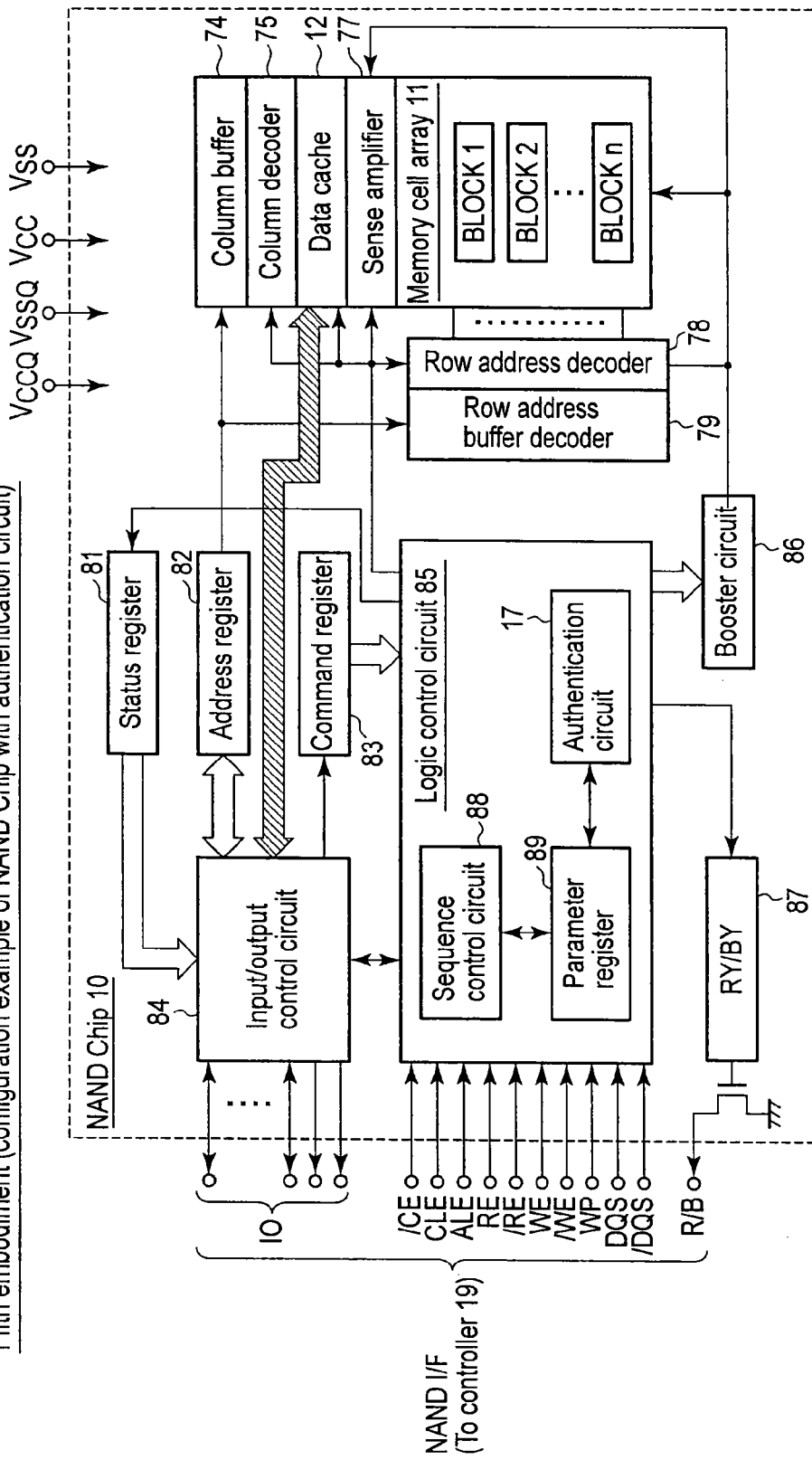
FIG. 18 is a block diagram showing an overall configuration example of a NAND chip according to a fifth embodiment.

As shown in FIG. 18, the NAND flash memory 10 includes a memory cell array 11 and a peripheral circuit.

The memory cell array 11 includes a plurality of blocks BLOCK1 to BLOCKn. The configuration of each block, which will be described with reference to FIG. 19, contains a plurality of memory cell transistors MC, word lines WL, and bit lines BL. Data in the memory cell transistors MC in each block is erased by one operation. Data cannot be erased in units of memory cell transistors or pages. That is, individual blocks are the minimum erasure units.

The peripheral circuit includes a sense amplifier 77, an input/output control circuit 84, and a logic control circuit 85.

The sense amplifier 77 reads data of a memory cell (memory cell transistor MC) in the memory cell array 11 via the bit line BL and detects the state of a memory cell in the memory cell array 11 via the bit line BL.

A data cache 12 temporarily holds data read from the sense amplifier 77 or data to be supplied to the sense amplifier 77.

A column decoder 75 selects the specific bit line BL, sense amplifier or the like based on an address signal supplied via an IO terminal from outside the NAND flash memory 10.

A column address buffer 74 temporarily holds address signals to supply the address signals to the column decoder 75.

A row decoder 78 receives various voltages needed for reading, writing, or erasing data from a voltage generator 86 to apply such voltages to the specific word lines WL based on an address signal.

A row address buffer decoder 79 temporarily holds address signals to supply the address signals to the row decoder 78.

The voltage generator 86 receives reference power supply voltages VSS, VCC, voltages VSSQ, VCCQ and the like to generate a voltage needed for writing, reading, or erasing data from these voltages.

The input/output control circuit 84 receives various commands that control the operation of the NAND flash memory 10, address signals, and write data via the IO terminal and also outputs read data. Address signals output from the input/output control circuit 84 are latched by an address register 82. Latched address signals are supplied to the column address buffer 74 and the row address buffer decoder 79. Commands output from the input/output control circuit 84 are latched by a command register 83. A status register 81 holds various status values for the input/output control circuit 84.

The NAND flash memory 10 receives various control signals for controlling a command, address, I0 terminal for data input/output, and operation from outside as an external interface (NAND I/F). Control signals include, for example, a chip enable/CE, command latch enable CLE, address latch enable ALE, read enable RE and /RE, write enable WE and /WE, write protect WP, and clocks DQS, /DQS.

These control signals are received at corresponding terminals, and then transferred to the logic control circuit 85. The logic control circuit 85 controls the input/output control circuit 84 based on control signals to permit or inhibit a signal on the terminal IO from reaching the address register 82, the command register 83, a page buffer 12 or the like as a command, address, or data via the input/output control circuit 84. The logic control circuit 85 also receives a latched command from the command register 83.

Of control signals, a WE terminal supplies a data input clock, an RE terminal supplies a data output clock, a DQS terminal transmits a data input/output clock, a CLE terminal is intended for enabling that input data input as a command, an ALE terminal is intended for enabling that inputs data input as an address, and a CE terminal is intended to enable overall functions of data input/output.

An R/B terminal indicates an internal operating state of the NAND flash memory 10, a WP terminal transmits a write prevention signal to prevent erroneous writing, and Vcc/Vss/Vccq/Vssq terminals are used to supply power. Also in the present embodiment, a /RE terminal, /WE terminal, and /DQS terminal that transmit respective complementary signals are present for the RE terminal, WE terminal, and DQS terminal as terminals (Toggle) used when data transmission is realized by a high-speed interface.

The logic control circuit 85 includes a sequence control circuit 88, a parameter register 89, and an authentication circuit 17. The logic control circuit 85 also manages output of a ready/busy signal (R/B). More specifically, the logic control circuit 85 outputs a busy signal while the NAND flash memory 10 is busy.

The sequence control circuit 88 receives a command from the command register 83. The sequence control circuit 88 controls the sense amplifier 77, the voltage generator 86 and the like so that the process (such as reading, writing, or erasing data) instructed by the command can be performed based on the received command.

The parameter register 89 holds a variety of the control parameters 890 specifying the operation of the logic control circuit 85. The control parameters 890 are referred to or updated by the sequence control circuit 88 and used for control of a sequence of the logic control circuit 85 or the input/output control circuit 84.

The authentication circuit 17 executes the process related to the authentication. For example, as described above, the authentication circuit 17 also updates data, for example, rewrites the control parameters 890 contained in the parameter register. The authentication circuit 17 receives a command requesting the authentication and performs a specific operation for the authentication by using specific data in the memory cell array 11 to output the result out of the memory 10. In the process of executing a series of operations, the authentication circuit 17 permits the sequence control circuit 88 to read or write necessary data through updates of the control parameters 890.

A ready/busy circuit (RY/BY) 87 makes a notification of an R/B signal out of the NAND flash memory 10 via a switch transistor under the control of the logic control circuit 85.

<Configuration Example of the Block (BLOCK)>

Figure 19:
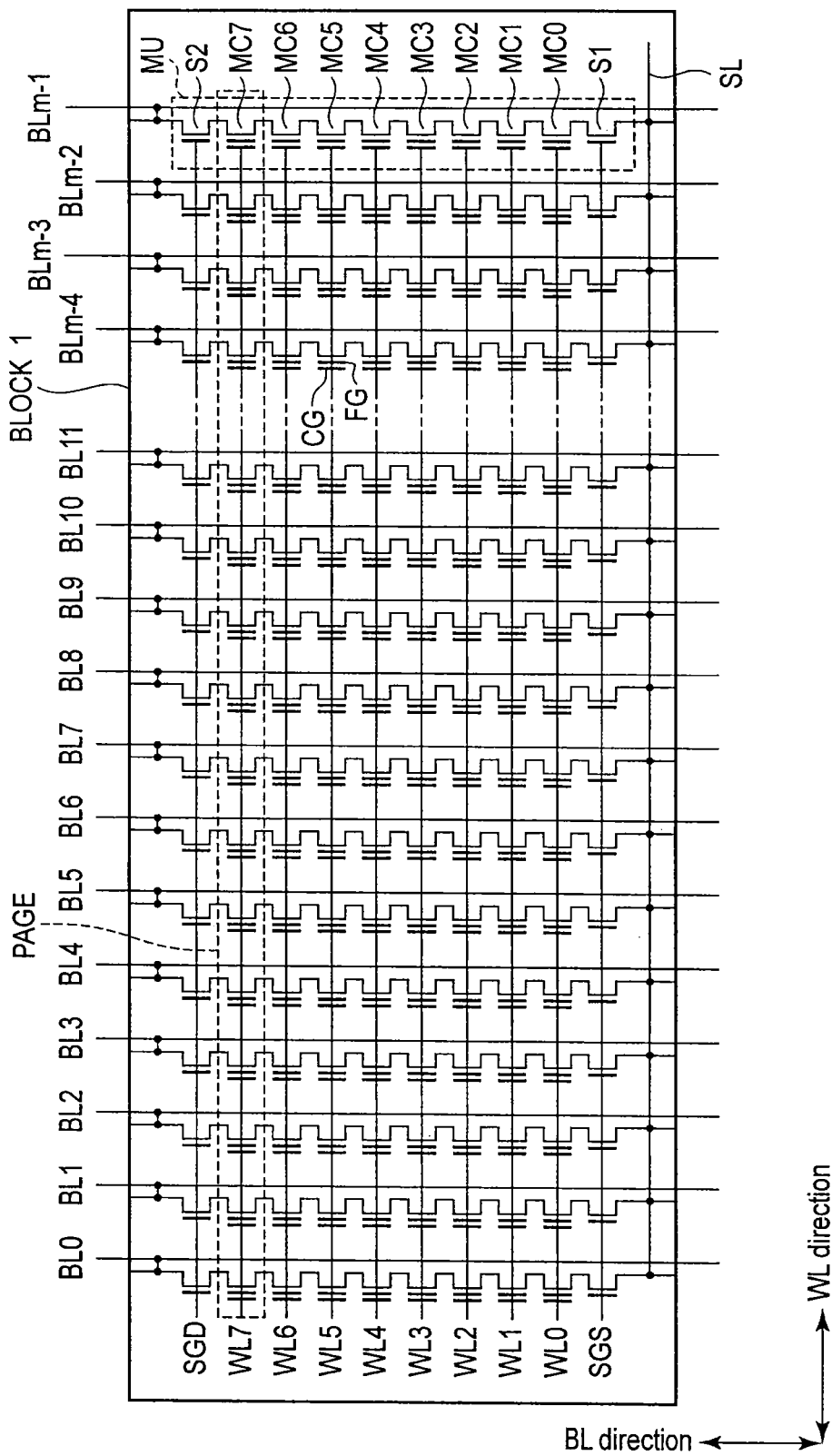
FIG. 19 is an equivalent circuit diagram showing a configuration example of one block of the NAND chip in FIG. 18.

Next, a configuration example of the block (BLOCK) forming the memory cell array 11 will be described by using FIG. 19. BLOCK1 in FIG. 18 is taken as an example for the description. Data in memory cells in the block BLOCK1 is erased, as described above, by one operation and thus, the block is the unit of data erasure.

The block BLOCK1 includes a plurality of memory cell units MU arranged in a word line direction (WL direction). The memory cell unit MU includes a NAND string (memory cell string) formed of eight memory cells MC0 to MC7 arranged in a bit line direction (BL direction) intersecting the WL direction and whose current path is connected in series, a select transistor S1 on the source side connected to one end of the current path of the NAND string, and a select transistor S2 on the drain side connected to the other end of the current path of the NAND string.

In the present embodiment, the memory cell unit MU includes eight memory cells MC0 to MC7, but may include two memory cells or more, for example, 56 or 32 memory cells and the number of memory cells is not limited to 8.

The other end of the current path of the select transistor S1 on the source side is connected to a source line SL. The other end of the current path of the select transistor S2 on the drain side is connected to a bit line BL provided above each memory cell unit MU corresponding to the memory cell unit MU and extending in the BL direction.

The word lines WL0 to WL7 extend in the WL direction to be commonly connected to control gate electrodes CG of a plurality of memory cells in the WL direction. A select gate line SGS extends in the WL direction to be commonly connected to a plurality of select transistors S1 in the WL direction. A select gate line SGD also extends in the WL direction to be commonly connected to a plurality of select transistors S2 in the WL direction.

A page (labeled with "PAGE" in FIG. 19) exists for each of the word lines WL0 to WL7. For example, as shown by being surrounded with a broken line in FIG. 19, page 7 (PAGE7) exists in the word line WL7. Because a data read operation or data write operation is performed for each page (PAGE), the page (PAGE) is the data read unit and the data write unit.

Configuration Example of the Cell Array

Next, the structure of the memory cell array 11 will be shown by using FIGS. 20A, 20B, 20C, and 20D.

Figures 20A, 20B, 20C, 20D:
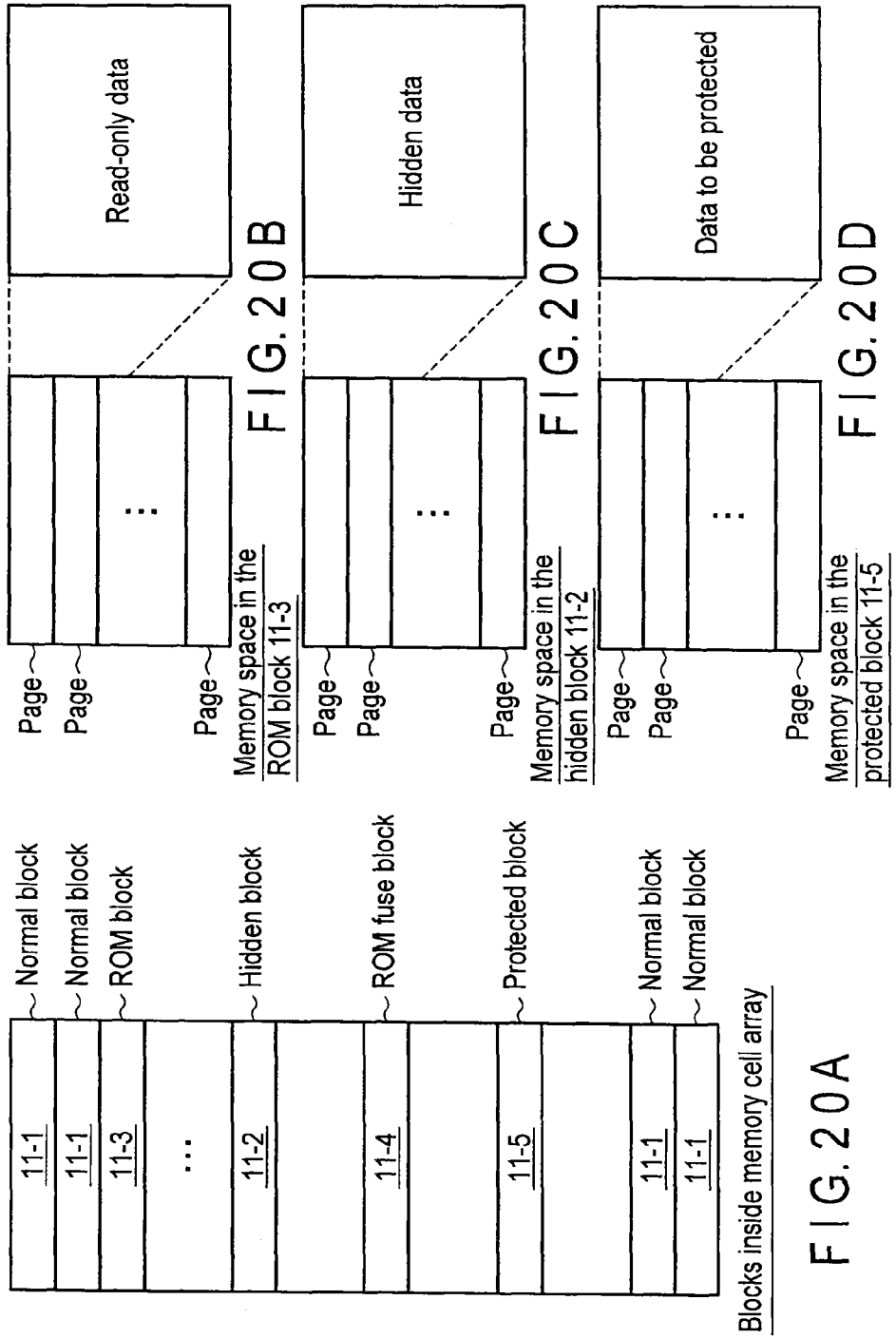
FIG. 20A, 20B, 20C, and 20D are block diagrams showing configuration examples of a cell array according to the fifth embodiment.

As shown in FIG. 20A, the memory cell array 11 includes a plurality of blocks (BLOCK) of a normal block 11-1, a hidden block 11-2, a ROM block 11-3, a ROM fuse block 11-4, a protected block 11-5 and the like. Each block includes, as described above, a plurality of pages. Normally, data is read or written in units of pages and data is erased in units of blocks.

As described above, both data writing and data reading are permitted to the normal block 11-1, which is used for normal data holding. The normal block corresponds to the above read/write area 11-1. The number of blocks is not specifically limited.

As described above, the hidden block 11-2 and the ROM block 11-3 are applied to the above authentication operation. The hidden block 11-2 corresponds to the above hidden area 11-2. The ROM block 11-3 corresponds to the above ROM area 11-3. The number of blocks is not specifically limited in both cases.

In the present embodiment, as shown in FIG. 20B, read-only data is further recorded in the memory space of the ROM block 11-3.

In the present embodiment, as shown in FIG. 20C, hidden data is further recorded in the memory space of the hidden block 11-2.

In the present embodiment, as shown in FIG. 20D, protected data used by the authentication function described below is further recorded in the memory space of the protected block 11-5.

The ROM fuse block 11-4 is used, for example, for holding parameters for operation control of the NAND flash memory 10.

<Read-Only Data in the ROM Block>

Next, read-only data in the ROM block 11-3 will be described by using FIG. 21.

Figure 21:
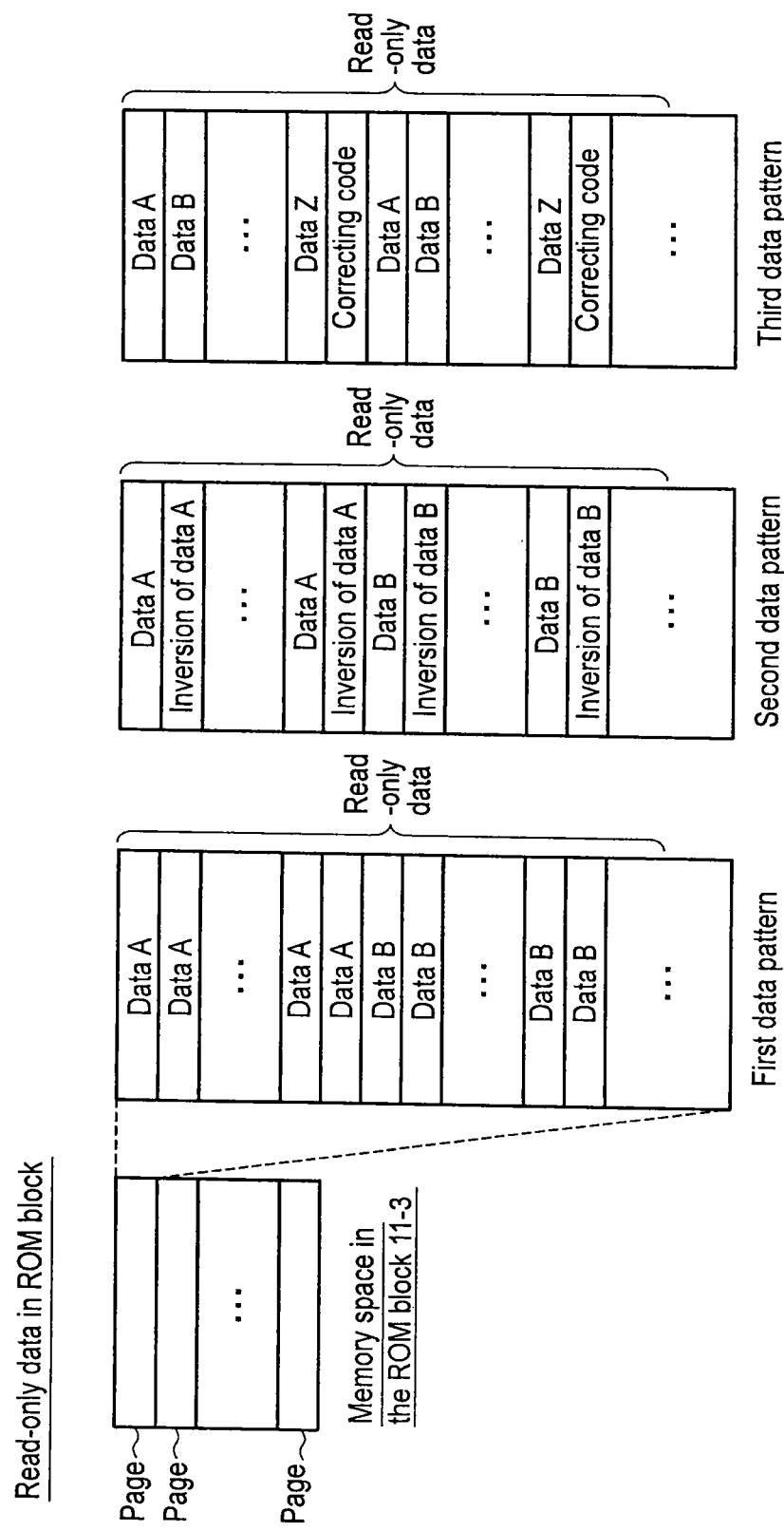
FIG. 21 is a diagram showing read-only data in a ROM block according to the fifth embodiment.

As shown in FIG. 21, read-only data is recorded in some page in the memory space of the ROM block 11-3. If read-only data is a sequence of read-only data A to Z, FIG. 21 shows three examples of data patterns intended for error correction of data.

As shown in first data pattern, the first data pattern is an example of repeatedly recording the same data (A, A, . . . , B, B, . . . ). In this case, error corrections can be made by reading read-only data repeatedly by the host device 20 and making a majority vote determination by an error correction unit in the host device 20 or the like. Alternatively, error corrections can be made by reading read-only data repeatedly by the controller 19 and making a majority vote determination by an error correction unit in the controller 19 or the like. Alternatively, error corrections can be made by making a majority vote determination of read-only data read repeatedly by an error correction unit in the NAND flash memory 10. For example, the number of times of repetition is desirably 16 times or more.

As shown in a second data pattern of FIG. 21, the second data pattern is an example of repeatedly recording a complementary data pair formed of data (A, B, . . . ) and inverted data thereof (inversion of A, inversion of B, . . . ). In this case, error corrections can be made by reading read-only data repeatedly by the host device 20 and making a majority vote determination in consideration of complementary data pairs by an error correction unit in the host device 20 or the like. Alternatively, error corrections can be made by reading read-only data repeatedly by the controller 19 and making a majority vote determination in consideration of complementary data pairs by an error correction unit in the controller 19 or the like. Alternatively, error corrections can be made by making a majority vote determination in consideration of complementary data pairs of read-only data read repeatedly by an error correction unit in the NAND flash memory 10.

The reason why complementary data pairs are repeatedly recorded is due to an error mode of the NAND flash memory 10. The NAND flash memory 10 writes data by applying a predetermined voltage to the memory cell MC to inject electrons into a floating gate FG. Data is read by using a threshold voltage that varies depending on whether electrons are present in the floating gate FG of the memory cell MC. Data is erased by applying a voltage in the opposite direction of the voltage when data is written to extract electrons from the floating gate FG into the substrate. Though the amount of voltage application and a gate applied with the voltage in reading, writing, and erasing data are different, the voltage is applied in the memory cell MC in all these cases. Typical error modes of the NAND flash memory 10 caused by this principle include read program disturb and data retention problem. Read program disturb is an error mode in which data changes due to a change of the amount of electrons in the floating gate FG after repeatedly reading the local or adjacent pages or writing data into adjacent pages. Thus, a state of the memory cell changes to a weak program state, increasing the threshold voltage in most cases. Data retention problem is an error mode in which data changes because electrons are drawn from the floating gate after a page once written being left for a long time. Thus, a state of the memory cell changes to a weak erasure state, decreasing the threshold voltage in most cases. That is, there is a general trend of increase or decrease in these defective modes and thus, errors of data are likely to occur in the same direction.

Thus, by recording data as complementary data as shown in second data pattern of FIG. 21, because if data is 1 (unrecorded), inverted data thereof is 0 (recorded), both pieces of data shift in the 0 direction (increase of threshold voltage) for read program disturb and conversely in the 1 direction (decrease of threshold voltage) for data retention. Thus, whether at least an error has occurred can be determined more easily by storing complementary data. In this case, for example, the complementary data pair is desirably repeated at least eight times in the data pattern.

As shown in third data pattern of FIG. 21, the third data patters is an example in which an error correcting code is further used in addition to read-only data (A, B, . . . Z). Because random errors occur in the NAND flash memory 10 in units of bits, for example, the BCH code, the LDPC code or the like capable of correcting random bit errors is desirable as the error correcting code.

In each example of the first to third data patterns, each piece of data may be randomized. Randomize is to make data to be recorded random by a method of, for example, calculating an exclusive OR of a generated random sequence and data to be recorded to eliminate data biases. The M sequence or the like may be used as the generation method of a random sequence.

In addition, in all examples of the first to third data patterns, each piece of data is recorded in a binary state. The binary state is a method of recording data by determining whether the threshold voltage in one memory cell belongs to a high level or a low level by setting one predetermined level as a reference and can hold information of 1 bit per memory cell. Such a recording method is generally called an SLC (Single Level Cell) recording. On the other hand, if data is recorded by determining to which level the threshold voltage in one memory cell belongs by setting a plurality of predetermined levels as a reference, information of a plurality of bits can be held by each memory cell. If, for example, four levels to which the threshold voltage belongs for recording, information of 2 bits can be held by each memory cell. Such a recording method is generally called an MLC (Multi Level Cell) recording. While the MLC recording can realize higher recording densities due to a larger recording capacity per cell, changes of recorded data with respect to shifts of the threshold voltage occur relatively more easily. Thus, it is desirable to record read-only data recorded in the ROM block 11-3 with a smaller number of bits per cell than normal data. In MLC of 4-level recording in which the number of bits per cell is 2, ROM data is desirably SLC-recorded. In MLC of 8-level recording in which the number of bits per cell is 4, ROM data is desirably recorded as MLC of 4-level recording in which the number of bits per cell is 2 or SLC-recorded.

<Configuration Example of ECC>

Next, a configuration example for performing the error correcting code (ECC) correction will be described.

The first to third data structures shown in FIG. 21 described above are different in a strict sense, but are considered to be correcting codes ECC in a broad sense that redundancy is attached to the original data. Thus, each data structure is considered to include data and a correcting code attached to the data. It is necessary for at least of the host device 20, the controller 19, and the NAND flash memory 10 to have the corresponding correcting function.

Figure 22:
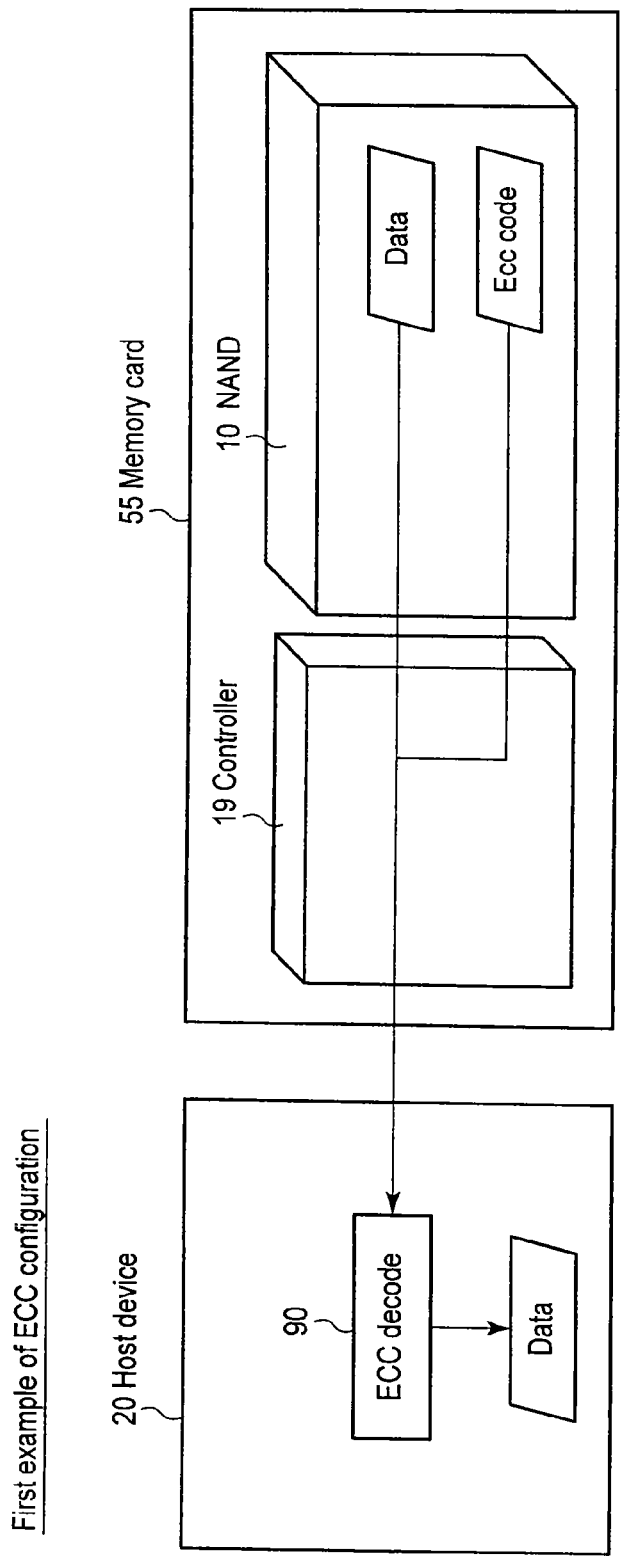

A first example shown in FIG. 22 is an example in which the host device 20 has a correcting function (ECC decode) 90. In this case, the controller 19 and the NAND flash memory 10 do not execute a correcting process and deliver signed data (Data) to the host device 20 and the host device 20 executes the correcting process through the correcting function (ECC decode) 90 to generate predetermined data (Data).

A second example shown in FIG. 23 is an example in which the controller 19 has the correcting function (ECC decode) 90. In this case, the NAND flash memory 10 does not execute the correcting process and the controller 19 executes the correcting process and delivers corrected data (Data) to the host device 20.

Figure 24:
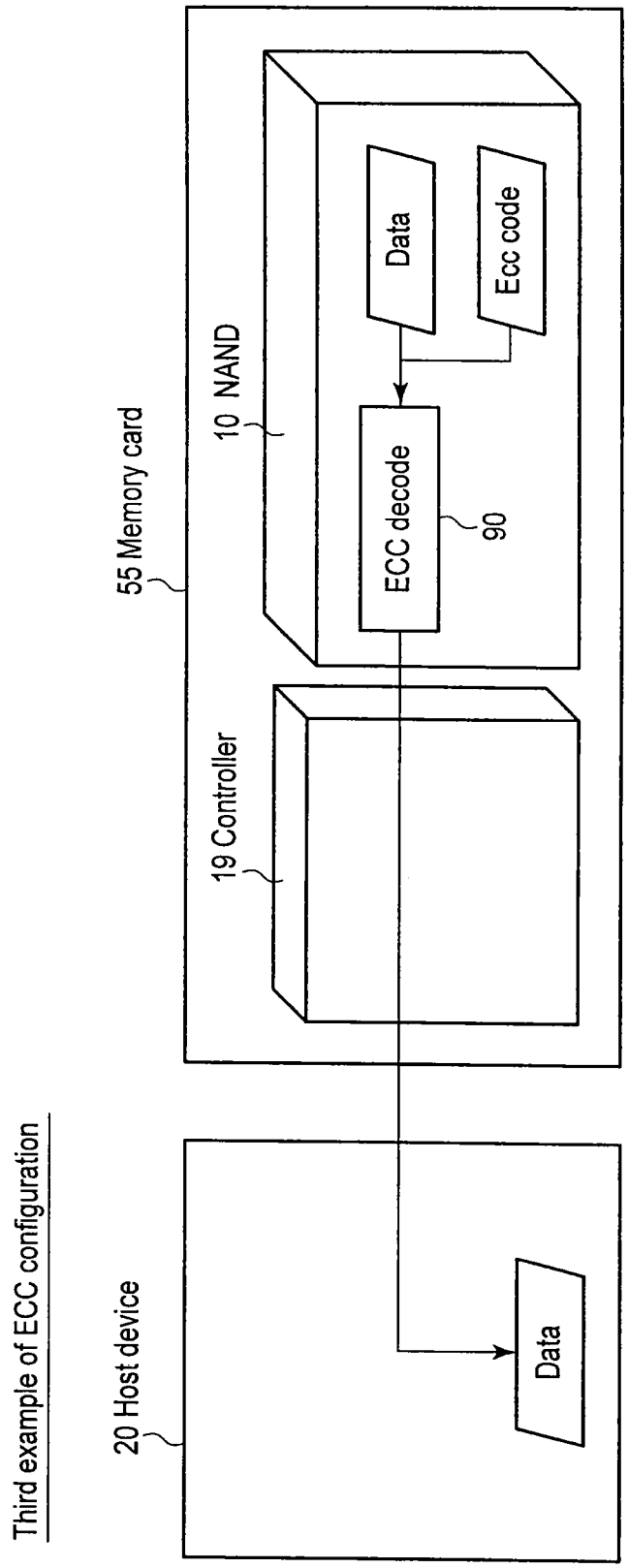

A third example shown in FIG. 24 is an example in which the NAND flash memory 10 has the correcting function (ECC decode) 90. In this case, the NAND flash memory 10 executes the correcting process and delivers corrected data (Data) to the host device 20 via the controller 19.

A fourth example shown in FIG. 25 is an example in which both of the controller 19 and the host device 20 have correcting functions 90-1, 90-2. In this case, first the attached correcting code has a double structure and the controller 19 and the host device 20 each execute the correcting process of an inner code (Inner code) or outer code (Outer code).

However, the present embodiment is not limited to the above cases and the NAND flash memory 10, the controller 19, and the host device 20 can each correct errors while in collaboration in accordance with the correcting function of each.

<Hidden Data in the Hidden Block 11-2>

Next, an example of the holding state of hidden data in the hidden block 11-2 will be described by using FIG. 26.

Figure 26:
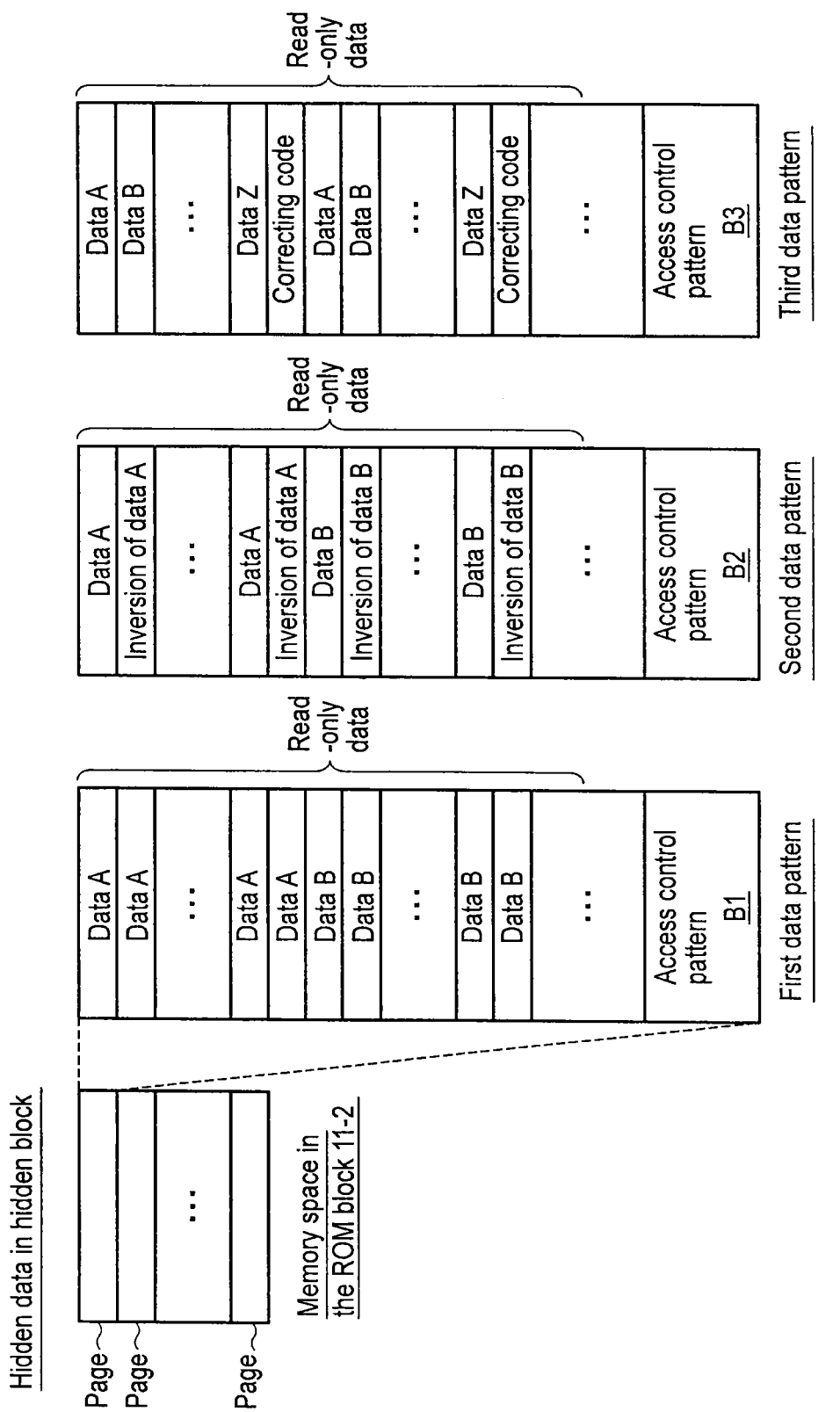
FIG. 26 is a diagram showing confidential data in a confidential block according to the fifth embodiment.

As shown in FIG. 26, hidden data is recorded in pages in the memory space of the hidden block 11-2. If hidden data is a sequence of A to Z, FIG. 26 shows three examples.

In a first data pattern shown in FIG. 26, a plurality of pieces of hidden data (A, A, . . . B, B, . . . ) and an access control pattern B1 are stored.

In a second data pattern shown in FIG. 26, a plurality of pieces of hidden data (A, A, . . . B, B, . . . ), inverted data thereof, and an access control pattern B2 are stored.

In a third data pattern shown in FIG. 26, a plurality of pieces of hidden data (A, B, . . . Z), an error correcting code, and an access control pattern B3 are stored.

An objective of each example is similarly an error correction. Another objective is to control reading, writing, and erasure of the hidden block 11-2 or pages in the hidden block 11-2. Because the area records hidden data and also holds information used only inside the NAND flash memory 10 by the authentication circuit 17, it is necessary to inhibit all operations of reading, writing, and erasure from outside. On the other hand, in the initial stage of manufacturing the NAND flash memory 10, the area is unrecorded and hidden data needs to be written in one of the manufacturing stages. Further, because data retention performance of the memory cell in the initial state may be insufficient as characteristics of the NAND flash memory 10, it is necessary to cause the memory cell to perform operations of reading, writing, and erasure to inspect whether the memory cell can hold data as specified.

Thus, reading, writing, and erasure can be performed on the area 11-2 in the manufacturing stage, but it is necessary to inhibit all of reading, writing, and erasure from being performed on the area in shipment after manufacturing is completed. As information to cause the state change, the access control patterns B1, B2, B3 are recorded in the area 11-2.

The access control patterns B1, B2, B3 may be recorded for each page or only in the first page of a block. The recording position of the access control patterns B1, B2, B3 in a page may be a general data area or a redundant area. The redundant area is, for example, an area used by the controller or the like to attach a correcting code, an area used by the NAND flash memory 10 to record information to indicate the internal status for each page or the like.

It is also desirable to record, like ROM data, hidden data and the access control patterns B1, B2, B3 in binary (SLC) mode.

Next, a configuration example of the access control pattern will be shown by using FIG. 27.

First, the access control pattern is formed of a plurality of bits to prevent losses caused by an error.

The access control pattern B1 as the first example is provided with a plurality of control flag bits A to Z, each of which is set as a predetermined pattern. If an access request of reading, writing, erasure or the like to the area is received from the host device 20, the NAND flash memory 10 checks the access control pattern B1 of the area 11-2 against a predetermined pattern and inhibits access if the rate of matching of both is equal to a predetermined rate or more.

The access control pattern B2 as the second example is in accordance with a method of repeatedly recording control flags. This is effective in reducing the probability of an error of a predetermined pattern.

The access control pattern B3 as the third example is in accordance with a method of recording each control flag and inverted data of each control flag. As described above, this method is also effective in reducing the probability of an error.

<Usage Example of the Access Control Pattern>

Next, the method of sensing the access control pattern and how to use sensing results.

Figure 28:
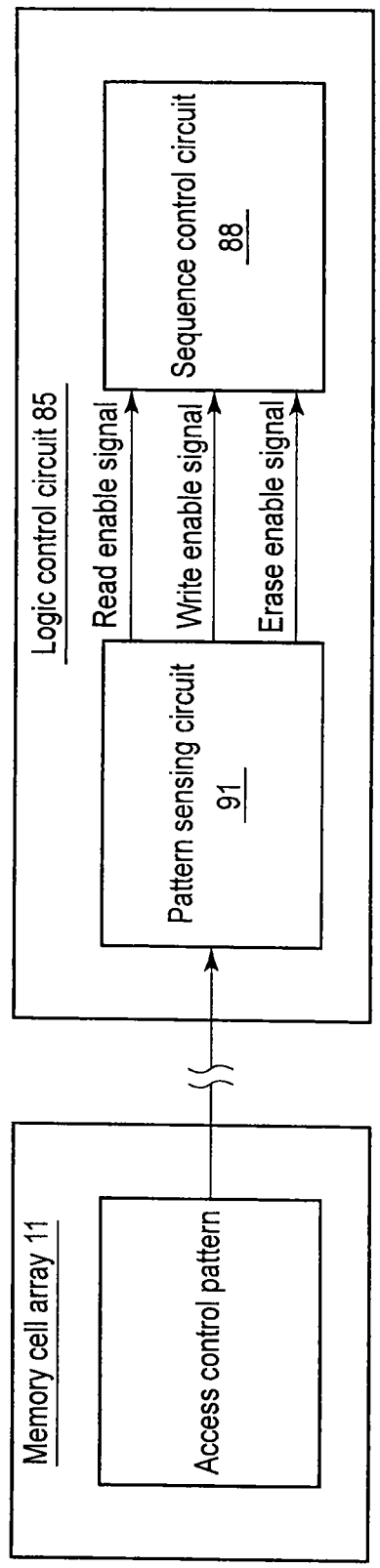
FIG. 28 is a block diagram showing a usage example of the access control pattern according to the fifth embodiment.

As shown in FIG. 28, the access pattern read from the hidden area 11-2 in the memory cell array 11 is input into a pattern sensing circuit 91 in the logic control circuit 85.

The pattern sensing circuit 91 executes a pattern recognition process on the input access control pattern and determines whether the rate of matching is equal to a predetermined rate or more to control accessing. The rate of matching is calculated from an error probability in a memory cell array of the NAND flash memory 10 and the amount of data of access control patterns and it is desirable to set the rate of matching so that, for example, an error detection probability becomes at least $10^{-3}$ or less. The pattern sensing circuit 91 inputs an enable signal to control data reading, data writing, and data erasure based on a detection result into the sequence control circuit 88.

The sequence control circuit 88 controls data reading, data writing, and data erasure according to the enable signal of the sensing result.

<Test Flow>

Figure 29:
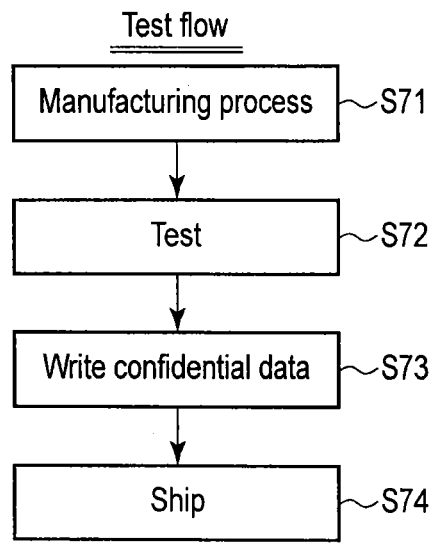
FIG. 29 is a diagram showing a test flow according to the fifth embodiment.

Next, the inspection flow of the manufacturing process of the NAND flash memory 10 using the above access control patterns (for example, B1 to B3) will be described along FIG. 29.

(Steps S71, S72)

In the manufacturing process, first data that does not correspond to the access control patterns is recorded in the hidden area 11-2 and tested. In this stage, access to the hidden area 11-2 is permitted.

However, any of the different security levels may be set to the area 11-2 depending on whether all access of data reading, data writing, and data erasure is permitted, data writing and data erasure are permitted or the like. If a high security level is needed for the area 11-2, even if all access is inhibited by the access control patterns, erroneous access permission may be granted due to degradation of data of the access control patterns. In this case, hidden data may be read out and thus, even in the test process in step S71, data reading may be inhibited, that is, reading may not be permitted to the area 11-2 in the first place at the hard-wired level of the NAND flash memory 10.

Alternatively, if resistance to data degradation of the access control patterns is sufficient, for example, the access control patterns are repeatedly recorded many times or a strong error correcting code is attached, control including data reading may be performed by the access control patterns to ensure convenience of the test. In this case, the error detection probability shown above is still lower and, for example, $10^{-5}$ or lower is desirable.

(Step S73)

Subsequently, after the predetermined test in step S72 is completed, hidden data and the access control patterns (B1 to B3 and the like) are written into the hidden area 11-2.

(Step S74)

Subsequently, the NAND flash memory 10 is shipped with the above data written.

<Flow of Data Erasure>

Figure 30:
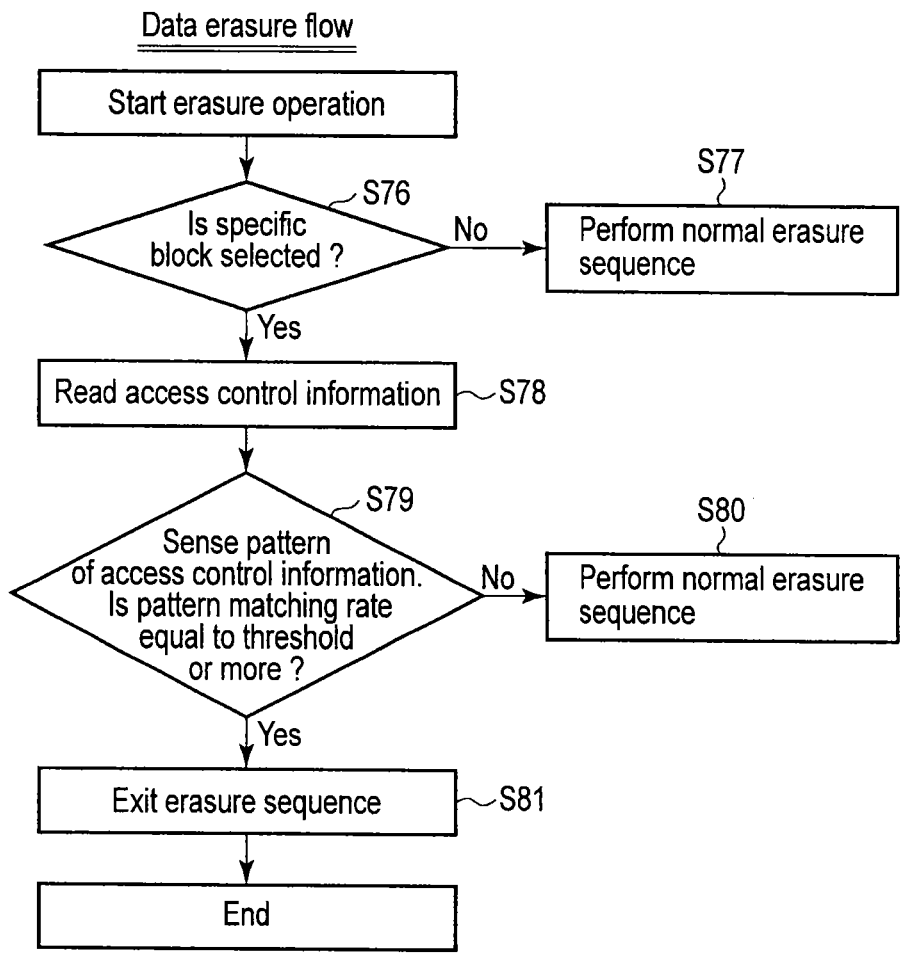
FIG. 30 is a diagram showing a data erasure flow according to the fifth embodiment.

Next, the data erasure operation inside the NAND flash memory 10 will be described along FIG. 30.

(Step S76)

First, if an operation instruction of an erasure operation is issued by the host device 20, the NAND flash memory 10 determines whether the selected block address in the instruction is a specific block.

(Step S77)

Subsequently, if the selected block address is not a specific block (No), the NAND flash memory 10 executes a normal erasure sequence.

(Step S78)

On the other hand, if the selected block address is a specific block (Yes), the NAND flash memory 10 reads access control information (B1 to B3 or the like) from the hidden area 11-2.

(Step S79)

Subsequently, the NAND flash memory 10 senses patterns of the access control information (B1 to B3 or the like) to determine whether the rate of pattern matching is equal to a predetermined value or more.

(Step S80)

Subsequently, if the rate of pattern matching is equal to the predetermined value or less (Yes), the NAND flash memory 10 executes a normal erasure sequence.

(Step S81)

Subsequently, if the rate of pattern matching is equal to the predetermined value or more (No), the NAND flash memory 10 exits the erasure sequence to terminate the data erasure flow (End).

In the present embodiment, data erasure is taken as an example, but the present embodiment can similarly be applied to data reading and data writing.

<Advantageous Effects>

According to the authenticator, authenticatee and authentication method according to the fifth embodiment, at least the advantageous effects (1) to (5) similar to those described above can be obtained.

Further, reliability can advantageously be improved by applying the configuration and method in the present embodiment.

[Sixth Embodiment Example of Using the Data Cache for the Authentication Process)]

A sixth embodiment relates to an example of using the data cache for the authentication process. In the description, overlapping points with the above embodiments will be omitted.

<Configuration Example of the Data Cache, Sense Amplifier and the Like>

A configuration example of a data cache, sense amplifier and the like according to the sixth embodiment will be described by using FIG. 31.

As shown in FIG. 31, a data cache 12 of an authentication process according to the above embodiment is shown as a component. A NAND flash memory 10 includes the volatile data cache 12 temporarily storing page data read from a memory cell array 11 or temporarily storing write page data received as recording data from outside. The data cache 12 in the present embodiment is also called a page buffer, data buffer or the like and has an area of the normal page size or more. Further, the data cache frequently has an area a plurality of times the page size to make a reading or writing process of page data faster and to realize random page access.

The data cache 12 includes a plurality of data caches A, B, C. Each data cache is connected to the sense amplifier (SA) and data line used for reading from the memory cell array 11.

The sense amplifier SA is electrically connected to the memory cell array 11 via a bit line (not shown).

The latch circuits DC_A of data caches are data caches capable of directly exchanging data with data lines. With IO being connected via the data line, data in the data cache 12 can be output from the NAND flash memory 10 through DC_A and data outside the NAND flash memory 10 can be loaded into the data cache.

Further, an operator connected to the data caches 12 to perform an operation between the data caches 12 is included. The operator corresponds to an authentication circuit 17 used for the authentication process in the above embodiments and including data generators 13, 14 and a one-way circuit 15.

Further, an internal register 92 to temporarily store data is included.

In the NAND flash memory 10, in addition to the read command from the memory cell array 11, a command called register read to read data read out from the memory cell array 11 into the data cache 12 is available for data reading. Specifically, the data read command includes two kinds of commands; one of the commands instructs the NAND flash memory to read data from the memory cell array to the data cache 12; another of the commands instruct the NAND flash memory to read data from the data cache 12 to outside and is referred to as "register read."

In the authentication method, the hidden block 11-2 in the NAND flash memory 10 may not allow hidden information (NKey, SecretID and the like) recorded in the hidden block 11-2 to be read by access from outside the NAND chip 10. On the other hand, when the NAND flash memory 10 executes an authentication process, the NAND flash memory 10 may internally read hidden information (NKey, SecretID and the like) recorded in the hidden block 11-2 to use the hidden information for the authentication process. That is, while it is necessary to allow hidden information (NKey, SecretID and the like) to be read from the memory cell array 11 into the data cache 12, it is necessary to inhibit data output from the data cache 12 to the outside of the NAND flash memory 10. This corresponds to revoking the register reading.

Thus, the data reading operation when the hidden block 11-2 is accessed from outside the NAND flash memory 10 is made different from the normal reading operation. More specifically, when the hidden block 11-2 is accessed, data sensed from the memory cell array 11 is locked in the other data caches DC_B, DC_C than the data cache DC_A to prevent the data from being output to revoke the register read command so that the command does not work. On the other hand, if the accessed block is not the hidden block 11-2, data is read as usual by using the data cache DC_A.

Thus, according to the above configuration, the plurality of data caches DC_A to DC_C is provided and the authentication process is executed by using the data caches DC_B, DC_C that cannot be accessed by a user from outside. Thus, when hidden information (NKey, SecretID and the like) is used for the authentication process, hidden information such as key information (NKey) can advantageously be prevented from being unlawfully read from outside.

<First Example of NAND Internal Operation Flow in the Authentication Process>

Figure 32:
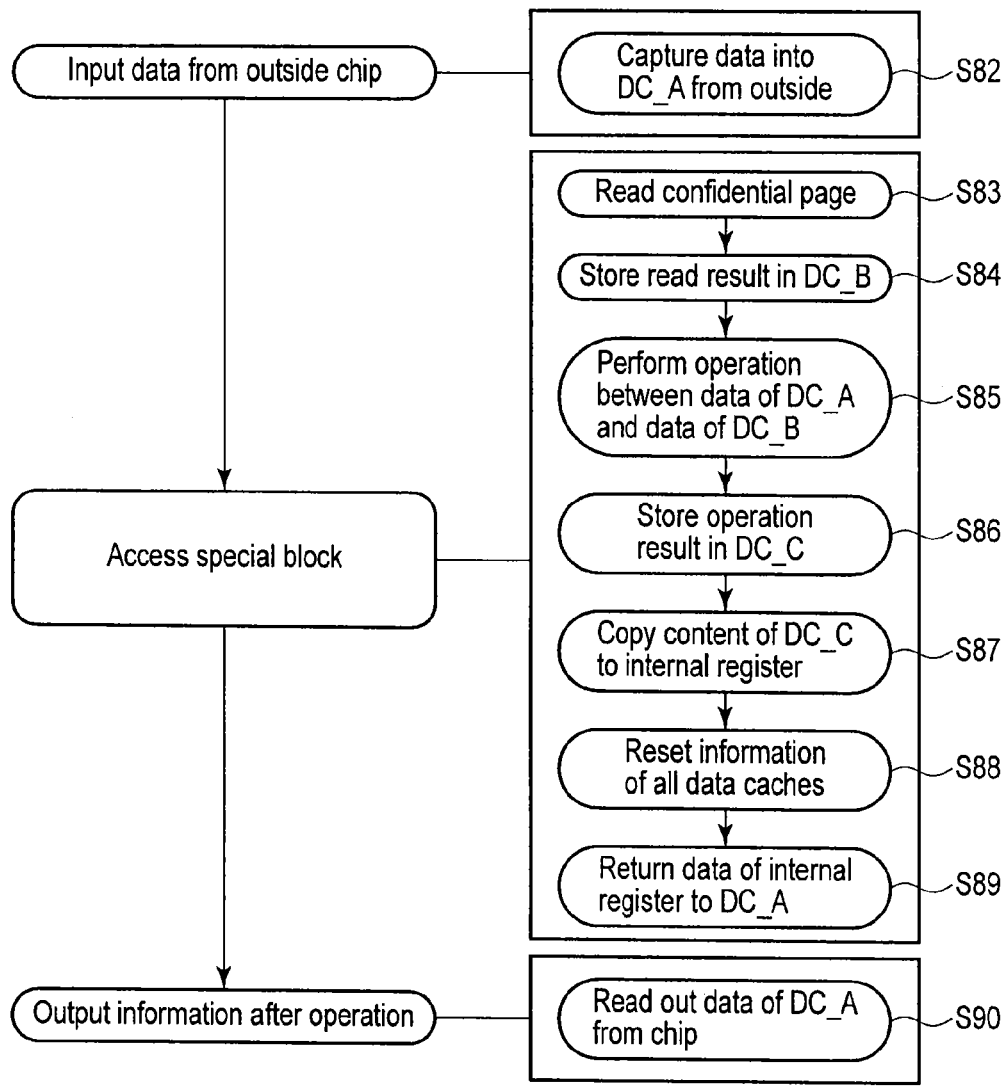
FIG. 32 and FIG. 33 are diagrams showing first and second operation flows of the NAND chip according to the sixth embodiment.

Next, a flow that does not output information held in the hidden block 11-2 to the host device 20 directly or indirectly in the process of the authentication process will be shown along FIG. 32.

(Step S82)

First, it is assumed in the authentication process that data is input from outside the NAND flash memory 10 like the host device 20. The input data is, for example, the random number RN or the host constant HCj and the data is loaded into the data cache DC_A.

(Step S83)

Subsequently, an indirect read request to access a special block like the hidden block 11-2 is made from the host device 20. This corresponds to a calculation request of authentication information in the authentication.

In response to the request, data of a confidential page read from the memory cell array 11 is read out.

(Step S84)

Subsequently, the read data of the confidential page is stored in the data cache DC_B.

(Step S85)

Subsequently, an operation of the authentication process described in the above embodiments is performed between data stored in the data cache DC_A and the data cache DC_B by using the operator (authentication circuit 17).

(Step S86)

Subsequently, the operation result is stored in the data cache DC_C.

(Step S87)

If the confidential data remains in the data cache when the chip becomes ready by completing the sequence, there is a possibility that the confidential data may be read from outside. To prevent such a possibility, it is necessary to reset information in all the data caches DC_A to DC_C before the sequence is completed. On the other hand, the host device 20 needs to obtain the result of the operation after the data caches DC_A to DC_C being reset.

Thus, the operation result held in the data cache DC_C is first copied to the internal register 92.

(Step S88)

Subsequently, data in all the data caches DC_A to DC_C is reset (in that, data is deleted).

(Step S89)

Subsequently, data saved in the internal register 92 is brought back to the data cache DC_A. If the operation heretofore is completed, the NAND flash memory 10 completes the sequence to become ready. At this point, the operation result is stored in the data cache DC_A.

(Step S90)

Subsequently, the host device 20 can obtain the data stored in the data cache DC_A by the register read command.

<Second Example of NAND Internal Operation Flow in the Authentication Process>

Figure 33:
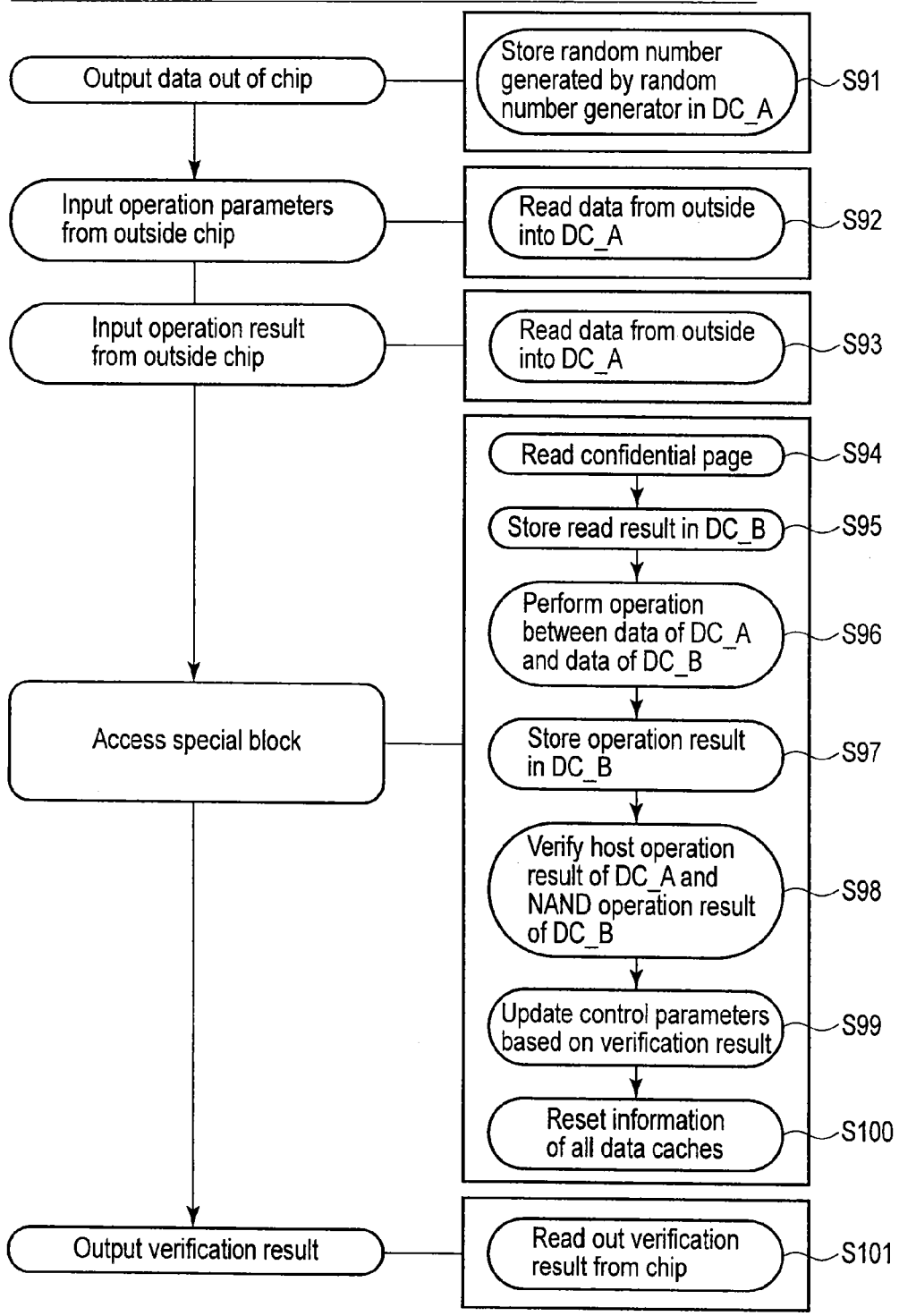

Next, a NAND internal operation flow in an embodiment including a random number generator 24n inside the NAND flash memory 10 will be described along FIG. 33. FIG. 33 is different from FIG. 32 in that a random number RNn generated by the random number generator 24n inside the NAND flash memory 10 is used.

(Step S91)

First, in the authentication process, when a random number read request is issued to the NAND flash memory 10 from the host device 20, the NAND flash memory 10 causes the random number generator to generate a random number and the generated random number is loaded into the data cache DC_A.

(Step S92)

Subsequently, the host device 20 reads the random number in the data cache DC_A by the register read command.

(Step S93)

Subsequently, in the authentication process, data, for example, the host constant (HCj) is input from the host device 20 into the NAND flash memory 10. The data is loaded into the data cache DC_A.

Further, the authentication information which is obtained by the arithmetic operation in the host device 20 is input into the NAND flash memory 10 from the host device 20. The data is, for example, Oneway-ID and the data is loaded into the data cache DC_A.

(Step S94)

Subsequently, an indirect read request is made from the host device 20 by accessing the hidden block 11-2. This corresponds to a calculation request of authentication information in the authentication.

Then, a confidential page is read from the memory cell array 11.

(Step S95)

Subsequently, the read result is stored in the data cache DC_B.

(Step S96)

Subsequently, an operation of the authentication process described in the above embodiments is performed between data stored in the data cache DC_A and the data cache DC_B by using the operator (authentication circuit 17).

(Step S97)

Subsequently, the operation result is stored in the data cache DC_B.

(Step S98)

Subsequently, the operation result of the host held in the data cache DC_A is verified against the operation result of NAND held in the data cache DC_B.

(Step S99)

Subsequently, if matching of the verification result is confirmed in the verification in step S98, control parameters (890) are updated.

(Step S100)

Subsequently, the NAND flash memory 10 resets information of all the data caches DC_A to DC_C. If the operation heretofore is completed, the NAND flash memory 10 exits the sequence to become ready.

(Step S101)

Subsequently, the host device 20 obtains the verification result read out of the NAND chip 10 by using a command to confirm the verification result.

<Inspection Method of Hidden Information>

Next, the inspection method of hidden information will be described.

•Inspection Flow

The process related to the authentication method in the process from completion of silicon chip in the factory to shipment of the NAND flash memory 10 will be shown along FIG. 34.

As shown in FIG. 34, the process proceeds in the order of the manufacturing process, test, hidden data writing, and shipment.

(Steps S71, S72)

First, when the manufacturing process of silicon chip is completed, a predetermined inspection test is performed to select the conforming chip 10 from the wafer.

(Step S73)

Subsequently, after the normal test process in step S72 is completed, the process of writing hidden data is executed and a test needs to be performed to check whether the hidden data has been written correctly.

On the other hand, hidden data cannot be directly read from the hidden block 11-2. This is because the read function could become a security hole.

(Step S74)

Subsequently, the NAND flash memory 10 with hidden data written correctly is shipped.

•Indirect Read Inspection Flow of Hidden Information

In step S73, hidden data cannot be directly read from the hidden block 11-2 from the viewpoint of possibly becoming a security hole.

Figure 35:
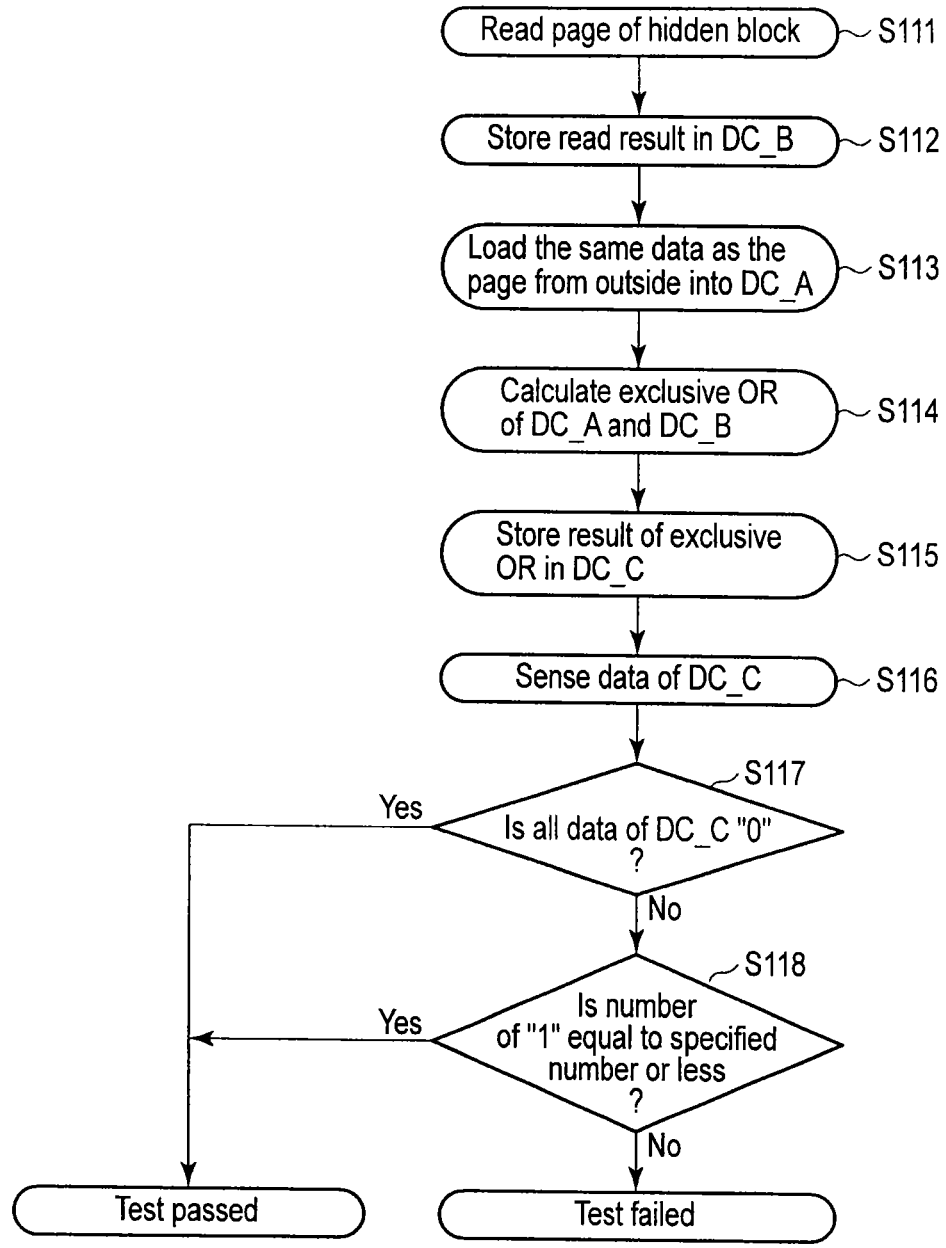
FIG. 35 is a diagram showing an inspection flow of hidden information according to the sixth embodiment.

Thus, a flow of checking recorded data without providing the direct data reading function will be described along FIG. 35.

(Step S111)

First, hidden information (NKey and the like) is read from the hidden block 11-2 of the memory cell array 11.

(Step S112)

Subsequently, the reading result of the read hidden information (NKey and the like) is stored in the data cache DC_B.

(Step S113)

Subsequently, the data cache DC_A is caused to store the same hidden information (NKey and the like) from outside the NAND flash memory 10.

(Step S114)

Subsequently, an exclusive OR of the data in the data cache DC_A and the data in the data cache DC_B is calculated by using the operator (authentication circuit 17).

(Step S115)

Subsequently, the result of the exclusive OR is stored in the data cache DC_C.

(Step S116)

Subsequently, data in the data cache DC_C is sensed.

(Step S117)

At this point, if the data in the data cache DC_A and the data in the data cache DC_B match (Yes), the test is passed (OK). On the other hand, if both pieces of data mismatch (No), the test fails.

More specifically, the data cache DC_C contains the result of the exclusive OR and thus, if the data (all of the bits) in the data cache DC_C is all "0" (Yes), the test is passed (OK). On the other hand, if the data in the data cache DC_C is "1" (No), the test fails.

First, whether the data in the data cache DC_C is all "0" is sensed. If all bits are "0" (Yes), the test is passed. Otherwise (No), the test proceeds to step S118.

(Step S118)

Subsequently, if all bits are not "0" (No), the number of "1" is counted. If the number of "1" is equal to a specified number or less (Yes), the test is passed because errors are determined to be correctable by a majority vote error correction or correcting code (OK). On the other hand, if the number of "1" is equal to the specified number or more (No), the test fails (NG).

Also a method of controlling access to the hidden block 11-2 based on second hidden information is possible by separately holding the hard-wired second hidden information in the NAND flash memory 10 instead of the hidden information recorded in the hidden block 11-2 by using the method using the authentication for access control to a specific block described in the above embodiment. In this case, not only data reading, but also data writing and data erasure may be controlled by the authentication based on the second hidden information.

<Advantageous Effects>

According to the authenticator, authenticatee and authentication method according to the sixth embodiment, at least the advantageous effects (1) to (5) similar to those described above can be obtained.

Further, in the present embodiment, when the hidden block 11-2 is accessed, data sensed from the memory cell array 11 is locked in the other data caches DC_B, DC_C than the data cache DC_A to prevent the data from being output to revoke the register read command so that the command does not work. On the other hand, if the accessed block is not the hidden block 11-2, data is read as usual by using the data cache DC_A.

Thus, according to the above configuration, the plurality of data caches DC_A to DC_C is provided and the authentication process is executed by using the data caches DC_B, DC_C that cannot be accessed by a user from outside. Thus, when hidden information (NKey, SecretID and the like) is used for the authentication process, hidden information such as key information (NKey) can advantageously be prevented from being unlawfully read from outside.

In addition, as shown in steps S88, S100 above, hidden information such as key information in the data caches DC_A to DC_C is all erased before returning from the busy state to the ready state. Thus, safety can be ensured.

[Seventh Embodiment (Example of Command Mapping)]

A seventh embodiment relates to an example of command mapping. In the description, overlapping points with the above embodiments will be omitted.

<Example of Command Mapping Compatible with the Read/Write Commands>

A NAND flash memory 10 specifies the block to be read and the page address by, for example, a command sequence of "00h"-"Address"-"30h" as a command for reading. The address portion shows frequently a block address, page address, or byte position in the specific page. Input data in the column address portion may be ignored or may be used for setting a byte pointer after page reading to read data positioned from the byte position corresponding to the byte pointer. After the command 30h is input, the NAND flash memory 10 is in a busy state for reading and changes to a ready state after reading is completed. After the transition to the ready state, data output (Dout) is enabled and data can be read by providing a signal RE or DQS. To change the byte position in a read page, the column address corresponding to the byte position to be read is set by using a command sequence of "05h"-"Address"-"E0h".

A command sequence of "80h"-"Address"-"Input Data"-"10h" is used for data writing (recording) to specify the block and page to be written into. The address portion shows frequently a block address, page address, or byte position in the specific page. Input data for the column address portion may be ignored or may be used for setting a byte pointer for page write data input to input write data positioned from the byte position corresponding to the byte pointer. After the command 10h is input, the NAND flash memory 10 is in a busy state for writing and changes to a ready state after writing is completed.

The above is a command system widely used by the NAND flash memory 10. When implementing the authentication function according to the above embodiments, providing commonality of command sequences as much as possible is preferable from the viewpoint of minimizing the packaging area of a circuit. However, the authentication function is used in fields in which security is required and thus, there is also a point of view that limiting function users is more desirable.

Thus, FIGS. 36A and 36B show a command mapping example compatible with the above read and write commands of the NAND flash memory 10 in consideration of the above points of view.

The command mapping example is different from the above general command sequence in that the input command of Security Prefix is attached prior to the command. Security Prefix configured by a single byte and by a plurality of bytes can be considered. The command Security Prefix is disclosed to only those users who need the authentication function. From the viewpoint of user management, it is desirable to configure the command Security Prefix by a plurality of bytes.

As shown in FIG. 36A, like a data read command sequence, the block address and the page address to be read are specified by sequentially inputting "command Security Prefix"-"command 00h"-"address ADD"-"command 30h" into the IO terminal. The value set to Address may further be made a special value for user management or an internally ignored value.

Subsequently, after the command 30h is input, the NAND flash memory 10 is in a busy state for reading and changes to a ready state after reading is completed. After the transition to the ready state, data output (Dout) is enabled and data such as index information i, v, unique encrypted secret identification information (E-SecretID), and commonly attached key management information (FKB) can be read by supplying a signal RE, DQS or the like.

As shown in FIG. 36B, like a data write command sequence, target data is input by sequentially inputting "command Security Prefix"-"command 80h"-"address ADD"-"data Din (32B)"-"command 10h" into the IO terminal. The value set to Address may further be made a special value for user management or an internally ignored value. The present sequence has a lot in common with a write sequence, but actually data writing into a cell array is not needed and the present sequence is used for input of data needed by the NAND flash memory 10 for calculation in the authentication process. Examples of data needed for calculation in the authentication process include unique information HCi of the host device 20 and a random number.

Subsequently, the NAND flash memory 10 is in a busy state until the calculation of the authentication process is completed and then changes to a ready state after the calculation is completed and security data in the data caches DC_A to DC_C is all cleared.

As shown in FIG. 36B, after the transition to the ready state, the host device 20 can acquire the result by sequentially inputting "command 05h"-"address ADD"-"command E0h" into the IO terminal and specifying the column address where the calculation result of the authentication process is held. Oneway-ID can be cited as an example of the calculation result of the authentication process.

<Example of Command Mapping Compatible with the Set/Get Feature Commands>

Figures 37A, 37B:
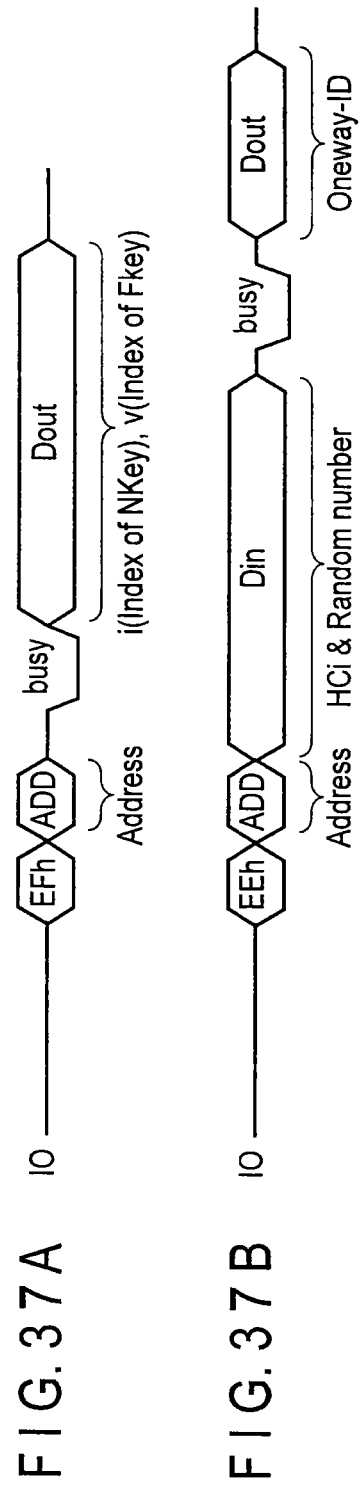
FIGS. 37A and 37B are timing charts showing a command mapping example (Set/Get feature commands) according to the seventh embodiment.

Next, another example of the command configuration of the NAND flash memory 10 to which the present authentication function is applied will be shown by using FIGS. 37A and 37B.

The NAND flash memory 10 has a command called "Set Feature" to enable the function of the memory 10 and a command called "Get Feature" to read an enabled/disabled state for the function of the memory 10. These commands are used, for example, to enable input of /RE, /WE, and /DQS, which are complementary signals for high-speed data transfer.

The function of "Set Feature" is set by inputting a command sequence of "EEh"-"Address"-"Data input". The function number is set to "Address" and parameters of the function indicated by the function number are input into "Data input". Then, a busy period to enable the function comes and with the function being enabled, a transition to a ready state occurs.

"Get Feature" reads an enabled/disabled state of the function by inputting a command sequence of "EFh"-"Address"-"Data output". The function number is set to "Address" and parameters of the function indicated by the function number are output to "Data output". A busy period exists between Address and Data output to internally read set parameters.

The present embodiment is an example of the command sequence diverting these Set Feature and Get Feature.

As shown in FIG. 37A, the command sequence is like the above case, but "Address" to be specified is different. "Address" may be a single byte and a plurality of bytes. "Address" is disclosed to only those users who need the authentication function. From the viewpoint of user management, it is desirable to configure "Address" by a plurality of bytes. Examples of "Data output" and "Data input" include, like those shown in FIGS. 37A and 37B above, index information i, v.

As shown in FIG. 37B, the command sequence of "EEh"-"address ADD"-"data Din" for data input induces execution of the authentication process at the same time and the NAND flash memory 10 performs a calculation of the authentication process in the busy period.

Subsequently, after the calculation is completed and security data is cleared from the data caches, the NAND flash memory 10 changes to a ready state. After the transition to the ready state, the host device 20 can read Oneway-ID.

<Advantageous Effects>

According to the authenticator, authenticatee and authentication method according to the seventh embodiment, at least the advantageous effects (1) to (5) similar to those described above can be obtained.

Further in the present embodiment, as shown in FIGS. 36A and 36B, commonality with the command sequence of the NAND flash memory 10 can be provided as much as possible. Thus, the packaging area of a circuit can be minimized while taking security into consideration, which is more effective in implementing the authentication function according to the above embodiments.

Also as shown in FIGS. 37A and 37B, the command called "Set Feature" to enable the function of the memory 10 and the command called "Get Feature" to read the enabled/disabled state of the function of the memory 10 can also be made common and applied if necessary.

Clearing all data of the data caches DC_A to DC_C in the timing before returning from the busy state to the ready state is the same as the above case.

[Eighth Embodiment (Application Example to a Memory Card, Content Protection, and HDD)]

An eighth embodiment relates to an application example to a memory card, content protection, and HDD. In the description, overlapping points with the above embodiments will be omitted.

Application Example to a Memory Card

A configuration example of a memory card including a NAND flash memory 10 to which the present authentication function is applied will be shown by using FIG. 38.

As shown in FIG. 38, a controller 19 is embedded in a memory card 55. The controller 19 includes a function to control the operation of the NAND flash memory 10, a function to control the interface with a host device 20, and the like.

At least one of a plurality of NAND flash memory chips 10 (MCP1), (MCP2) stacked in a NAND package is included in the memory card 55. At least one NAND flash memory chip 10 in the NAND package needs to have the authentication function and the function to be authenticated according to at least one of the above embodiments. In other words, all the NAND flash memory chips 10 in the NAND package do not have to have the authentication function and the function to be authenticated according to the above embodiment. Further, all NAND packages mounted on the memory card 55 do not have to have the authentication function and the function to be authenticated according to at least one of the above embodiments. For the clarification, the NAND flash memory 10 in the present embodiment may be referred to as a NAND package or a NAND flash memory chip.

The controller 19 in the memory card 55 has a function to control the authentication function and the function to be authenticated according to at least one of the above embodiments via a NAND interface in the NAND package. The function of the controller 19 may be a function to control the authentication function and the function to be authenticated of one of a plurality of NAND packages or a function to control the authentication function and the function to be authenticated of each of the plurality of NAND packages. Further, the function of the controller 19 may be a function to control the authentication function and the function to be authenticated of one of the NAND flash memory chips 10 in the NAND package or a function to control the authentication function and the function to be authenticated of each of the NAND flash memory chips 10 in the NAND package.

•First Application Example to Content Protection

Figure 39:
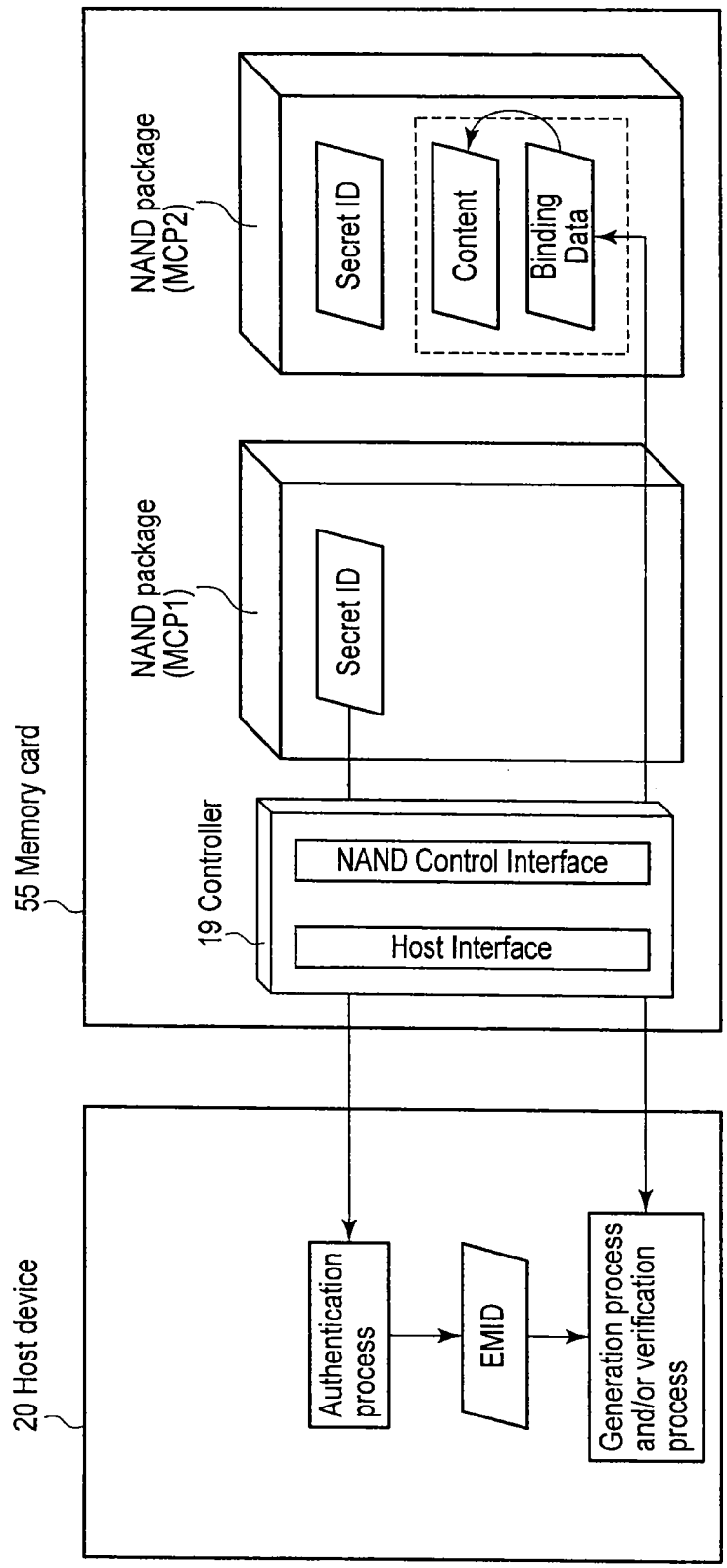
FIG. 39 is a diagram showing a first application example to content protection according to the eighth embodiment.

A first application example to content protection of the memory card 55 including the NAND flash memory 10 to which the authentication function is applied will be shown by using FIG. 39. For the sake of simplicity, content described herein heretofore will not be described below.

The controller 19 and NAND packages (MCP1), (MCP2) are embedded in the memory card 55. The NAND packages (MCP1), (MCP2) have the authentication function and the function to be authenticated according to at least one of the above embodiments.

The host device 20 verifies the authenticity of secret identification information SecretID of the NAND packages (MCP1), (MCP2) of the NAND flash memory 10 by the authentication process shown in at least one of the above embodiments.

After the authenticity is verified, the host device 20 executes the calculation process of EMID by using the method described in the second embodiment based on the secret identification information SecretID.

The NAND package (MCP2) generates binding data (labeled with "Binding Data in FIG. 39) to associate EMID and content (labeled with "Content" in FIG. 39) when the content is written. Binding Data desirably contains data on the key to encrypt/decrypt content. Binding Data is recorded in one of the NAND packages (MCP1), (MCP2) mounted on the card 55. The NAND package in which Binding Data is recorded may be the NAND package (MCP1) having secret identification information SecretID used for the authentication process or the other NAND package (MCP2). FIG. 39 shows the latter example, but the arrangement of Binding Data is not limited to this example. The recording position of content may be similarly in any NAND package.

The relationship between the content and EMID is calculated and verified, and the content is reproduced only if the relationship is verified. The EMID is obtained by the authentication process of SecretID and the binding data which associates EMID and content.

With the above configuration, content (Content) is associated with SecretID. Thus, an effect of invalidating reproduction of content can advantageously be achieved even if content or Binding Data is unlawfully copied to another memory card that does not have the same SecretID.

• First Application Example to HDD

Figure 40:
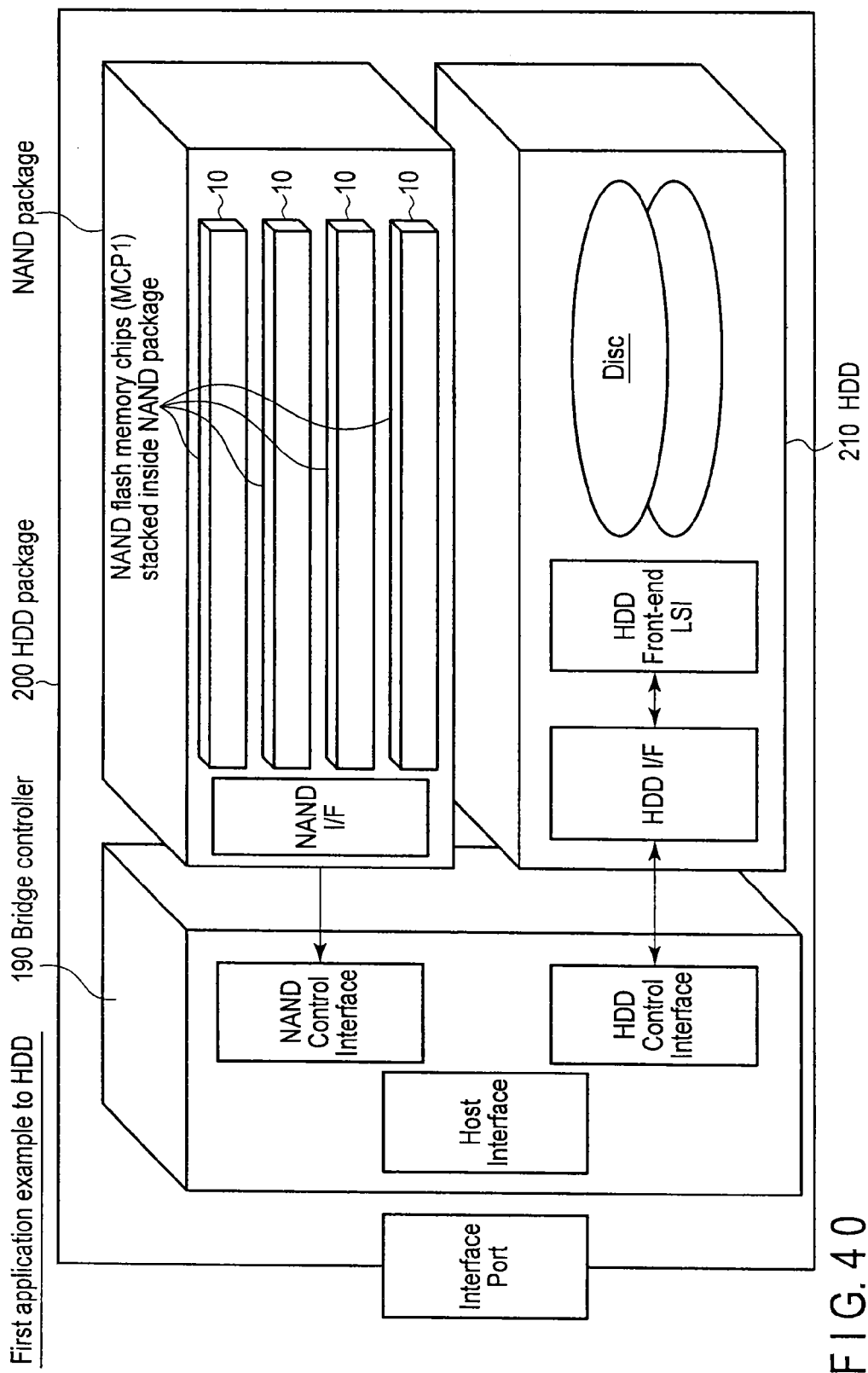
FIG. 40 and FIG. 41 are diagrams showing first and second application examples to the HDD according to the eighth embodiment.

A First example of a configuration of a hard disk drive (HDD) using the NAND flash memory 10 to which the present authentication function is applied will be shown by using FIG. 40.

As shown in FIG. 40, at least one NAND package (MCP1) is embedded in an HDD package 200, and at least one NAND package has the authentication function and the function to be authenticated according to at least one of the above embodiments.

At least one HDD 210 is embedded in the HDD package 200.

Further, a bridge controller 190 to control the NAND package (MCP1), control the HDD 210, and control the interface with the host device is embedded. The bridge controller 190 may be configured by a single integrated circuit or a plurality of integrated circuits. The function may also be realized by combining an integrated circuit and firmware.

The authentication function and the function to be authenticated in the NAND package (MCP1) are provided to the HDD 210 as a host device via the bridge controller 190.

• Second Application Example to HDD

Figure 41:
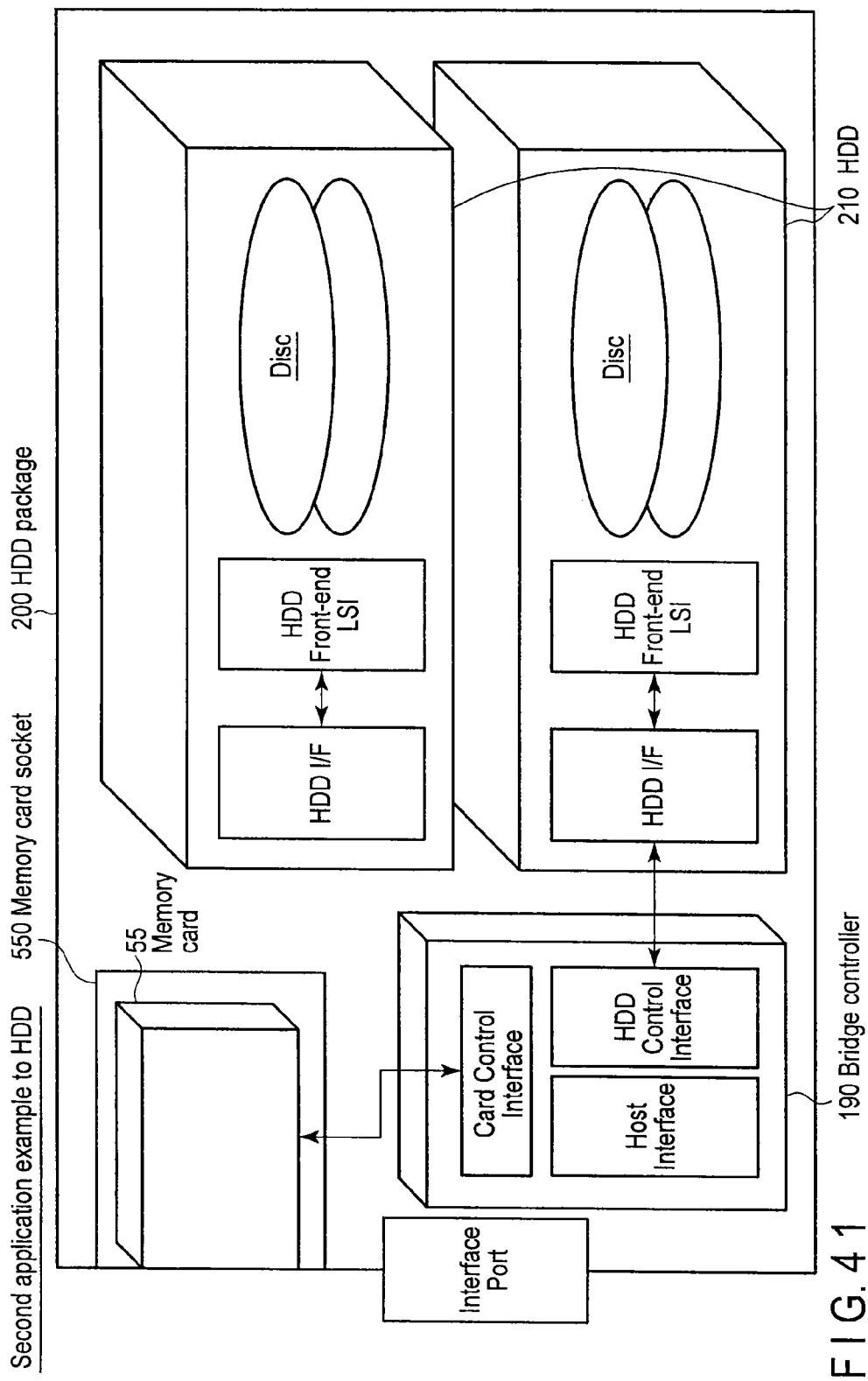

Another configuration example of the hard disk drive (HDD) using the NAND flash memory 10 to which the present authentication function is applied will be shown by using FIG. 41.

As shown in FIG. 41, the HDD package 200 includes a memory card socket 550 to connect the memory card 55 described above by using FIG. 38.

At least one HDD 210 is embedded in the HDD package 200. Further, the bridge controller 190 to control the memory card 55, control the HDD 210, and control the interface with the host device is embedded. The bridge controller 190 may be configured by a single integrated circuit or a plurality of integrated circuits. The function may also be realized by combining an integrated circuit and firmware.

The authentication function and the function to be authenticated in the memory card 55 are provided to the HDD 210 as a host device via the bridge controller 190.

• Second Application Example to Content Protection

Figure 42:
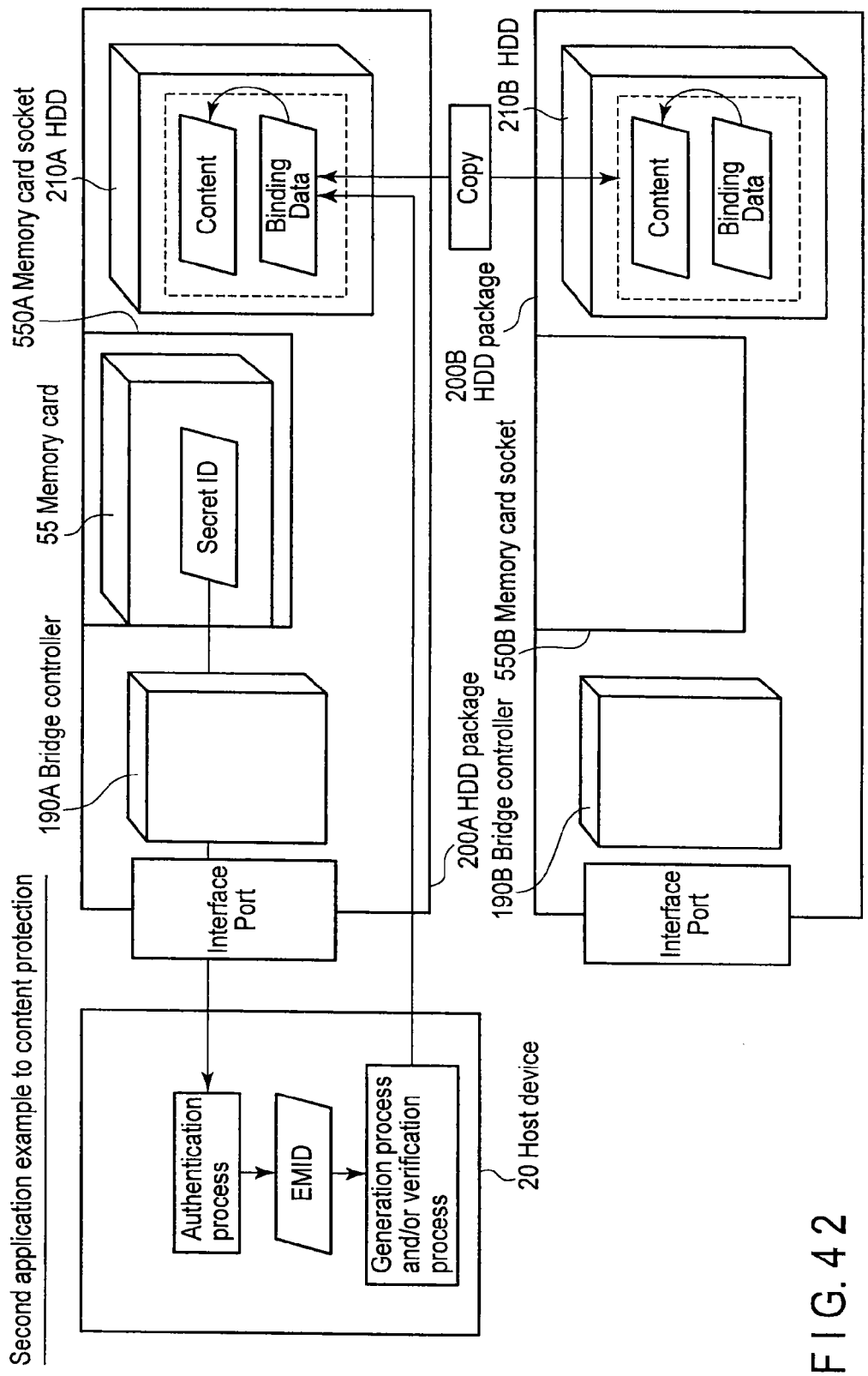

FIG. 42 shows an application example of the hard disk drive (HDD) using the NAND flash memory 10 to which the present authentication function is applied to content protection. The present embodiment takes the HDD configuration shown in FIG. 41 as an example, but is also applicable to the HDD configuration shown in FIG. 40.

As shown in FIG. 42, bridge controllers 190A, 190B, memory card sockets 550A, 550B, and HDD 210A, 210B are embedded in HDD packages 200A, 200B, respectively.

The memory card 55 includes the authentication function and the function to be authenticated according to at least one of the above embodiments. The host device 20 verifies the authenticity of SecretID of the NAND flash memory 10 by the authentication process shown in the above embodiments. After the authenticity is verified, the host device 20 executes the calculation process of EMID by using the method shown in the second embodiment based on the secret identification information SecretID.

Binding Data to associate EMID and content (Content) is generated when the content is written. Binding Data desirably contains data on the key to encrypt/decrypt content. Binding Data is recorded in one of the memory card 55 and the HDD 210A, 210B. An example in which Binding Data is recorded in the HDD 210A, 210B is shown, but the arrangement of Binding Data is not limited to this example. The recording position of content may be similarly in the memory card 55 or the HDD 210A, 210B.

The relationship between the content and EMID is calculated and verified, and the content is reproduced only if the relationship is verified. The EMID is obtained by the authentication process of SecretID and the binding data which associates EMID and content.

The present embodiment is an example of using the authentication function and the function to be authenticated included in the NAND flash memory 10 in the memory card 55 via the card socket 550A, but is also applicable to a configuration in which the NAND packages are directly embedded in the HDD shown in FIG. 40 and the HDD directly control the NAND packages. In this case, the memory card may be replaced by the NAND package.

Further, as an application example applicable to an HDD having the card sockets 550A, 550B, if a plurality of similar HDD packages exists, content recorded in any HDD can be reproduced only by moving the card after content and Binding Data being copied to both HDD packages. Binding Data may be recorded in the card, instead of the HDD, or in both.

With the present configuration, content (Content) is associated with the memory card 55 or SecretID in a NAND package and thus, an effect of invalidating reproduction of content can be achieved even if content or Binding Data is unlawfully copied to the memory card 55 that does not have the same SecretID.

Further, in the example in which an HDD package includes a memory socket shown in FIG. 41, the content recorded in a plurality of HDD can be reproduced only by moving a memory card. This is advantageous in terms of portability because an HDD has a large cabinet and may be installed for stationary use compared with a memory card.

• Third Application Example to Content Protection

A third application example of the hard disk drive (HDD) using the NAND flash memory 10 to which the present authentication function is applied will be described by using FIG. 43. The present embodiment is an example in which the host device 20 includes the memory card socket 550 and uses the external HDD 210.

As shown in FIG. 43, The bridge controller 190 and the HDD 210 are embedded in the HDD package 200.

The card control function and the authentication function included in the memory card 55 inserted into the memory card socket 550 are embedded in the host device 20. An NAND package having the authentication function and the function to be authenticated according to at least one of the above embodiments is embedded in the memory card 55.

In the above configuration, the host device 20 verifies the authenticity of SecretID of the NAND flash memory 10 by the authentication process shown in at least one of the above embodiments.

After the authenticity is verified, the host device 20 executes the calculation process of EMID by using the method according to the second embodiment based on the secret identification information SecretID.

Binding Data to associate EMID and content (Content) is generated when the content is written. Binding Data desirably contains data on the key to encrypt/decrypt content. Binding Data is recorded in one of the memory card 55 and the HDD 210. The latter example is shown here, but the arrangement of Binding Data is not limited to this example. The recording position of content may be similarly in the memory card 55 or the HDD 210.

The relationship between the content and EMID is calculated and verified, and the content is reproduced only if the relationship is verified. The EMID is obtained by the authentication process of SecretID and the binding data which associates EMID and content.

The present embodiment is an example of using the authentication function and the function to be authenticated included in the NAND flash memory 10 in the memory card 55 via the card socket 550, but is also applicable to a configuration in which the NAND packages are directly embedded in the host device 20 and the host device 20 directly controls the NAND packages. In this case, the memory card 55 may be replaced by the NAND package.

Further, as an application example applicable to the host device 20 having the card socket 550, if a plurality of the similar host devices 20 exists, content can be reproduced by any of the host devices 20 by connecting the memory card 55 and the HDD package 200 to the other host device 20. Content and Binding Data may be recorded in the card 55, instead of the HDD 210, or in both.

With the present configuration, content is associated with the memory card 55 or SecretID in a NAND package and thus, an effect of invalidating reproduction of content can be achieved even if content or Binding Data is unlawfully copied to the memory card that does not have the same SecretID. Further, the content can be reproduced by a plurality of host devices by moving the memory card 55 and the HDD 210.

•Fourth Application Example to Content Protection

An fourth application example of the hard disk drive (HDD) using the NAND flash memory 10 to which the present authentication function is applied will be described by using FIG. 44. The present embodiment is an example in which the host device 20 includes the memory card socket 550 and further uses the built-in HDD 210.

Figure 44:
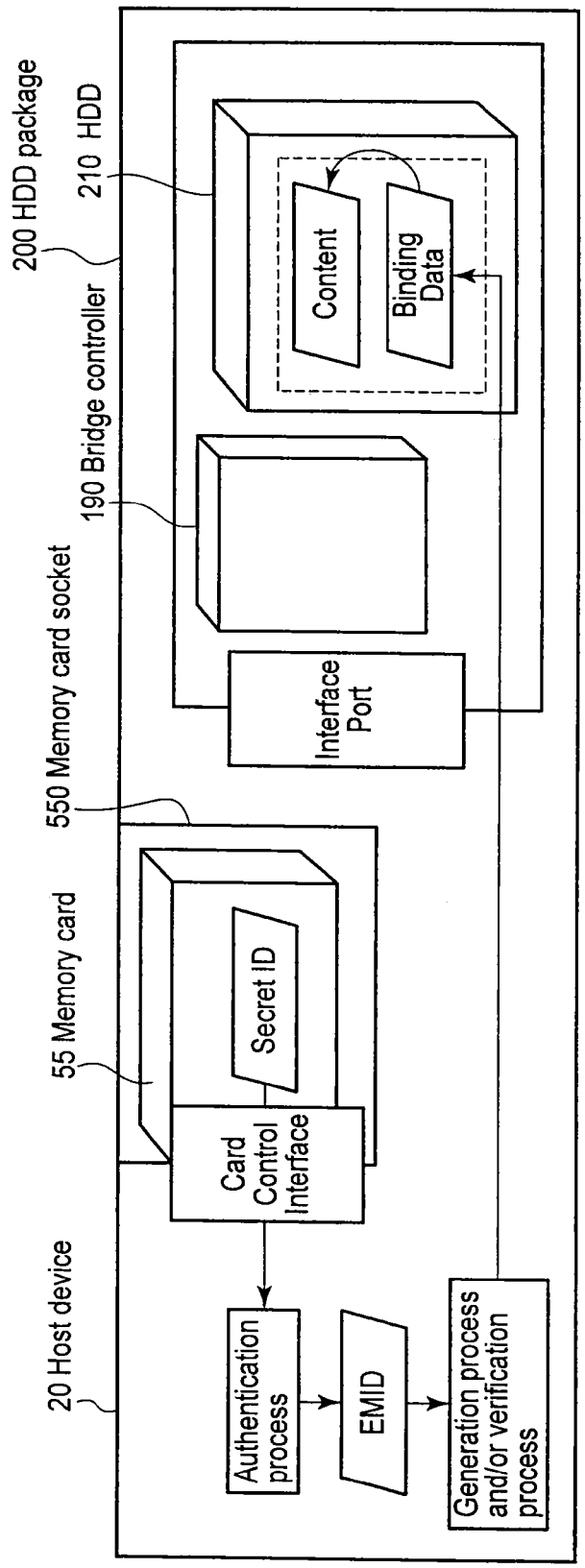

As shown in FIG. 44, the bridge controller 190 and the HDD 210 are embedded in the HDD package 200.

The card control function and the authentication function included in the memory card 55 inserted into the memory card socket 550 are embedded in the host device 20. An NAND package having the authentication function and the function to be authenticated according to at least one of the above embodiments is mounted on the memory card 55.

In the above configuration, the host device 20 verifies the authenticity of SecretID of the NAND flash memory 10 by the authentication process shown in at least one of the above embodiments.

After the authenticity is verified, the host device 20 executes the calculation process of EMID by using the method according to the second embodiment based on the SecretID.

Binding Data to associate EMID and content (Content) is generated when the content is written. Binding Data desirably contains data on the key to encrypt/decrypt content. Binding Data is recorded in one of the memory card 55 and the HDD 210. The latter example is shown here, but the arrangement of Binding Data is not limited to this example. The recording position of content is similarly in the memory card 55 or the HDD 210.

The relationship between the content and EMID is calculated and verified, and the content is reproduced only if the relationship is verified. The EMID is obtained by the authentication process of SecretID and the binding data which associates EMID and content.

The present embodiment is an example of using the authentication function and the function to be authenticated included in the NAND flash memory 10 in the memory card 55 via the card socket 550, but is also applicable to a configuration in which the NAND packages are directly embedded in the host device 20, and the host device 20 directly controls the NAND packages. In this case, the memory card 55 may be replaced by the NAND package.

Further, as an application example applicable to the host device 20 having the card socket 550, if a plurality of the similar host devices 20 exists, content can be reproduced by any of the host devices 20 by connecting the memory card 55 and the HDD package 200 to the other host device 20. Content and Binding Data may be recorded in the card 55, instead of the HDD 210, or in both.

With the present configuration, content is associated with the memory card 55 or SecretID in a NAND package and thus, an effect of invalidating reproduction of content can be achieved even if content or Binding Data is unlawfully copied to the memory card that does not have the same SecretID. Further, content can be reproduced by a plurality of host devices by moving the memory card 55 and the HDD 210.

[Second Modification (Another Example of Using the Data Caches)]

A second modification relates to another configuration example of using the data caches described in the sixth embodiment for the authentication process. In the description, overlapping points with the above embodiments will be omitted.

<Configuration Example of the Sense Amplifier and the Peripheral Circuit Thereof>

Figure 45:
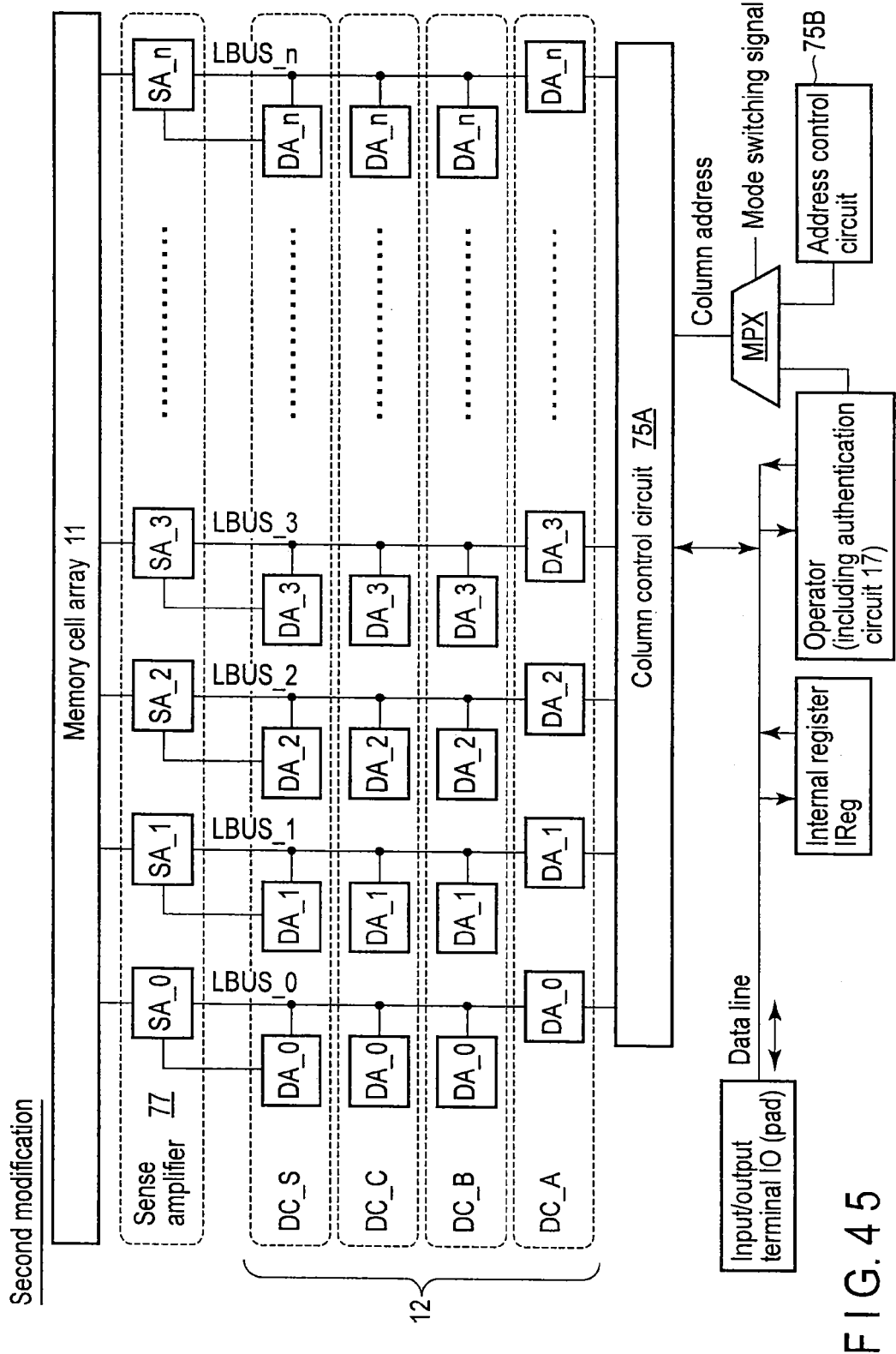
FIG. 45 is a block diagram showing a configuration example of a sense amplifier according to a second modification and a peripheral circuit thereof.

A configuration example of the sense amplifier and the peripheral circuit thereof is shown as in FIG. 45. In the second modification, as shown in FIG. 45, data cache 12 includes data caches (latch circuits) DC_A, DC_B, DC_C, and DC_S and only DC_A is connected to a data line via a column control circuit and is used to exchange data with units outside the chip. DC_S is a latch used to control the operation of the sense amplifier in accordance with data. DC_B, DC_C, and DC_S are connected in parallel with a bus (LBUS) between DC_A and the sense amplifier and used as data caches and it is necessary to exchange data with the outside via DC_A. The column control circuit connects DC_A associated with the column address to a data line. When a NAND flash memory is used for normal operation, the column address supplied by an address control circuit is used, but the address specified by an operator is used when an authentication sequence of the present proposal is performed. Whether to use a normal address or an address of an operator can be switched by a mode switching signal.

<Equivalent Circuit Example of the Sense Amplifier and Data Caches>

FIG. 46 shows an equivalent circuit example of a sense amplifier 77 and data caches 12 in FIG. 45.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory device to be authenticated comprising:
   a package including a stacked structure with multiple chips;
   a first memory area being contained in the package, the first memory area being used to store a first key and secret identification information unique to the device, and the first memory area being prohibited from being read and written from outside of the device at least after shipping;

a second memory area being contained in the package, the second memory area being used to store encrypted secret identification information generated by encrypting the secret identification information, and the second memory area being required to be read-only from outside of the device;

a third memory area being contained in the package, the third memory area being required to be readable and writable from outside of the device;

a first data generator configured to generate a second key by encrypting a host constant with the first key;

a second data generator configured to generate a session key by encrypting a random number with the second key;

a one-way function processor configured to generate an authentication information by processing the secret identification information with the session key in one-way function operation; and a data output interface configured to output the encrypted secret identification information and the authentication information to outside of the device.

* * * * *